(12) United States Patent
Payne et al.

(10) Patent No.: US 9,261,694 B2
(45) Date of Patent: Feb. 16, 2016

(54) DISPLAY APPARATUS AND METHODS FOR MANUFACTURE THEREOF

(75) Inventors: Richard S. Payne, Andover, MA (US);
Je Hong Kim, Lexington, MA (US);
Jignesh Gandhi, Burlington, MA (US);
Mark B. Andersson, Northborough, MA (US); Javier Villarreal, Somerville, MA (US)

(73) Assignee: Pixtronix, Inc., San Diego, CA (US)

( * ) Notice: Subject to any disclaimer, the term of this patent is extended or adjusted under 35 U.S.C. 154(b) by 417 days.

(21) Appl. No.: 12/985,196

(22) Filed: Jan. 5, 2011

(65) Prior Publication Data
US 2011/0122474 A1 May 26, 2011

Related U.S. Application Data

(63) Continuation-in-part of application No. 12/483,062, filed on Jun. 11, 2009, now Pat. No. 7,999,994, which is a continuation-in-part of application No. 11/906,383, filed on Oct. 1, 2007, now Pat. No.
(Continued)

(51) Int. Cl.
*G02B 26/00* (2006.01)
*G02B 26/08* (2006.01)
*G02F 1/29* (2006.01)
*G02B 26/02* (2006.01)

(52) U.S. Cl.
CPC ....................................... *G02B 26/02* (2013.01)

(58) Field of Classification Search
CPC ........... A61B 2017/00017; A61B 2017/00084; A61B 2017/00212; A61B 5/0002; A61B 5/02; A61B 5/024; A61B 5/0816; A61B 5/6804; G02B 26/0841; G02B 26/02; G02B 26/0808; G02B 26/023; G02B 26/06; G02B 26/08
USPC ......... 359/290–292, 295, 298, 237, 242, 246, 359/247
See application file for complete search history.

(56) References Cited

U.S. PATENT DOCUMENTS

| | | | |
|---|---|---|---|
| 3,864,582 | A | 2/1975 | Keeler |
| 4,067,043 | A | 1/1978 | Perry |
| 4,074,253 | A | 2/1978 | Nadir |

(Continued)

FOREIGN PATENT DOCUMENTS

| | | | |
|---|---|---|---|
| CA | 2241823 | A1 | 8/1997 |
| CA | 2334403 | A1 | 12/1999 |

(Continued)

OTHER PUBLICATIONS

"Flat Panel Display (FPD) Manufacturing Equipment that Cuts Production Costs by Half", Shibaura Mechatronics Corporation, product brochure for panel processing.
(Continued)

*Primary Examiner* — Stephone B Allen
*Assistant Examiner* — Brandi Thomas
(74) *Attorney, Agent, or Firm* — Weaver Austin Villeneuve & Sampson LLP

(57) ABSTRACT

Display devices incorporating light modulators are disclosed along with methods of manufacturing such devices. According to some aspects of the invention, a control matrix for controlling light modulators of a display includes a light absorbing layer that includes a material having a substantially light absorbing property.

21 Claims, 32 Drawing Sheets

Related U.S. Application Data 7,636,189, which is a continuation of application No. 11/251,034, filed on Oct. 14, 2005, now Pat. No. 7,304,785, which is a continuation-in-part of application No. 11/218,690, filed on Sep. 2, 2005, now Pat. No. 7,417,782, said application No. 12/483,062 is a continuation of application No. 12/045,518, filed on Mar. 10, 2008, now abandoned, which is a continuation of application No. 11/361,785, filed on Feb. 23, 2006, now Pat. No. 7,405,852, which is a continuation-in-part of application No. 11/218,690, and a continuation-in-part of application No. 11/251,035, filed on Oct. 14, 2005, now Pat. No. 7,271,945, which is a continuation-in-part of application No. 11/218,690, application No. 12/985,196, which is a continuation-in-part of application No. PCT/US2009/049826, filed on Jul. 7, 2009.

(60) Provisional application No. 60/655,827, filed on Feb. 23, 2005, provisional application No. 60/676,053, filed on Apr. 29, 2005, provisional application No. 61/134,175, filed on Jul. 7, 2008.

(56) References Cited

U.S. PATENT DOCUMENTS

| | | | |
|---|---|---|---|
| 4,421,381 | A | 12/1983 | Ueda et al. |
| 4,559,535 | A | 12/1985 | Watkins et al. |
| 4,563,836 | A | 1/1986 | Woodruff et al. |
| 4,564,836 | A | 1/1986 | Vuilleumier et al. |
| 4,582,396 | A | 4/1986 | Bos et al. |
| 4,673,253 | A | 6/1987 | Tanabe et al. |
| 4,728,936 | A | 3/1988 | Guscott et al. |
| 4,744,640 | A | 5/1988 | Phillips |
| 4,889,603 | A | 12/1989 | DiSanto et al. |
| 4,958,911 | A | 9/1990 | Beiswenger et al. |
| 4,991,941 | A | 2/1991 | Kalmanash |
| 5,005,108 | A | 4/1991 | Pristash et al. |
| 5,025,346 | A | 6/1991 | Tang et al. |
| 5,025,356 | A | 6/1991 | Gawad |
| 5,042,900 | A | 8/1991 | Parker |
| 5,044,734 | A | 9/1991 | Sperl et al. |
| 5,050,946 | A | 9/1991 | Hathaway et al. |
| 5,061,049 | A | 10/1991 | Hornbeck |
| 5,062,689 | A | 11/1991 | Koehler |
| 5,078,479 | A | 1/1992 | Vuilleumier |
| 5,093,652 | A | 3/1992 | Bull et al. |
| 5,096,279 | A | 3/1992 | Hornbeck et al. |
| 5,128,787 | A | 7/1992 | Blonder |
| 5,136,480 | A | 8/1992 | Pristash et al. |
| 5,136,751 | A | 8/1992 | Coyne et al. |
| 5,142,405 | A | 8/1992 | Hornbeck |
| 5,184,248 | A | 2/1993 | De Vaan et al. |
| 5,184,428 | A | 2/1993 | Feldt et al. |
| 5,198,730 | A | 3/1993 | Vancil |
| 5,202,950 | A | 4/1993 | Arego et al. |
| 5,233,385 | A | 8/1993 | Sampsell |
| 5,233,459 | A | 8/1993 | Bozler et al. |
| 5,245,454 | A | 9/1993 | Blonder |
| 5,266,612 | A | 11/1993 | Kim et al. |
| 5,278,652 | A | 1/1994 | Urbanus et al. |
| 5,280,277 | A | 1/1994 | Hornbeck |
| 5,319,061 | A | 6/1994 | Ramaswamy |
| 5,319,491 | A | 6/1994 | Selbrede |
| 5,339,116 | A | 8/1994 | Urbanus et al. |
| 5,339,179 | A | 8/1994 | Rudisill et al. |
| 5,359,345 | A | 10/1994 | Hunter |
| 5,379,135 | A | 1/1995 | Nakagaki et al. |
| 5,393,710 | A | 2/1995 | Park et al. |
| 5,396,350 | A | 3/1995 | Beeson et al. |
| 5,405,490 | A | 4/1995 | Park et al. |
| 5,416,631 | A | 5/1995 | Yagi |
| 5,440,197 | A | 8/1995 | Gleckman |
| 5,452,024 | A | 9/1995 | Sampsell |
| 5,461,411 | A | 10/1995 | Florence et al. |
| 5,465,175 | A | 11/1995 | Woodgate et al. |
| 5,467,104 | A | 11/1995 | Furness, III |
| 5,477,086 | A | 12/1995 | Rostoker et al. |
| 5,479,279 | A | 12/1995 | Barbier et al. |
| 5,491,347 | A | 2/1996 | Allen et al. |
| 5,493,439 | A | 2/1996 | Engle |
| 5,497,172 | A | 3/1996 | Doherty et al. |
| 5,497,258 | A | 3/1996 | Ju et al. |
| 5,499,127 | A | 3/1996 | Tsubota et al. |
| 5,504,389 | A | 4/1996 | Dickey |
| 5,504,614 | A | 4/1996 | Webb et al. |
| 5,510,824 | A | 4/1996 | Nelson |
| 5,517,341 | A | 5/1996 | Kim et al. |
| 5,517,347 | A | 5/1996 | Sampsell |
| 5,519,240 | A | 5/1996 | Suzuki |
| 5,519,565 | A | 5/1996 | Kalt et al. |
| 5,523,803 | A | 6/1996 | Urbanus et al. |
| 5,526,051 | A | 6/1996 | Gove et al. |
| 5,528,262 | A | 6/1996 | McDowall et al. |
| 5,548,301 | A | 8/1996 | Kornher et al. |
| 5,548,670 | A | 8/1996 | Koike |
| 5,552,925 | A | 9/1996 | Worley |
| 5,559,389 | A | 9/1996 | Spindt et al. |
| 5,568,964 | A | 10/1996 | Parker et al. |
| 5,578,185 | A | 11/1996 | Bergeron et al. |
| 5,579,035 | A | 11/1996 | Beiswenger |
| 5,579,240 | A | 11/1996 | Buus |
| 5,591,049 | A | 1/1997 | Dohnishi |
| 5,596,339 | A | 1/1997 | Furness, III |
| 5,596,369 | A | 1/1997 | Chau |
| 5,613,751 | A | 3/1997 | Parker et al. |
| 5,618,096 | A | 4/1997 | Parker et al. |
| 5,619,266 | A | 4/1997 | Tomita et al. |
| 5,622,612 | A | 4/1997 | Mihara et al. |
| 5,629,784 | A | 5/1997 | Abileah et al. |
| 5,629,787 | A | 5/1997 | Tsubota et al. |
| 5,655,832 | A | 8/1997 | Pelka et al. |
| 5,655,838 | A | 8/1997 | Ridley et al. |
| 5,659,327 | A | 8/1997 | Furness, III |
| 5,663,917 | A | 9/1997 | Oka et al. |
| 5,666,226 | A | 9/1997 | Ezra et al. |
| 5,677,749 | A | 10/1997 | Tsubota et al. |
| 5,684,354 | A | 11/1997 | Gleckman |
| 5,687,465 | A | 11/1997 | Hinata et al. |
| 5,691,695 | A | 11/1997 | Lahiff |
| 5,694,227 | A | 12/1997 | Starkweather |
| 5,724,062 | A | 3/1998 | Hunter |
| 5,731,802 | A | 3/1998 | Aras et al. |
| 5,745,193 | A | 4/1998 | Urbanus et al. |
| 5,745,203 | A | 4/1998 | Valliath et al. |
| 5,745,281 | A | 4/1998 | Yi et al. |
| 5,745,284 | A | 4/1998 | Goldberg et al. |
| 5,771,321 | A | 6/1998 | Stern |
| 5,781,331 | A | 7/1998 | Carr et al. |
| 5,781,333 | A | 7/1998 | Lanzillotta et al. |
| 5,784,189 | A | 7/1998 | Bozler et al. |
| 5,794,761 | A | 8/1998 | Renaud et al. |
| 5,798,746 | A | 8/1998 | Koyama |
| 5,801,792 | A | 9/1998 | Smith et al. |
| 5,808,800 | A | 9/1998 | Handschy et al. |
| 5,810,469 | A | 9/1998 | Weinreich |
| 5,815,134 | A | 9/1998 | Nishi |
| 5,835,255 | A | 11/1998 | Miles |
| 5,835,256 | A | 11/1998 | Huibers |
| 5,854,872 | A | 12/1998 | Tai |
| 5,867,302 | A | 2/1999 | Fleming |
| 5,876,107 | A | 3/1999 | Parker et al. |
| 5,884,872 | A | 3/1999 | Greenhalgh |
| 5,889,625 | A | 3/1999 | Chen et al. |
| 5,894,686 | A | 4/1999 | Parker et al. |
| 5,895,115 | A | 4/1999 | Parker et al. |
| 5,917,692 | A | 6/1999 | Schmitz et al. |
| 5,921,652 | A | 7/1999 | Parker et al. |
| 5,923,480 | A | 7/1999 | Labeye |
| 5,926,591 | A | 7/1999 | Labeye et al. |
| 5,936,596 | A | 8/1999 | Yoshida et al. |
| 5,943,223 | A | 8/1999 | Pond |
| 5,953,469 | A | 9/1999 | Zhou |

(56) References Cited

U.S. PATENT DOCUMENTS

| | | |
|---|---|---|
| 5,959,763 A | 9/1999 | Bozler et al. |
| 5,963,367 A | 10/1999 | Aksyuk et al. |
| 5,973,727 A | 10/1999 | McGrew et al. |
| 5,975,711 A | 11/1999 | Parker et al. |
| 5,986,628 A | 11/1999 | Tuenge et al. |
| 5,986,796 A | 11/1999 | Miles |
| 5,986,828 A | 11/1999 | Wood et al. |
| 5,990,990 A | 11/1999 | Crabtree |
| 5,994,204 A * | 11/1999 | Young et al. .................. 438/455 |
| 5,995,688 A | 11/1999 | Aksyuk et al. |
| 6,008,781 A | 12/1999 | Furness, III |
| 6,008,929 A | 12/1999 | Akimoto et al. |
| 6,028,656 A | 2/2000 | Buhrer et al. |
| 6,030,089 A | 2/2000 | Parker et al. |
| 6,034,807 A | 3/2000 | Little et al. |
| 6,040,796 A | 3/2000 | Matsugatani et al. |
| 6,040,937 A | 3/2000 | Miles |
| 6,046,836 A | 4/2000 | Tuchman |
| 6,046,840 A | 4/2000 | Huibers |
| 6,049,317 A | 4/2000 | Thompson et al. |
| 6,055,090 A | 4/2000 | Miles |
| 6,069,676 A | 5/2000 | Yuyama |
| 6,079,838 A | 6/2000 | Parker et al. |
| 6,111,560 A | 8/2000 | May |
| 6,130,527 A | 10/2000 | Bontempo et al. |
| 6,130,735 A | 10/2000 | Hatanaka et al. |
| 6,137,313 A | 10/2000 | Wong et al. |
| 6,154,586 A | 11/2000 | MacDonald et al. |
| 6,158,867 A | 12/2000 | Parker et al. |
| 6,162,657 A | 12/2000 | Schiele et al. |
| 6,168,395 B1 | 1/2001 | Quenzer et al. |
| 6,172,657 B1 | 1/2001 | Kamakura et al. |
| 6,172,797 B1 | 1/2001 | Huibers |
| 6,174,064 B1 | 1/2001 | Kalantar et al. |
| 6,195,196 B1 | 2/2001 | Kimura et al. |
| 6,201,633 B1 | 3/2001 | Peeters et al. |
| 6,201,664 B1 | 3/2001 | Le et al. |
| 6,206,550 B1 | 3/2001 | Fukushima et al. |
| 6,215,536 B1 | 4/2001 | Ebihara et al. |
| 6,219,119 B1 | 4/2001 | Nakai |
| 6,225,991 B1 | 5/2001 | McKnight |
| 6,227,677 B1 | 5/2001 | Willis |
| 6,239,777 B1 | 5/2001 | Sugahara et al. |
| 6,249,169 B1 | 6/2001 | Okada |
| 6,249,269 B1 | 6/2001 | Blalock et al. |
| 6,249,370 B1 | 6/2001 | Takeuchi et al. |
| 6,266,240 B1 | 7/2001 | Urban et al. |
| 6,275,320 B1 | 8/2001 | Dhuler et al. |
| 6,282,951 B1 | 9/2001 | Loga et al. |
| 6,285,270 B1 | 9/2001 | Lane et al. |
| 6,288,824 B1 | 9/2001 | Kastalsky |
| 6,288,829 B1 | 9/2001 | Kimura |
| 6,295,054 B1 | 9/2001 | McKnight |
| 6,296,383 B1 | 10/2001 | Henningsen |
| 6,296,838 B1 | 10/2001 | Bindra et al. |
| 6,300,154 B2 | 10/2001 | Clark et al. |
| 6,300,294 B1 | 10/2001 | Robbins et al. |
| 6,317,103 B1 | 11/2001 | Furness, III |
| 6,323,834 B1 | 11/2001 | Colgan et al. |
| 6,329,967 B1 | 12/2001 | Little et al. |
| 6,329,971 B2 | 12/2001 | McKnight |
| 6,329,974 B1 | 12/2001 | Walker et al. |
| 6,360,033 B1 | 3/2002 | Lee et al. |
| 6,367,940 B1 | 4/2002 | Parker et al. |
| 6,388,661 B1 | 5/2002 | Richards |
| 6,392,736 B1 | 5/2002 | Furukawa et al. |
| 6,402,335 B1 | 6/2002 | Kalantar et al. |
| 6,402,355 B1 | 6/2002 | Kinouchi |
| 6,404,942 B1 | 6/2002 | Edwards et al. |
| 6,407,851 B1 | 6/2002 | Islam et al. |
| 6,411,423 B2 | 6/2002 | Ham |
| 6,424,329 B1 | 7/2002 | Okita |
| 6,424,388 B1 * | 7/2002 | Colgan et al. .................. 349/27 |
| 6,428,173 B1 | 8/2002 | Dhuler et al. |
| 6,429,625 B1 | 8/2002 | LeFevre et al. |
| 6,429,628 B2 | 8/2002 | Nakagawa |
| 6,459,467 B1 | 10/2002 | Hashimoto et al. |
| 6,471,879 B2 | 10/2002 | Hanson et al. |
| 6,473,220 B1 | 10/2002 | Clikeman et al. |
| 6,476,886 B2 | 11/2002 | Krusius et al. |
| 6,483,613 B1 | 11/2002 | Woodgate et al. |
| 6,486,997 B1 | 11/2002 | Bruzzone et al. |
| 6,498,685 B1 | 12/2002 | Johnson |
| 6,504,985 B2 | 1/2003 | Parker et al. |
| 6,507,138 B1 | 1/2003 | Rodgers et al. |
| 6,508,563 B2 | 1/2003 | Parker et al. |
| 6,514,111 B2 | 2/2003 | Ebihara et al. |
| 6,523,961 B2 | 2/2003 | Ilkov et al. |
| 6,529,250 B1 | 3/2003 | Murakami et al. |
| 6,529,265 B1 | 3/2003 | Henningsen |
| 6,531,329 B2 | 3/2003 | Asakura et al. |
| 6,531,947 B1 | 3/2003 | Weaver et al. |
| 6,532,044 B1 | 3/2003 | Conner et al. |
| 6,535,256 B1 | 3/2003 | Ishihara et al. |
| 6,535,311 B1 | 3/2003 | Lindquist |
| 6,556,258 B1 | 4/2003 | Yoshida et al. |
| 6,556,261 B1 | 4/2003 | Krusius et al. |
| RE38,108 E | 5/2003 | Chee et al. |
| 6,559,827 B1 | 5/2003 | Mangerson |
| 6,567,063 B1 | 5/2003 | Okita |
| 6,567,138 B1 | 5/2003 | Krusius et al. |
| 6,574,033 B1 | 6/2003 | Chui et al. |
| 6,576,887 B2 | 6/2003 | Whitney et al. |
| 6,582,095 B1 | 6/2003 | Toyoda |
| 6,583,915 B1 | 6/2003 | Hong et al. |
| 6,589,625 B1 | 7/2003 | Kothari et al. |
| 6,591,049 B2 | 7/2003 | Williams et al. |
| 6,593,677 B2 | 7/2003 | Behin et al. |
| 6,600,474 B1 | 7/2003 | Heines et al. |
| 6,621,488 B1 | 9/2003 | Takeuchi et al. |
| 6,626,540 B2 | 9/2003 | Ouchi et al. |
| 6,633,301 B1 | 10/2003 | Dallas et al. |
| 6,639,570 B2 | 10/2003 | Furness, III |
| 6,639,572 B1 | 10/2003 | Little et al. |
| 6,650,455 B2 | 11/2003 | Miles |
| 6,650,822 B1 | 11/2003 | Zhou |
| 6,664,779 B2 | 12/2003 | Lopes et al. |
| 6,666,561 B1 | 12/2003 | Blakley |
| 6,671,078 B2 | 12/2003 | Flanders et al. |
| 6,674,562 B1 | 1/2004 | Miles |
| 6,677,709 B1 | 1/2004 | Ma et al. |
| 6,677,936 B2 | 1/2004 | Jacobsen et al. |
| 6,678,029 B2 | 1/2004 | Suzuki |
| 6,680,792 B2 | 1/2004 | Miles |
| 6,687,040 B2 | 2/2004 | Kimura |
| 6,687,896 B1 | 2/2004 | Royce et al. |
| 6,690,422 B1 | 2/2004 | Daly et al. |
| 6,697,035 B2 | 2/2004 | Sugahara et al. |
| 6,698,348 B1 | 3/2004 | Bloss |
| 6,698,349 B2 | 3/2004 | Komata |
| 6,700,554 B2 | 3/2004 | Ham et al. |
| 6,701,039 B2 | 3/2004 | Bourgeois et al. |
| 6,707,176 B1 | 3/2004 | Rodgers |
| 6,710,008 B2 | 3/2004 | Chang et al. |
| 6,710,538 B1 | 3/2004 | Ahn et al. |
| 6,710,908 B2 | 3/2004 | Miles et al. |
| 6,710,920 B1 | 3/2004 | Mashitani et al. |
| 6,712,071 B1 | 3/2004 | Parker |
| 6,712,481 B2 | 3/2004 | Parker et al. |
| 6,731,355 B2 | 5/2004 | Miyashita |
| 6,731,492 B2 | 5/2004 | Goodwin-Johansson |
| 6,733,354 B1 | 5/2004 | Cathey et al. |
| 6,738,177 B1 | 5/2004 | Gutierrez et al. |
| 6,741,377 B2 | 5/2004 | Miles |
| 6,746,886 B2 | 6/2004 | Duncan et al. |
| 6,749,312 B2 | 6/2004 | Parker et al. |
| 6,750,930 B2 | 6/2004 | Yoshii et al. |
| 6,752,505 B2 | 6/2004 | Parker et al. |
| 6,755,534 B2 | 6/2004 | Veligdan et al. |
| 6,755,547 B2 | 6/2004 | Parker |
| 6,760,081 B2 | 7/2004 | Takagi |
| 6,760,505 B1 | 7/2004 | Street et al. |
| 6,762,743 B2 | 7/2004 | Yoshihara et al. |
| 6,762,868 B2 | 7/2004 | Liu et al. |

(56) References Cited

U.S. PATENT DOCUMENTS

| | | |
|---|---|---|
| 6,764,796 B2 | 7/2004 | Fries |
| 6,774,964 B2 | 8/2004 | Funamoto et al. |
| 6,775,048 B1 | 8/2004 | Starkweather et al. |
| 6,778,162 B2 | 8/2004 | Kimura et al. |
| 6,778,228 B2 | 8/2004 | Murakami et al. |
| 6,778,248 B1 | 8/2004 | Ootaguro et al. |
| 6,785,454 B2 | 8/2004 | Abe |
| 6,787,969 B2 | 9/2004 | Grade et al. |
| 6,788,371 B2 | 9/2004 | Tanada et al. |
| 6,794,119 B2 | 9/2004 | Miles |
| 6,795,064 B2 | 9/2004 | Walker et al. |
| 6,796,668 B2 | 9/2004 | Parker et al. |
| 6,798,935 B2 | 9/2004 | Bourgeois et al. |
| 6,800,996 B2 | 10/2004 | Nagai et al. |
| 6,809,851 B1 | 10/2004 | Gurcan |
| 6,819,386 B2 | 11/2004 | Roosendaal et al. |
| 6,819,465 B2 | 11/2004 | Clikeman et al. |
| 6,822,734 B1 | 11/2004 | Eidelman et al. |
| 6,825,470 B1 | 11/2004 | Bawolek et al. |
| 6,825,499 B2 | 11/2004 | Nakajima et al. |
| 6,827,456 B2 | 12/2004 | Parker et al. |
| 6,831,678 B1 | 12/2004 | Travis |
| 6,832,511 B2 | 12/2004 | Samoto et al. |
| 6,835,111 B2 | 12/2004 | Ahn et al. |
| 6,844,959 B2 | 1/2005 | Huibers et al. |
| 6,846,082 B2 | 1/2005 | Glent-Madsen et al. |
| 6,846,089 B2 | 1/2005 | Stevenson et al. |
| 6,847,425 B2 | 1/2005 | Tanada et al. |
| 6,847,428 B1 | 1/2005 | Sekiguchi et al. |
| 6,852,095 B1 | 2/2005 | Ray |
| 6,857,751 B2 | 2/2005 | Penn et al. |
| 6,859,625 B2 | 2/2005 | Sawada |
| 6,862,072 B2 | 3/2005 | Liu et al. |
| 6,863,219 B1 | 3/2005 | Jacobsen et al. |
| 6,864,618 B2 | 3/2005 | Miller et al. |
| 6,867,192 B1 | 3/2005 | Armour et al. |
| 6,867,896 B2 | 3/2005 | Miles |
| 6,873,311 B2 | 3/2005 | Yoshihara et al. |
| 6,879,307 B1 | 4/2005 | Stern |
| 6,886,956 B2 | 5/2005 | Parker et al. |
| 6,887,202 B2 | 5/2005 | Currie et al. |
| 6,888,678 B2 | 5/2005 | Nishiyama et al. |
| 6,889,565 B2 | 5/2005 | DeConde et al. |
| 6,893,677 B2 | 5/2005 | Yamada et al. |
| 6,897,164 B2 | 5/2005 | Baude et al. |
| 6,897,843 B2 | 5/2005 | Ayres et al. |
| 6,900,072 B2 | 5/2005 | Patel et al. |
| 6,906,847 B2 | 6/2005 | Huibers et al. |
| 6,911,891 B2 | 6/2005 | Qiu et al. |
| 6,911,964 B2 | 6/2005 | Lee et al. |
| 6,912,082 B1 | 6/2005 | Lu et al. |
| 6,919,981 B2 | 7/2005 | Clikeman et al. |
| 6,934,080 B2 | 8/2005 | Saccomanno et al. |
| 6,936,013 B2 | 8/2005 | Pevoto |
| 6,936,968 B2 | 8/2005 | Cross et al. |
| 6,939,013 B2 | 9/2005 | Asao |
| 6,940,631 B2 | 9/2005 | Ishikawa |
| 6,943,495 B2 | 9/2005 | Ma et al. |
| 6,947,107 B2 | 9/2005 | Yoshii et al. |
| 6,947,195 B2 | 9/2005 | Ohtaka et al. |
| 6,950,240 B2 | 9/2005 | Matsuo |
| 6,952,301 B2 | 10/2005 | Huibers |
| 6,953,375 B2 | 10/2005 | Ahn et al. |
| 6,961,167 B2 | 11/2005 | Prins et al. |
| 6,962,418 B2 | 11/2005 | Utsumi et al. |
| 6,962,419 B2 | 11/2005 | Huibers |
| 6,963,330 B2 | 11/2005 | Sugahara et al. |
| 6,965,375 B1 | 11/2005 | Gettemy et al. |
| 6,967,698 B2 | 11/2005 | Tanoue et al. |
| 6,967,763 B2 | 11/2005 | Fujii et al. |
| 6,969,635 B2 | 11/2005 | Patel et al. |
| 6,970,227 B2 | 11/2005 | Kida et al. |
| 6,977,710 B2 | 12/2005 | Akiyama et al. |
| 6,980,349 B1 | 12/2005 | Huibers et al. |
| 6,985,205 B2 | 1/2006 | Chol et al. |
| 6,992,375 B2 | 1/2006 | Robbins et al. |
| 6,996,306 B2 | 2/2006 | Chen et al. |
| 7,004,610 B2 | 2/2006 | Yamashita et al. |
| 7,004,611 B2 | 2/2006 | Parker et al. |
| 7,012,726 B1 | 3/2006 | Miles |
| 7,012,732 B2 | 3/2006 | Miles |
| 7,014,349 B2 | 3/2006 | Shinohara et al. |
| 7,019,809 B2 | 3/2006 | Sekiguchi |
| 7,026,821 B2 | 4/2006 | Martin et al. |
| 7,038,758 B2 | 5/2006 | Suzuki |
| 7,042,618 B2 | 5/2006 | Selbrede et al. |
| 7,042,643 B2 | 5/2006 | Miles |
| 7,046,221 B1 | 5/2006 | Malzbender |
| 7,046,905 B1 | 5/2006 | Gardiner et al. |
| 7,048,905 B2 | 5/2006 | Paparatto et al. |
| 7,050,035 B2 | 5/2006 | Iisaka |
| 7,050,141 B2 | 5/2006 | Yokoue |
| 7,050,219 B2 | 5/2006 | Kimura |
| 7,050,790 B2 | 5/2006 | Yamaga |
| 7,057,790 B2 | 6/2006 | Selbrede |
| 7,060,895 B2 | 6/2006 | Kothari et al. |
| 7,071,611 B2 | 7/2006 | Yonekubo et al. |
| 7,072,096 B2 | 7/2006 | Holman et al. |
| 7,075,702 B2 | 7/2006 | Huibers et al. |
| 7,092,142 B2 | 8/2006 | Selebrede et al. |
| 7,116,464 B2 | 10/2006 | Osawa |
| 7,119,944 B2 | 10/2006 | Patel et al. |
| 7,123,216 B1 | 10/2006 | Miles |
| 7,123,796 B2 | 10/2006 | Steckl et al. |
| 7,126,738 B2 | 10/2006 | Miles |
| 7,140,751 B2 | 11/2006 | Lin |
| 7,156,548 B2 | 1/2007 | Teng et al. |
| 7,161,094 B2 | 1/2007 | Kothari et al. |
| 7,164,250 B2 | 1/2007 | Boscolo et al. |
| 7,164,520 B2 | 1/2007 | Palmateer et al. |
| 7,180,677 B2 | 2/2007 | Fujii et al. |
| 7,184,202 B2 | 2/2007 | Miles et al. |
| 7,196,837 B2 | 3/2007 | Sampsell et al. |
| 7,198,982 B2 | 4/2007 | Patel et al. |
| 7,199,916 B2 | 4/2007 | Faase et al. |
| 7,215,459 B2 | 5/2007 | Huibers et al. |
| 7,217,588 B2 | 5/2007 | Hartzell et al. |
| 7,218,437 B2 | 5/2007 | Selbrede |
| 7,227,677 B2 | 6/2007 | Ravnkilde et al. |
| 7,233,304 B1 | 6/2007 | Aratani et al. |
| 7,271,945 B2 | 9/2007 | Hagood et al. |
| 7,274,416 B2 | 9/2007 | Feenstra et al. |
| 7,291,363 B2 | 11/2007 | Miller |
| 7,292,235 B2 | 11/2007 | Nose |
| 7,298,448 B2 | 11/2007 | Wu |
| 7,304,785 B2 | 12/2007 | Hagood et al. |
| 7,304,786 B2 | 12/2007 | Hagood et al. |
| 7,315,294 B2 | 1/2008 | Richards |
| 7,345,805 B2 | 3/2008 | Chui |
| 7,359,108 B2 | 4/2008 | Hayes et al. |
| 7,374,328 B2 | 5/2008 | Kuroda et al. |
| 7,391,493 B2 | 6/2008 | Kim |
| 7,391,552 B2 | 6/2008 | Barton et al. |
| 7,417,735 B2 | 8/2008 | Cummings et al. |
| 7,460,290 B2 | 12/2008 | Hagood, IV et al. |
| 7,463,227 B2 | 12/2008 | Van Gorkom |
| 7,529,012 B2 | 5/2009 | Hayes et al. |
| 7,551,344 B2 | 6/2009 | Hagood et al. |
| 7,573,547 B2 | 8/2009 | Palmateer et al. |
| 7,601,942 B2 * | 10/2009 | Underwood et al. ...... 250/214.1 |
| 7,666,049 B2 | 2/2010 | Saito et al. |
| 7,715,080 B2 | 5/2010 | Natarajan et al. |
| 7,729,037 B2 | 6/2010 | Hagood, IV et al. |
| 7,742,215 B2 | 6/2010 | Hagood, IV |
| 7,746,529 B2 | 6/2010 | Hagood et al. |
| 7,826,127 B2 | 11/2010 | Khonsari et al. |
| 7,852,546 B2 | 12/2010 | Fijol et al. |
| 7,898,714 B2 | 3/2011 | Hagood, IV et al. |
| 7,920,317 B2 | 4/2011 | Lee et al. |
| 7,927,654 B2 | 4/2011 | Hagood et al. |
| 7,975,665 B2 | 7/2011 | Mori |
| 7,999,994 B2 | 8/2011 | Hagood, IV et al. |
| 8,169,679 B2 | 5/2012 | Wu et al. |
| 8,482,496 B2 | 7/2013 | Lewis |

(56) References Cited

U.S. PATENT DOCUMENTS

| | | |
|---|---|---|
| 8,519,923 B2 | 8/2013 | Hagood et al. |
| 8,519,945 B2 | 8/2013 | Hagood et al. |
| 8,526,096 B2 | 9/2013 | Steyn et al. |
| 8,599,463 B2 | 12/2013 | Wu et al. |
| 8,698,980 B2 | 4/2014 | Chao et al. |
| 2001/0028422 A1 | 10/2001 | Tsujimura et al. |
| 2001/0028993 A1 | 10/2001 | Sanford |
| 2001/0030488 A1 | 10/2001 | Jerman et al. |
| 2001/0040538 A1 | 11/2001 | Quanrud |
| 2001/0043156 A1 | 11/2001 | Matsui et al. |
| 2001/0043177 A1 | 11/2001 | Huston et al. |
| 2001/0048265 A1 | 12/2001 | Miller et al. |
| 2001/0048431 A1 | 12/2001 | Laffargue et al. |
| 2001/0050661 A1 | 12/2001 | Noda et al. |
| 2002/0000959 A1 | 1/2002 | Colgan et al. |
| 2002/0012159 A1 | 1/2002 | Tew |
| 2002/0030566 A1 | 3/2002 | Bozler et al. |
| 2002/0036610 A1 | 3/2002 | Ito et al. |
| 2002/0047172 A1 | 4/2002 | Reid |
| 2002/0051096 A1 | 5/2002 | Yamazaki et al. |
| 2002/0063218 A1 | 5/2002 | Maydanich et al. |
| 2002/0063661 A1 | 5/2002 | Comiskey et al. |
| 2002/0075555 A1 | 6/2002 | Miles |
| 2002/0093722 A1 | 7/2002 | Chan et al. |
| 2002/0109903 A1 | 8/2002 | Kaeriyama |
| 2002/0113281 A1 | 8/2002 | Cunningham et al. |
| 2002/0126387 A1 | 9/2002 | Ishikawa et al. |
| 2002/0135553 A1 | 9/2002 | Nagai et al. |
| 2002/0150698 A1* | 10/2002 | Kawabata ................ 428/1.1 |
| 2002/0163482 A1 | 11/2002 | Sullivan |
| 2002/0163484 A1 | 11/2002 | Furness, III |
| 2002/0163709 A1 | 11/2002 | Mirza |
| 2002/0171327 A1 | 11/2002 | Miller et al. |
| 2002/0181597 A1 | 12/2002 | Okada |
| 2002/0185699 A1 | 12/2002 | Reid |
| 2002/0195423 A1 | 12/2002 | Patel et al. |
| 2002/0196522 A1 | 12/2002 | Little et al. |
| 2003/0001815 A1 | 1/2003 | Cui |
| 2003/0009898 A1 | 1/2003 | Slocum et al. |
| 2003/0021004 A1 | 1/2003 | Cunningham et al. |
| 2003/0023110 A1 | 1/2003 | Tam et al. |
| 2003/0036215 A1 | 2/2003 | Reid |
| 2003/0042157 A1 | 3/2003 | Mays |
| 2003/0043157 A1 | 3/2003 | Miles |
| 2003/0044337 A1 | 3/2003 | Takabayashi |
| 2003/0048036 A1 | 3/2003 | Lemkin |
| 2003/0048370 A1 | 3/2003 | Koyama |
| 2003/0058543 A1 | 3/2003 | Sheedy et al. |
| 2003/0063234 A1 | 4/2003 | Oda et al. |
| 2003/0067565 A1 | 4/2003 | Yamamura |
| 2003/0071686 A1 | 4/2003 | Lemkin |
| 2003/0076649 A1 | 4/2003 | Speakman |
| 2003/0081315 A1 | 5/2003 | Kobayashi |
| 2003/0081402 A1 | 5/2003 | Jeon et al. |
| 2003/0085650 A1 | 5/2003 | Cathey et al. |
| 2003/0085867 A1 | 5/2003 | Grabert |
| 2003/0095081 A1 | 5/2003 | Furness, III |
| 2003/0123245 A1 | 7/2003 | Parker et al. |
| 2003/0123246 A1 | 7/2003 | Parker |
| 2003/0128218 A1 | 7/2003 | Struyk |
| 2003/0128416 A1 | 7/2003 | Caracci et al. |
| 2003/0133284 A1 | 7/2003 | Chipchase et al. |
| 2003/0156422 A1 | 8/2003 | Tatewaki et al. |
| 2003/0164814 A1 | 9/2003 | Starkweather et al. |
| 2003/0174422 A1 | 9/2003 | Miller et al. |
| 2003/0174931 A1 | 9/2003 | Rodgers et al. |
| 2003/0183008 A1 | 10/2003 | Bang et al. |
| 2003/0184189 A1 | 10/2003 | Sinclair |
| 2003/0190536 A1 | 10/2003 | Fries |
| 2003/0196590 A1 | 10/2003 | Hartzell |
| 2003/0202338 A1 | 10/2003 | Parker |
| 2003/0210811 A1 | 11/2003 | Dubowsky et al. |
| 2003/0218793 A1 | 11/2003 | Soneda et al. |
| 2003/0231160 A1 | 12/2003 | Yoshihara et al. |
| 2004/0001033 A1 | 1/2004 | Goodwin-Johansson et al. |
| 2004/0012946 A1 | 1/2004 | Parker et al. |
| 2004/0036668 A1 | 2/2004 | Nakanishi |
| 2004/0051929 A1 | 3/2004 | Sampsell et al. |
| 2004/0058532 A1 | 3/2004 | Miles et al. |
| 2004/0076008 A1 | 4/2004 | Ikeda |
| 2004/0080484 A1 | 4/2004 | Heines et al. |
| 2004/0085608 A1 | 5/2004 | Theil et al. |
| 2004/0085749 A1 | 5/2004 | Parker et al. |
| 2004/0088629 A1 | 5/2004 | Ott |
| 2004/0090144 A1 | 5/2004 | Miller et al. |
| 2004/0090599 A1 | 5/2004 | Kowarz et al. |
| 2004/0113903 A1 | 6/2004 | Mikami et al. |
| 2004/0114346 A1 | 6/2004 | Parker et al. |
| 2004/0122328 A1 | 6/2004 | Wang et al. |
| 2004/0125062 A1 | 7/2004 | Yamamoto et al. |
| 2004/0135273 A1 | 7/2004 | Parker et al. |
| 2004/0135951 A1 | 7/2004 | Stumbo et al. |
| 2004/0136680 A1 | 7/2004 | Medina et al. |
| 2004/0141700 A1 | 7/2004 | Yang |
| 2004/0145580 A1 | 7/2004 | Perlman |
| 2004/0145793 A1 | 7/2004 | Barbour et al. |
| 2004/0145854 A1 | 7/2004 | Tamura |
| 2004/0156246 A1 | 8/2004 | Nakamura |
| 2004/0157664 A1 | 8/2004 | Link |
| 2004/0165372 A1 | 8/2004 | Parker |
| 2004/0171206 A1 | 9/2004 | Rodgers |
| 2004/0173872 A1 | 9/2004 | Park et al. |
| 2004/0179146 A1 | 9/2004 | Nilsson |
| 2004/0184710 A1 | 9/2004 | Kubby et al. |
| 2004/0196215 A1 | 10/2004 | Duthaler et al. |
| 2004/0207768 A1 | 10/2004 | Liu |
| 2004/0207815 A1 | 10/2004 | Allen et al. |
| 2004/0212759 A1* | 10/2004 | Hayashi ................ 349/84 |
| 2004/0212907 A1 | 10/2004 | Mala et al. |
| 2004/0217919 A1 | 11/2004 | Piehl et al. |
| 2004/0218149 A1 | 11/2004 | Huibers |
| 2004/0218154 A1 | 11/2004 | Huibers |
| 2004/0218292 A1 | 11/2004 | Huibers |
| 2004/0218293 A1 | 11/2004 | Huibers |
| 2004/0223088 A1 | 11/2004 | Huibers |
| 2004/0223240 A1 | 11/2004 | Huibers |
| 2004/0227428 A1 | 11/2004 | Sinclair |
| 2004/0233354 A1 | 11/2004 | Uehara et al. |
| 2004/0233392 A1 | 11/2004 | Huibers |
| 2004/0233498 A1 | 11/2004 | Starkweather et al. |
| 2004/0233503 A1 | 11/2004 | Kimura |
| 2004/0240032 A1 | 12/2004 | Miles |
| 2004/0240138 A1 | 12/2004 | Martin et al. |
| 2004/0246275 A1 | 12/2004 | Yoshihara et al. |
| 2004/0263076 A1 | 12/2004 | De Zwart et al. |
| 2004/0263502 A1 | 12/2004 | Dallas et al. |
| 2004/0263944 A1 | 12/2004 | Miles et al. |
| 2005/0002082 A1 | 1/2005 | Miles |
| 2005/0002086 A1 | 1/2005 | Starkweather et al. |
| 2005/0007671 A1 | 1/2005 | Onvlee |
| 2005/0007759 A1 | 1/2005 | Parker |
| 2005/0012197 A1 | 1/2005 | Smith et al. |
| 2005/0018322 A1 | 1/2005 | Ben-Gad et al. |
| 2005/0024849 A1 | 2/2005 | Parker et al. |
| 2005/0052681 A1 | 3/2005 | Kogi |
| 2005/0052723 A1 | 3/2005 | Watanabe et al. |
| 2005/0059184 A1 | 3/2005 | Sniegowski et al. |
| 2005/0062708 A1 | 3/2005 | Yoshihara et al. |
| 2005/0072032 A1 | 4/2005 | McCollum et al. |
| 2005/0073471 A1 | 4/2005 | Selbrede |
| 2005/0088404 A1 | 4/2005 | Heines et al. |
| 2005/0094240 A1 | 5/2005 | Huibers et al. |
| 2005/0094418 A1 | 5/2005 | Parker |
| 2005/0104804 A1 | 5/2005 | Feenstra et al. |
| 2005/0111238 A1 | 5/2005 | Parker |
| 2005/0111241 A1 | 5/2005 | Parker |
| 2005/0116798 A1 | 6/2005 | Bintoro et al. |
| 2005/0122560 A1 | 6/2005 | Sampsell et al. |
| 2005/0122591 A1 | 6/2005 | Parker et al. |
| 2005/0123249 A1 | 6/2005 | Yun et al. |
| 2005/0123349 A1 | 6/2005 | Koch |
| 2005/0128370 A1 | 6/2005 | Moon |
| 2005/0134768 A1 | 6/2005 | Sugiura et al. |
| 2005/0134805 A1 | 6/2005 | Conner et al. |

(56) References Cited

U.S. PATENT DOCUMENTS

| | | |
|---|---|---|
| 2005/0139542 A1 | 6/2005 | Dickensheets et al. |
| 2005/0140636 A1 | 6/2005 | Chung et al. |
| 2005/0141076 A1 | 6/2005 | Bausenwein |
| 2005/0151940 A1 | 7/2005 | Asao |
| 2005/0157376 A1 | 7/2005 | Huibers et al. |
| 2005/0168431 A1 | 8/2005 | Chui |
| 2005/0168789 A1 | 8/2005 | Glent-Madsen |
| 2005/0171408 A1 | 8/2005 | Parker |
| 2005/0172625 A1 | 8/2005 | Starkweather et al. |
| 2005/0179977 A1 | 8/2005 | Chui et al. |
| 2005/0195467 A1 | 9/2005 | Kothari et al. |
| 2005/0195468 A1 | 9/2005 | Sampsell |
| 2005/0206991 A1 | 9/2005 | Chui et al. |
| 2005/0207154 A1 | 9/2005 | Parker |
| 2005/0207178 A1 | 9/2005 | Parker |
| 2005/0212734 A1 | 9/2005 | Kimura |
| 2005/0212738 A1 | 9/2005 | Gally |
| 2005/0213322 A1 | 9/2005 | Parker |
| 2005/0213323 A1 | 9/2005 | Parker |
| 2005/0213349 A1 | 9/2005 | Parker |
| 2005/0219676 A1 | 10/2005 | Kimura et al. |
| 2005/0219679 A1 | 10/2005 | Ishikawa |
| 2005/0219680 A1 | 10/2005 | Ishikawa |
| 2005/0225501 A1 | 10/2005 | Srinivasan et al. |
| 2005/0225519 A1 | 10/2005 | Naugler, Jr. |
| 2005/0225732 A1 | 10/2005 | Conner et al. |
| 2005/0225827 A1 | 10/2005 | Kastalsky |
| 2005/0231791 A1 | 10/2005 | Sampsell et al. |
| 2005/0236928 A1 | 10/2005 | Kurozuka et al. |
| 2005/0242710 A1 | 11/2005 | Yamazaki et al. |
| 2005/0243023 A1 | 11/2005 | Reddy et al. |
| 2005/0244099 A1 | 11/2005 | Pasch et al. |
| 2005/0244949 A1 | 11/2005 | Miles |
| 2005/0245313 A1 | 11/2005 | Yoshino et al. |
| 2005/0249966 A1 | 11/2005 | Tung et al. |
| 2005/0253779 A1 | 11/2005 | Feenstra et al. |
| 2005/0258571 A1 | 11/2005 | Dumond et al. |
| 2005/0259198 A1 | 11/2005 | Lubart et al. |
| 2005/0263866 A1 | 12/2005 | Wan |
| 2005/0265029 A1 | 12/2005 | Epstein et al. |
| 2005/0275072 A1 | 12/2005 | Haluzak et al. |
| 2005/0275930 A1 | 12/2005 | Patel et al. |
| 2005/0285816 A1 | 12/2005 | Glass |
| 2005/0286113 A1 | 12/2005 | Miles |
| 2005/0286114 A1 | 12/2005 | Miles |
| 2006/0001942 A1 | 1/2006 | Chui et al. |
| 2006/0003676 A1 | 1/2006 | Bernard et al. |
| 2006/0004928 A1 | 1/2006 | Hess et al. |
| 2006/0007514 A1 | 1/2006 | Desai |
| 2006/0007701 A1 | 1/2006 | Schoellmann et al. |
| 2006/0012781 A1* | 1/2006 | Fradkin et al. ............. 356/237.5 |
| 2006/0023287 A1* | 2/2006 | Przybyla et al. ............. 359/237 |
| 2006/0028708 A1 | 2/2006 | Miles |
| 2006/0028811 A1 | 2/2006 | Ross, Jr. et al. |
| 2006/0028817 A1 | 2/2006 | Parker |
| 2006/0028840 A1 | 2/2006 | Parker |
| 2006/0028841 A1 | 2/2006 | Parker |
| 2006/0028843 A1 | 2/2006 | Parker |
| 2006/0028844 A1 | 2/2006 | Parker |
| 2006/0033676 A1 | 2/2006 | Faase et al. |
| 2006/0033975 A1 | 2/2006 | Miles |
| 2006/0038766 A1 | 2/2006 | Morita |
| 2006/0038768 A1 | 2/2006 | Sagawa et al. |
| 2006/0044246 A1 | 3/2006 | Mignard |
| 2006/0044298 A1 | 3/2006 | Mignard et al. |
| 2006/0044508 A1 | 3/2006 | Mochizuki |
| 2006/0044928 A1 | 3/2006 | Chui et al. |
| 2006/0061559 A1 | 3/2006 | King |
| 2006/0066504 A1 | 3/2006 | Sampsell et al. |
| 2006/0066540 A1 | 3/2006 | Hewlett et al. |
| 2006/0066560 A1 | 3/2006 | Gally et al. |
| 2006/0066598 A1 | 3/2006 | Floyd |
| 2006/0066934 A1 | 3/2006 | Selbrede |
| 2006/0066937 A1 | 3/2006 | Chui |
| 2006/0077125 A1 | 4/2006 | Floyd |
| 2006/0077153 A1 | 4/2006 | Cummings et al. |
| 2006/0092490 A1 | 5/2006 | McCollum et al. |
| 2006/0104061 A1 | 5/2006 | Lerner et al. |
| 2006/0132383 A1 | 6/2006 | Gally et al. |
| 2006/0152476 A1 | 7/2006 | Van Gorkom et al. |
| 2006/0154078 A1 | 7/2006 | Watanabe et al. |
| 2006/0172745 A1 | 8/2006 | Knowles |
| 2006/0187190 A1 | 8/2006 | Hagood et al. |
| 2006/0187191 A1 | 8/2006 | Hagood et al. |
| 2006/0187290 A1 | 8/2006 | Nakashima |
| 2006/0187528 A1 | 8/2006 | Hagood et al. |
| 2006/0209000 A1 | 9/2006 | Sumiyoshi et al. |
| 2006/0209012 A1 | 9/2006 | Hagood |
| 2006/0215540 A1 | 9/2006 | Krishnamoorthi et al. |
| 2006/0238443 A1 | 10/2006 | Derichs |
| 2006/0250325 A1 | 11/2006 | Hagood et al. |
| 2006/0250676 A1 | 11/2006 | Hagood |
| 2006/0256039 A1 | 11/2006 | Hagood et al. |
| 2006/0262060 A1 | 11/2006 | Amundson |
| 2006/0262380 A1 | 11/2006 | Miles |
| 2006/0268386 A1 | 11/2006 | Selbrede et al. |
| 2006/0268568 A1 | 11/2006 | Oku et al. |
| 2006/0270179 A1 | 11/2006 | Yang |
| 2006/0280319 A1 | 12/2006 | Wang et al. |
| 2006/0291034 A1 | 12/2006 | Patry et al. |
| 2006/0291771 A1 | 12/2006 | Braunisch et al. |
| 2006/0291774 A1 | 12/2006 | Schoellmann et al. |
| 2007/0002156 A1 | 1/2007 | Hagood et al. |
| 2007/0002413 A1 | 1/2007 | Psaltis et al. |
| 2007/0003055 A1 | 1/2007 | Bark et al. |
| 2007/0007889 A1 | 1/2007 | Bongaerts et al. |
| 2007/0024701 A1 | 2/2007 | Prechtl et al. |
| 2007/0031097 A1 | 2/2007 | Heikenfeld et al. |
| 2007/0035808 A1 | 2/2007 | Amundson et al. |
| 2007/0040982 A1 | 2/2007 | Nakano et al. |
| 2007/0047051 A1 | 3/2007 | Selbrede et al. |
| 2007/0047887 A1 | 3/2007 | Selbrede |
| 2007/0052636 A1 | 3/2007 | Kalt et al. |
| 2007/0052660 A1 | 3/2007 | Montbach et al. |
| 2007/0053652 A1 | 3/2007 | Mignard et al. |
| 2007/0086078 A1 | 4/2007 | Hagood et al. |
| 2007/0091011 A1 | 4/2007 | Selbrede |
| 2007/0091038 A1 | 4/2007 | Hagood et al. |
| 2007/0103209 A1 | 5/2007 | Lee |
| 2007/0132680 A1 | 6/2007 | Kagawa et al. |
| 2007/0150813 A1 | 6/2007 | Selebrede et al. |
| 2007/0172171 A1 | 7/2007 | Van Ostrand et al. |
| 2007/0190265 A1 | 8/2007 | Aoki et al. |
| 2007/0195026 A1 | 8/2007 | Hagood et al. |
| 2007/0205969 A1 | 9/2007 | Hagood et al. |
| 2007/0216987 A1 | 9/2007 | Hagood et al. |
| 2007/0217108 A1 | 9/2007 | Ozawa et al. |
| 2007/0223080 A1 | 9/2007 | Hagood et al. |
| 2007/0247401 A1 | 10/2007 | Sasagawa et al. |
| 2007/0279727 A1 | 12/2007 | Gandhi et al. |
| 2007/0297747 A1 | 12/2007 | Biernath et al. |
| 2008/0014557 A1 | 1/2008 | Kuhn et al. |
| 2008/0026066 A1 | 1/2008 | Roser |
| 2008/0030827 A1 | 2/2008 | Hagood et al. |
| 2008/0037104 A1 | 2/2008 | Hagood et al. |
| 2008/0043726 A1 | 2/2008 | Herrero-Veron et al. |
| 2008/0094853 A1 | 4/2008 | Kim et al. |
| 2008/0129681 A1 | 6/2008 | Hagood et al. |
| 2008/0158635 A1 | 7/2008 | Hagood et al. |
| 2008/0165122 A1 | 7/2008 | Duthaler et al. |
| 2008/0174532 A1 | 7/2008 | Lewis |
| 2008/0279727 A1 | 11/2008 | Haushalter |
| 2008/0283175 A1 | 11/2008 | Hagood et al. |
| 2008/0297880 A1 | 12/2008 | Steckl et al. |
| 2009/0091561 A1 | 4/2009 | Koyama |
| 2009/0103281 A1 | 4/2009 | Koh |
| 2009/0141335 A1 | 6/2009 | Feenstra et al. |
| 2009/0195855 A1 | 8/2009 | Steyn et al. |
| 2009/0284824 A1 | 11/2009 | Feenstra et al. |
| 2010/0110518 A1 | 5/2010 | Wu et al. |
| 2010/0328608 A1 | 12/2010 | Fujii et al. |
| 2011/0148948 A1 | 6/2011 | Gandhi et al. |
| 2011/0164067 A1 | 7/2011 | Lewis et al. |
| 2011/0205259 A1 | 8/2011 | Hagood, IV |

(56) References Cited

U.S. PATENT DOCUMENTS

| | | | |
|---|---|---|---|
| 2011/0255146 A1 | 10/2011 | Brosnihan et al. |
| 2011/0267668 A1 | 11/2011 | Hagood, IV et al. |
| 2012/0133006 A1 | 5/2012 | Hasselbach et al. |
| 2012/0169795 A1 | 7/2012 | Hagood et al. |
| 2012/0200906 A1 | 8/2012 | Wu et al. |
| 2012/0229226 A1 | 9/2012 | Oja et al. |
| 2012/0280971 A1 | 11/2012 | Hagood et al. |
| 2012/0320111 A1 | 12/2012 | Hagood, IV et al. |
| 2012/0320112 A1 | 12/2012 | Hagood, IV et al. |
| 2012/0320113 A1 | 12/2012 | Hagood, IV et al. |
| 2013/0010341 A1 | 1/2013 | Hagood et al. |
| 2013/0010342 A1 | 1/2013 | Hagood, IV et al. |
| 2013/0010344 A1 | 1/2013 | Hagood et al. |
| 2013/0335806 A1 | 12/2013 | Steyn et al. |
| 2013/0342522 A1 | 12/2013 | Hagood |
| 2014/0078154 A1 | 3/2014 | Payne et al. |
| 2014/0085698 A1 | 3/2014 | Wu et al. |
| 2014/0145926 A1 | 5/2014 | Wu et al. |
| 2014/0184573 A1 | 7/2014 | Nemchuk et al. |
| 2014/0184621 A1 | 7/2014 | Brosnihan et al. |
| 2014/0267196 A1 | 9/2014 | Villarreal et al. |
| 2014/0267331 A1 | 9/2014 | Villarreal et al. |
| 2014/0268293 A1 | 9/2014 | Chleirigh et al. |

FOREIGN PATENT DOCUMENTS

| | | |
|---|---|---|
| CN | 1206218 | 1/1999 |
| CN | 1309782 A | 8/2001 |
| CN | 1390045 A | 1/2003 |
| CN | 1402033 A | 3/2003 |
| CN | 1476664 A | 2/2004 |
| CN | 1491030 A | 4/2004 |
| CN | 1498408 A | 5/2004 |
| CN | 1541483 A | 10/2004 |
| CN | 1542499 A | 11/2004 |
| CN | 1555472 A | 12/2004 |
| CN | 1573525 A | 2/2005 |
| CN | 1584731 A | 2/2005 |
| CN | 1599522 A | 3/2005 |
| CN | 1623111 A | 6/2005 |
| CN | 1898969 A | 1/2007 |
| DE | 10332647 A1 | 2/2005 |
| EP | 0366847 A2 | 5/1990 |
| EP | 0438614 A1 | 7/1991 |
| EP | 0359450 B1 | 11/1994 |
| EP | 0495273 B1 | 9/1996 |
| EP | 0415625 B1 | 1/1997 |
| EP | 0786679 A2 | 7/1997 |
| EP | 0884525 A2 | 12/1998 |
| EP | 0889458 A2 | 1/1999 |
| EP | 0751340 B1 | 5/2000 |
| EP | 1022598 A2 | 7/2000 |
| EP | 1091342 A2 | 4/2001 |
| EP | 1091343 A2 | 4/2001 |
| EP | 1091842 A1 | 4/2001 |
| EP | 1093142 A2 | 4/2001 |
| EP | 1168051 A1 | 1/2002 |
| EP | 1202096 A2 | 5/2002 |
| EP | 1202244 A1 | 5/2002 |
| EP | 1426190 A1 | 6/2004 |
| EP | 1429310 A2 | 6/2004 |
| EP | 1471495 A2 | 10/2004 |
| EP | 1522883 A1 | 4/2005 |
| EP | 1533853 A2 | 5/2005 |
| EP | 1551002 A2 | 7/2005 |
| EP | 1640770 A2 | 3/2006 |
| EP | 1674893 A1 | 6/2006 |
| EP | 1734502 A1 | 12/2006 |
| EP | 1757958 A1 | 2/2007 |
| EP | 2263968 | 12/2010 |
| EP | 1858796 | 1/2011 |
| EP | 2287110 | 2/2011 |
| EP | 2459777 A1 | 6/2012 |
| FR | 2726135 A1 | 4/1996 |
| GB | 2071896 A | 9/1981 |
| GB | 2343980 A | 5/2000 |
| JP | S56137386 A | 10/1981 |
| JP | 57062028 A | 4/1982 |
| JP | S5774730 A | 5/1982 |
| JP | 57127264 U | 8/1982 |
| JP | S5933077 U | 2/1984 |
| JP | S62275230 A | 11/1987 |
| JP | 3142409 A | 6/1991 |
| JP | 4249203 A | 9/1992 |
| JP | 5045648 A | 2/1993 |
| JP | H06174929 A | 6/1994 |
| JP | 6194649 A | 7/1994 |
| JP | H06202009 | 7/1994 |
| JP | H06222290 A | 8/1994 |
| JP | H06250593 A | 9/1994 |
| JP | H0836161 A | 2/1996 |
| JP | H0895526 A | 4/1996 |
| JP | 8234158 A | 9/1996 |
| JP | 8334752 A | 12/1996 |
| JP | 9080386 A | 3/1997 |
| JP | 09-189869 | 7/1997 |
| JP | 9198906 A | 7/1997 |
| JP | H09218360 A | 8/1997 |
| JP | H09292576 A | 11/1997 |
| JP | H1054916 A | 2/1998 |
| JP | H1054947 A | 2/1998 |
| JP | H10186249 A | 7/1998 |
| JP | 10282474 A | 10/1998 |
| JP | H10282521 A | 10/1998 |
| JP | H10333145 A | 12/1998 |
| JP | 11015393 A | 1/1999 |
| JP | 11024038 A | 1/1999 |
| JP | H1184419 A | 3/1999 |
| JP | H1195693 A | 4/1999 |
| JP | H11126118 A | 5/1999 |
| JP | H11202325 A | 7/1999 |
| JP | 2000028933 A | 1/2000 |
| JP | 2000028938 | 1/2000 |
| JP | 2000057832 | 2/2000 |
| JP | 2000105547 A | 4/2000 |
| JP | 2000111813 A | 4/2000 |
| JP | 2000121970 A | 4/2000 |
| JP | 2000131627 A | 5/2000 |
| JP | 2000172219 A | 6/2000 |
| JP | 2000214393 A | 8/2000 |
| JP | 2000214394 A | 8/2000 |
| JP | 2000214395 A | 8/2000 |
| JP | 2000214397 A | 8/2000 |
| JP | 2000214831 A | 8/2000 |
| JP | 2000235152 A | 8/2000 |
| JP | 2000259116 A | 9/2000 |
| JP | 2000321566 A | 11/2000 |
| JP | 2001067010 A | 3/2001 |
| JP | 2001075534 A | 3/2001 |
| JP | 2001100121 A | 4/2001 |
| JP | 2001125014 A | 5/2001 |
| JP | 2001154642 U | 6/2001 |
| JP | 2001175216 U | 6/2001 |
| JP | 2001201698 A | 7/2001 |
| JP | 2001201767 A | 7/2001 |
| JP | 2001242826 A | 9/2001 |
| JP | 2001281563 A | 10/2001 |
| JP | 2001318377 A | 11/2001 |
| JP | 2001331142 A | 11/2001 |
| JP | 2001331144 A | 11/2001 |
| JP | 2001337649 A | 12/2001 |
| JP | 2001356281 A | 12/2001 |
| JP | 2001356327 A | 12/2001 |
| JP | 2002040336 A | 2/2002 |
| JP | 2002040337 A | 2/2002 |
| JP | 2002139683 A | 5/2002 |
| JP | 2002140038 A | 5/2002 |
| JP | 2002214543 A | 7/2002 |
| JP | 2002278501 A | 9/2002 |
| JP | 2002279812 A | 9/2002 |
| JP | 2002528763 A | 9/2002 |
| JP | 2002287718 A | 10/2002 |
| JP | 2002297085 A | 10/2002 |

(56) References Cited

FOREIGN PATENT DOCUMENTS

| | | |
|---|---|---|
| JP | 2002318564 A | 10/2002 |
| JP | 2002333619 A | 11/2002 |
| JP | 2002341343 A | 11/2002 |
| JP | 2002351431 A | 12/2002 |
| JP | 2002365650 A | 12/2002 |
| JP | 2003029295 A | 1/2003 |
| JP | 2003036057 A | 2/2003 |
| JP | 2003506755 A | 2/2003 |
| JP | 2003084314 A | 3/2003 |
| JP | 2003086233 A | 3/2003 |
| JP | 2003098984 A | 4/2003 |
| JP | 2003121824 A | 4/2003 |
| JP | 2003162904 A | 6/2003 |
| JP | 2003202519 A | 7/2003 |
| JP | 2003248463 A | 9/2003 |
| JP | 2003344785 A | 12/2003 |
| JP | 2004004216 A | 1/2004 |
| JP | 2004053839 A | 2/2004 |
| JP | 2004059788 A | 3/2004 |
| JP | 2004117833 | 4/2004 |
| JP | 2004140800 A | 5/2004 |
| JP | 2004151722 | 5/2004 |
| JP | 2004163915 A | 6/2004 |
| JP | 2004191736 A | 7/2004 |
| JP | 2004205973 A | 7/2004 |
| JP | 2004212673 A | 7/2004 |
| JP | 2004221051 A | 8/2004 |
| JP | 2004287215 A | 10/2004 |
| JP | 2004287431 A | 10/2004 |
| JP | 2004302270 A | 10/2004 |
| JP | 2004317557 A | 11/2004 |
| JP | 2004317785 A | 11/2004 |
| JP | 2004325909 A | 11/2004 |
| JP | 2004327025 A | 11/2004 |
| JP | 2004534280 A | 11/2004 |
| JP | 2004347982 A | 12/2004 |
| JP | 2005010786 A | 1/2005 |
| JP | 2005043674 A | 2/2005 |
| JP | 2005043726 A | 2/2005 |
| JP | 2005504355 A | 2/2005 |
| JP | 2005512119 A | 4/2005 |
| JP | 2005134896 A | 5/2005 |
| JP | 2005309416 A | 11/2005 |
| JP | 2006098990 A | 4/2006 |
| JP | 2006522360 A | 9/2006 |
| JP | 2007155983 A | 6/2007 |
| JP | 2007517488 A | 6/2007 |
| JP | 2008015081 A | 1/2008 |
| JP | 2008098984 A | 4/2008 |
| JP | 2008233898 A | 10/2008 |
| JP | 2009111813 A | 5/2009 |
| JP | 2010517052 A | 5/2010 |
| JP | 2010517072 A | 5/2010 |
| JP | 2012128451 A | 7/2012 |
| JP | 2012186782 A | 9/2012 |
| JP | 2012230079 A | 11/2012 |
| JP | 2013061658 A | 4/2013 |
| WO | WO9401716 A1 | 1/1994 |
| WO | 9528035 A1 | 10/1995 |
| WO | WO9704436 A1 | 2/1997 |
| WO | WO9804950 A1 | 2/1998 |
| WO | WO-9819201 A1 | 5/1998 |
| WO | WO9901696 A1 | 1/1999 |
| WO | WO-0017695 A1 | 3/2000 |
| WO | WO0050807 A1 | 8/2000 |
| WO | WO0052674 A1 | 9/2000 |
| WO | WO0055916 A1 | 9/2000 |
| WO | WO0169584 A1 | 9/2001 |
| WO | WO-0189986 A1 | 11/2001 |
| WO | WO0207482 A2 | 1/2002 |
| WO | WO03004836 A1 | 1/2003 |
| WO | WO03007049 | 1/2003 |
| WO | WO03008860 A1 | 1/2003 |
| WO | 03029874 | 4/2003 |
| WO | WO03040802 A2 | 5/2003 |
| WO | WO-03048836 A2 | 6/2003 |
| WO | WO03050448 A1 | 6/2003 |
| WO | WO-03061007 A1 | 7/2003 |
| WO | WO03061329 A2 | 7/2003 |
| WO | WO03069593 A2 | 8/2003 |
| WO | WO03081315 A1 | 10/2003 |
| WO | WO-03105198 A1 | 12/2003 |
| WO | WO2004008629 A1 | 1/2004 |
| WO | WO2004019120 A1 | 3/2004 |
| WO | WO2004034136 A1 | 4/2004 |
| WO | 2004038496 | 5/2004 |
| WO | WO2004086098 A2 | 10/2004 |
| WO | WO2004088629 A1 | 10/2004 |
| WO | 2004097506 A2 | 11/2004 |
| WO | WO2005001892 A2 | 1/2005 |
| WO | WO-2005015287 A1 | 2/2005 |
| WO | WO2005062908 A2 | 7/2005 |
| WO | WO2005073950 | 8/2005 |
| WO | WO2005082908 A1 | 9/2005 |
| WO | WO-2006017129 A2 | 2/2006 |
| WO | WO2006023077 A2 | 3/2006 |
| WO | WO2006039315 A2 | 4/2006 |
| WO | WO2006052755 A2 | 5/2006 |
| WO | 2006091738 A1 | 8/2006 |
| WO | 2006091860 | 8/2006 |
| WO | 2006091904 | 8/2006 |
| WO | WO2006091791 | 8/2006 |
| WO | WO2007075832 | 7/2007 |
| WO | WO2007123173 A1 | 11/2007 |
| WO | WO2007145973 | 12/2007 |
| WO | WO2008026066 A1 | 3/2008 |
| WO | WO-2008091339 A2 | 7/2008 |
| WO | WO-2008092859 A1 | 8/2008 |
| WO | WO-2009102471 A1 | 8/2009 |
| WO | 2010062647 A2 | 6/2010 |
| WO | WO-2013032865 A1 | 3/2013 |

OTHER PUBLICATIONS

"Nano SU-8-2000", product brochure for thick polymer, Micro•Chem, Rev.2/02.

Boucinha et al, Air-gap amorphous silicon thin film transistors. Applied Physics Letters, 73:4, 502-4 (Jul. 27, 1998).

Conde, et al., "Low-temperature Thin-film Silicon MEMS", in Thin Solid Films 427, p. 181-186 (2003).

Conde, et. al., "Amorphous and microcrystalline silicon deposited by hot-wire chemical vapor deposition at low substrate temperatures: application to devices and thin-film microelectromechanical systems", in Thin Solid Films 395, p. 105-111(2001).

den Boer, "Active Matrix Liquid Crystal Displays," Elsevier Science & Technology Books, ISBN #0750678135, Aug. 2005.

Feenstra et al, "Electrowetting Displays," Liquavista BV, http://www.liquavista.com/documents/electrowetting_displays_whitepaper.pdf, Retrieved on Aug. 17, 2006, pp. 1-16.

Heikenfeld et al., "Contrast Enhancement in Black Dielectric Electroluminescent Devices", IEE Transactions on Electron Devices, 49:8(1348-1352)(Aug. 2002).

International Search Report and Written Opinion dated May 7, 2010 in International Application No. PCT/US2009/049826.

Judy, M. W., "Micromechanisms Using Sidewall Beams," Dissertation, University of California at Berkeley, 1994.

Kim et al. Manufacturing Technologies for the Next Generation a-Si TFT-LCD. Proceedings of the Int'l. Display Mfg. Cnf. Seoul, Koreo. (2000).

Legtenberg et al, "Electrostatic Curved Electrode Actuators," Journal of Microelectromechanical Systems, 6:3(257-265)(Sep. 1997).

Li et al, "Drie-Fabricated Curved-Electrode Zipping Actuators with Low Pull-In Voltage," IEE, 480-483 (Jun. 8-12, 2003).

Park et al. P-70: Active Matrix OLED Displays Using Simple Poly-Si TFT Process. Society of Information Display, Digest. pp. 487-489 (2003).

Ravnkilde et al, "Fabrication of Nickel Microshutter Arrays for Spatial Light Modulation", Meso 2002, also on their website, http://www2.mic.dtu.dk/research/mems/publiations/Papers/Dicon_Meso2002.pdf.

(56) References Cited

OTHER PUBLICATIONS

Saeedi, E., et al, "Molten-Alloy Driven Self-Assembly for Nano and Micro Scale System Integration", FDMP, 2:4(221-245)(2006).

Tan, Q., et al, "Soldering Technology for Optoelectronics Packaging", Electronic Compoents and Technology Conference, p. 26 (1996).

Wang et al, "Highly Space-Efficient Electrostatic Zigzag Transmissive Micro-Optic Switches for an Integrated MEMS Optical Display System," Tranducers '03 Conference, 1:575-575 (Jun. 8-12, 2003).

International Search Report and Written Opinion in International Application No. PCT/2009/049826 issued May 7, 2010.

Akimoto O. et al., "15.1: A 0.9-in UXGA/HDTV FLC Microdisplay," Society for Information Display, 2000, pp. 194-197.

Alt P.M., et al., "A Gray-Scale Addressing Technique for Thin-Film-Transistor/Liquid Crystal Displays," IBM J. Res. Develop., 36 (1), Jan. 1992, pp. 11-22.

AZ Displays, Inc., "Complete LCD Solutions," ATM3224C-NC-FTH, pp. 1-15 (Oct. 2, 2003).

Bergquist et al., "Field Sequential Colour Display with Adaptive Gamut", Society for Information Display, Digest of Technical Papers, 2006, pp. 1594-1597.

Birch et al, "31.1: SXGA Resolution FLC Microdisplays," SID 02 Digest, 954-957 (2002).

B.J. Feenstra et. al. "A Reflective Display Based on Electrowetting: Principle and Properties", International Display Research Conference Proceedings 2003, p. 322.

Blackstone, "Making MEMS Reliable," SPIE's OEMagazine, 32-34 (Sep. 2002).

"BLU, "Heesung Precision Ltd., http://www.hspr.co.kr/eng/product/blu.asp Retrieved on Aug. 3, 2006.

Boeuf, J.P., "Plasma display panels: physics,recent deveopments and key issues," J. Phys. D: Appl. Phys. 36 (2003) R53-R79 (received Aug. 29, 2002: published Feb. 26, 2003).

Bozler et al, "Arrays of gated field-emitter cones having 0.32 mm tip-to-tip spacing," J. Vec. Sci. Technol. B, 12 (2): 629-632 (Mar./Apr. 1994).

Bryan-Brown, "Ultra Low Power Bistable LCDs," SID 00, 76-79 (2000).

Chino E. et al., "25.1: Invited Paper: Development of Wide-Color-Gamut Mobile Displays with Four-primary-color LCDs," Society for Information Display, 37 (2), 2006, pp. 1221-1224.

Clark N. A., et al., "FLC Microdisplays", Ferroelectrics, 246, 2000, pp. 97-110.

Davis, "Light Emitting Diode Source Modeling for Optical Design," Reflexite Display Optics (Oct. 2004).

Davis, "Microstructured Optics for LED Applications," Reflexite Display Optics (2002).

Doane, et al, "Display Technologies in Russia, Ukraine, and Belarus," World Technology Evaluation Center Panel Report (Dec. 1994) http://www.wtec.org/loyola/displays/toc.htm, retrieved on Nov. 22, 2005.

Doherty D. et al., "Pulse Width Modulation Control of DLP Projectors", TI Technical Journal, Jul.-Sep. 1998, No. 3, pp. 115-121.

"Electronic Display Lighting Tutorials," 3M Corporation,file //D:/Optical/VikuitiTutorial.htm. retrieved on Aug. 10, 2006.

Feng, et al, "Novel Integrated Light-Guide Plates for Liquid Crystal Display Backlight," Journal of optics a Pure and applied optics, 2005, 7, 111-117.

Feng, "High Quality Light Guide Plates that Can Control the Illumination Angle Based on Microprism Structures," Applied Physics Letters, 85 (24): 6016-6018 (Dec. 2004).

Final Office Action dated May 18, 2007, U.S. Appl. No. 11/218,690.

Final Office Action dated Oct. 3, 2007 in U.S. Appl. No. 11/218,690.

Final Office Action dated Sep. 21, 2007, U.S. Appl. No. 11/546,937.

Foley, "NE04-21: Microstructured Plastic Optics for Display, Lighting, and Telecommunications Applications," Fresnel Optics (2001).

Funamoto et al, "Diffusive-sheetless Backlight System for Mobile Phone," IDW/AD, 1277-1280 (2005).

Funamoto et. al. "LED Backlight System with Double-Prism Pattern", Journal of the Society for Information Display v. 14, pp. 1045-1051 (2006).

Goddhue et al, "Bright-field analysis of field-emission cones using high-resolution tranmission electron microscopy and the effect of structural properties on current stability," J. Vac. Sci. Technol. B, 12 (2): 693-696 (Mar.Apr. 1994).

Hartman, "4.1: Invited paper: Two-Terminal Devices Technologies for AMLCDs," SID 95 Digest, 7-10 (1995).

Hewlett et al, "DLP CinemaTM projection: A hybrid frame-rate technique for flicker-free performance," Journ of the SID 9/3, 221-226 (2001).

Hornbeck J. "Digital Light Processing TM: A New MEMS-Based Display Technology," Technical Digest of the IEEJ 14th Sensor Symposium, Jun. 4-5 1996, pp. 297-304.

Jepsen et al, "4.11: 0.9" SXGA Liquid Crystal on Silicon Panel with 450 Hz. Field Rate, SID MicroDisplay Corporation, pp. 106-109 (Sep. 2001).

Joaquirn, M., "Polyphenyl Ether Lubricants" Synthetic Lubricants and High-performance Functional Fluids, R. L. Rudnick and R. L. Shubkin, Eds., p. 239, Marcel Dekker, Inc., NY, 1999.

Johnstone et al, "Theoretical limits on the freestanding length of cantilevers produced by surface micromachining technology," J. Micromech. Microeng. 12: 855-861 (Published Oct. 3, 2002).

Jones et al, "29-1: Addressing TVmin Ferroelectric Liquid Crystal Displays," (1998).

Judy, et al, "Self-Adjusting Microstructures(SAMS)," Proceedings of the Workshop on Micro Electro Mechanical Systems, New York, Jan. 30, 1991, vol. Workshop 4, pp. 51-56.

Kalantar et al, "Optical Micro Deflector Based Functional Light-Guide Plate for Backlight Unit," SID 00 Digest, 1029-1031 (2000).

Kalantar, K., et al., "Backlight Unit with Double Surface Light Emission Using a Single Micro-structured Light-guide Plate," p. 1182, Society for Information Display Digest (2004).

Kalanter, "Modulation of viewing angle on an LCD surface through backlight optics," Journal of the SID, 11 (4): 647-652 (2003).

Koden et al., "Ferroelectric Liquid Crystal Display," (Sep. 17, 1997).

Kuang et al., "Dynamic characteristics of shaped micro-actuators solved using the differential quadrature method," Journal of Micromechanics and Microengineering, 14: 647-655, (2004).

Kunzman A. et al., "10.3 White Enhancement for Color Sequential DLP", Society for Information Display, Digest of Technical Papers, 1998.

Lee, et al., "40.1: Distingusihed Contributed Paper: Integrated Amorphous Silicon Color Sensor on LCD Panel for LED Backlight Feedback Control System", Society for Information Display, Digest of Technical Papers, 2005, pp. 1376-1379.

Lee et al, "P-25: A LCOS Microdisplay Driver with Frame Buffering Pixels," SID 02 Digest, 292-295 (2002).

Liang et al, "Observation of electric field gradients near field-emission cathode arrays," Appl Phys. Lett., 66 (9): 1147-1149 (Feb. 27, 1995).

Liu et al, "Scaling Laws of Microactuators and Potential Applications of Electroactive Polymers in MEMS," SPIE, 3669: 345-354 (Mar. 1999).

"Low Temperature Polysilicon TFT Reflective Color LCD" by Techno World.

Maboudian et al., "Stiction reduction processes for surface micromachines," Tribology Letters, 3: 215-221 (1997).

Markandey V. et al., "Video Processing for DLP Display Systems," Texas Instruments Corporation, Mar. 13, 1996, pp. 21-32.

Mastrangelo et al, "Mechanical Stability and Adhesion of Microstructures Under Capillary Forces—Part I: Basic Theory," Journal of Microelectromechanical Systems, 2 (1): 33-43 (Mar. 1993).

Mastrangelo et al, "Mechanical Stability and Adhesion of Microstructures Under Capillary Forces—Part II: Experiments," Journal of Microelectromechanical Systems, 2 (1): 44-55 (Mar. 1993).

McLaughlin, "Progress in Projection and Large-Area Displays," Proceedings of the IEEE, 90 (4): 521-532 (Apr. 2002).

"Microprism Technology for Luminaires," Reflexite Display Optics (2004).

"Nano TM Su-8 2000 Negative Tone Photoresist Formulations 2002-2025," Micro Che, Rev. 2/02m.

Non Final Office Action Dated Mar. 22, 2007, U.S. Appl. No. 11/546,937.

Non Final Office Action dated Nov. 1, 2006, U.S. Appl. No. 11/218,690.

(56) References Cited

OTHER PUBLICATIONS

Notice of Allowance and Fee(s) Due, mailed Jan. 31, 2008 (U.S. Appl. No. 11/361,785).
Office Action dated Dec. 5, 2011 in Japanese Patent Application No. 2008-058190.
Office Action dated Jul. 15, 2010 in Japanese Patent Application No. 2007-556428.
Office Action dated Mar. 28, 2012 in European Patent Office Application No. 07795777.7.
Office Action dated Oct. 14, 2010 in Japanese Patent Application No. 2008-058190.
Office Action dated Sep. 16, 2011 in Japanese Patent Application No. 2007-556428.
Okumura et al, "Highly-efficient backlight for liquid crystal display having no optical films," Applied Physics Letters, 83 (13): 2515-2517 (Sep. 29, 2003).
"Optical Design Tools for Backlight Displays," Light Tools, Optical Research Associates, 1-8 (2003).
Pasricha S. et al., "Dynamic Backlight Adaptation for Low Power Handheld Devices" IEEE Design and Test v. 21, 2004, pp. 398.
Perregaux, G., et al, "Arrays of Addressable High-Speed Optical Microshutters," CSEM Swiss Center for Electronics and Microtechnology Inc., Microsystems Division, pp. 232-235 (2001).
"Prism Brightness Enhancement Films," 3M Corporation, http://products3.3m.com/catalog/us/en001/electronics_mfg/vikuiti/node_V6G78RBQ5Tbe/root_GST1T4S9TCgv/vroot_S6Q2FD9X0Jge/gvel_GD378DOHGJgl/theme_us_vikuiti_3_0/command_AbcPageHandler/output_html Retrieved on Aug. 3, 2006.
"Prism Sheet," Mitsubishi Rayon America Inc., http://www.mrany.com/data/HTML/29.htm Retrieved on Aug. 4, 2006.
Qiu et al, "A Curved-Beam Bistable Mechanism," Journal of Microelectromechanical Systems, 13 (2): 137-145 (Apr. 2004).
Qiu et al, "A High-Current Electrothermal Bistable MEMS Relay," Micro Electro Mechanical Systems, MEMS-03 Kyoto, pp. 64-67 (Jan. 19-23, 2003).
Roosendaal et al, "25.2: A Wide Gamut, High Aperture Mobile Spectrum Sequential Liquid Crystal Display," SID 05 Digest, 1116-1119 (2005).
Sato, "Research on Flexible Display Systems," Broadcast Technology, 21: 10-15 (Winter, 2005).
Sharp Specification No. LCP-03015 for Mobile Liquid Crystal Display Group, Sharp Corporation, Jun. 13, 2003.
Shikida et al, "Fabrication of an S-shaped Microactuator," Journal of Microelectromechanical Systems, 6 (1): 18-24 (Mar. 1997).
Sony Corporation, "ACX705AKM, 6.92cm Diagonal Reflective Color LCD Module".
Steyn, Lodewyck, "Electroquasistatic Zipper Actuators: A Technology Review", Dec. 2004.
Tagaya et al., "Thin Liquid-Crystal Display Backlight System with Highly Scattering Optical Transmission Polymers," Applied Optics, 40 (34): 6274-6280 (Dec. 2001).
Takatori, et al., "6.3: Field-Sequential Smectic LCD with TFT Pixel Amplifier," SID 01, 2001, Digest, pp. 48-51.
Teijido, J.M., "Conception and Design of Illumination Light Pipes," Thesis No. 1498 for University of Neuchatel, http://www.unige.ch/cyberdocuments/unine/theses2000/TeijidoJM/these_front.htm 1: 1-99 Retrieved on Aug. 3, 2006.
Tien et al, "MEMS Actuators for Silicon Micro-Optical Elements," Proc. of SPIE, 4178: 256-269, (2000).
"Two Proprietary Technologies Supporting OMRON Backlight," OMRON Electronics Corporation, OMRON Electronics Components Web, www.omron.co.jp/ecb/products/bklight/english/genri/index.html, retrieved on Aug. 3, 2006.
Underwood, "A review of microdisplay technologies," SID©EID, (Nov. 21 to 23, 2000).
Underwood, "LCoS through the looking glass," SID (2001).

van de Biggelaar, et. al. "Passive and Active Matrix Addressed Polymer Light-emitting Diode Displays", Proc. SPIE vol. 4295, p. 134 (2001).
Vangbo et al, "A lateral symmetrically bistable buckled beam," J. Micromech. Microeng., 8: 29-32 (1998).
Wang et al., "A highly efficient system for automatic face region detection in MPEG video." IEEE Trans. on Circuits and Systems for Video Technology, vol. 7 Issue 4, Aug. 1997, pp. 615-628.
Yamada et al, "52.2: Invited Paper: Color Sequential LCD Based on OCB with an LED Backlight," SID 00 Digest, 1180-1183 (2000).
Yasumura et al, "Fluid Damping of an Electrostatic Actuator for Optical Switching Applications," Transducers Research Foundation (2002).
"MicroLensTm—Re-Inventing LCD Backlighting," Global Lighting Technologies Inc., http://www.glthome.com/tech.htm, 1-2; retrieved on Aug. 3, 2006.
Extended European Search Report dated Mar. 15, 2013 in EP Application No. EP12181160.8.
Boer W.D., "AMLCD Electronics", Active Matrix Liquid Crystal Displays: Fundamentals and Applications, 2005 pp. 87-111, XP055089329, U.S.A, ISBN: 978-0-75-067813-1.
Boer W.D., "Improvement of Image Quality in AMLCDs", Active Matrix Liquid Crystal Displays: Fundamentals and Applications, 2005, pp. 139-177, XP055089313, U.S.A, ISBN: 978-0-75-067813-1.
"Microprism Technology for Liminaires," Reflexite Corporation, Technical Publication RLO-181, Rev. 2 (2003).
Co-pending U.S. Appl. No. 14/508,342, filed Oct. 7, 2014.
Uchida T. et al., "Encyclopedia of Flat Panel Displays", Japan, Kogyo Chosakai Publishing Co., Ltd./Yukio Shimura, Dec. 25, 2001, pp. 617 to 619.
US Office Action dated Mar. 24, 2011 issued in U.S. Appl. No. 12/370,471.
US Office Action dated Dec. 2, 2011 issued in U.S. Appl. No. 12/370,471.
US Office Action dated Sep. 14, 2012 issued in U.S. Appl. No. 12/370,471.
US Notice of Allowance dated Feb. 21, 2013 issued in U.S. Appl. No. 12/370,471.
US Notice of Allowance dated Apr. 30, 2013 issued in U.S. Appl. No. 12/370,471.
US Notice of Allowance dated Dec. 28, 2011 issued in U.S. Appl. No. 12/606,675.
US Office Action (Ex Parte Quayle Action) dated Jun. 14, 2013 issued in U.S. Appl. No. 13/449,906.
US Notice of Allowance dated Jul. 29, 2013 issued in U.S. Appl. No. 13/449,906.
US Office Action dated Apr. 11, 2014 issued in U.S. Appl. No. 14/090,702.
US Notice of Allowance dated Sep. 17, 2014 issued in U.S. Appl. No. 14/090,702.
US Notice of Allowance dated Nov. 10, 2014 issued in U.S. Appl. No. 14/090,702.
Chinese Office Action dated Jun. 3, 2014 issued in CN Patent Application No. CN201310293759.9.
US Notice of Allowance dated Mar. 12, 2015 issued in U.S. Appl. No. 14/090,702.
US Notice of Allowance dated Jun. 1, 2007 issued in U.S. Appl. No. 11/251,034.
US Office Action dated Nov. 20, 2006 issued in U.S. Appl. No. 11/251,034.
US Notice of Allowance dated Aug. 13, 2009 issued in U.S. Appl. No. 11/906,383.
US Office Action dated Feb. 9, 2009 issued in U.S. Appl. No. 11/906,383.
US Office Action dated Aug. 20, 2008 issued in U.S. Appl. No. 11/906,383.
US Office Action dated Feb. 26, 2008 issued in U.S. Appl. No. 11/906,383.

\* cited by examiner

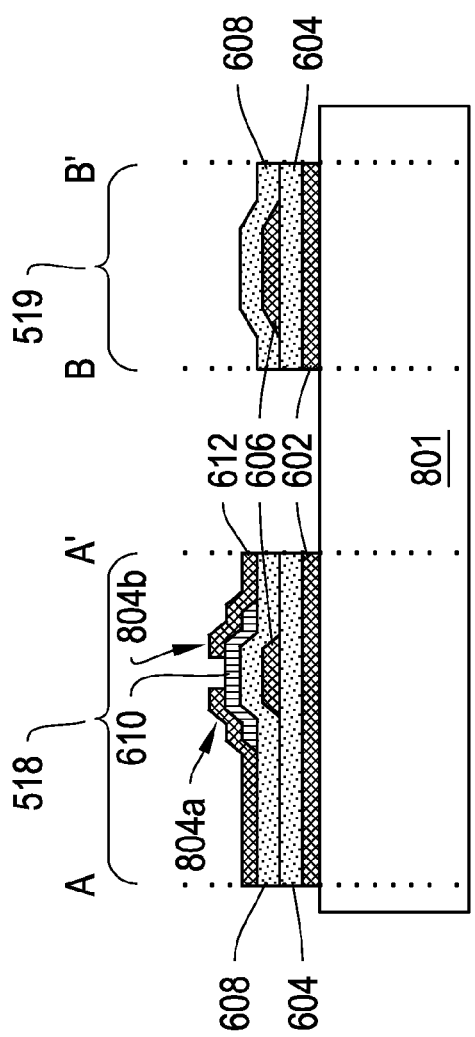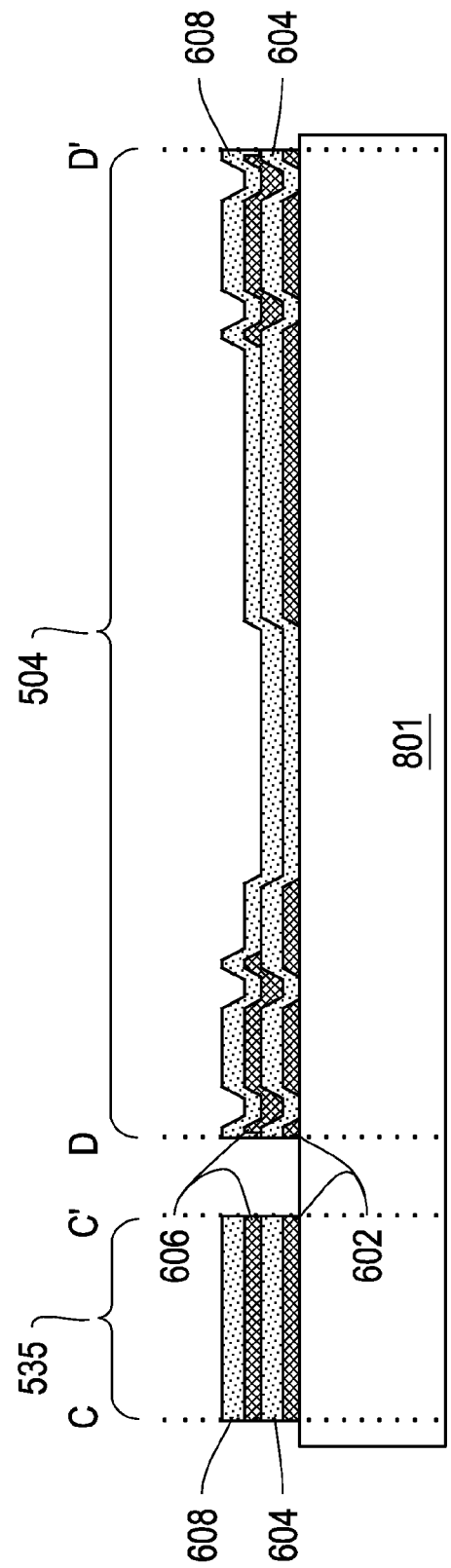
Figure 7D

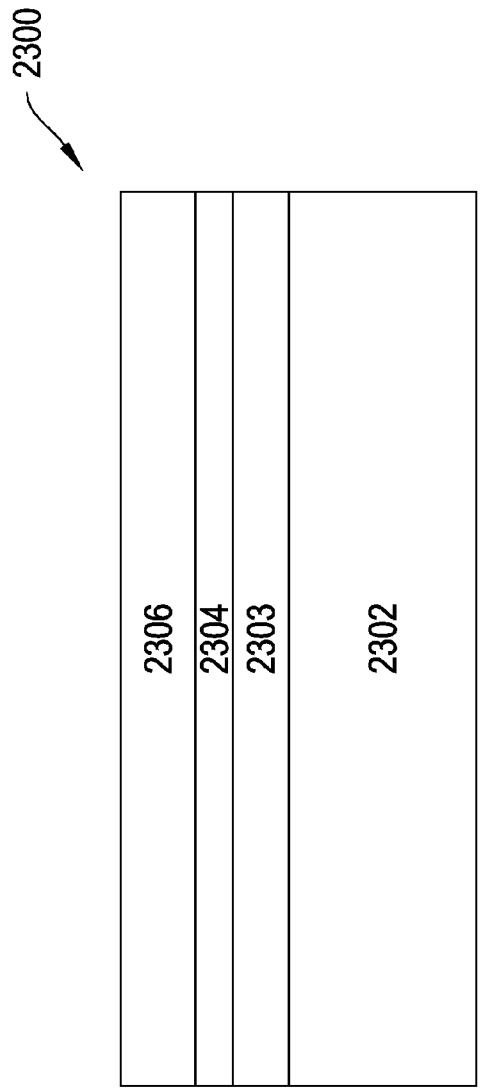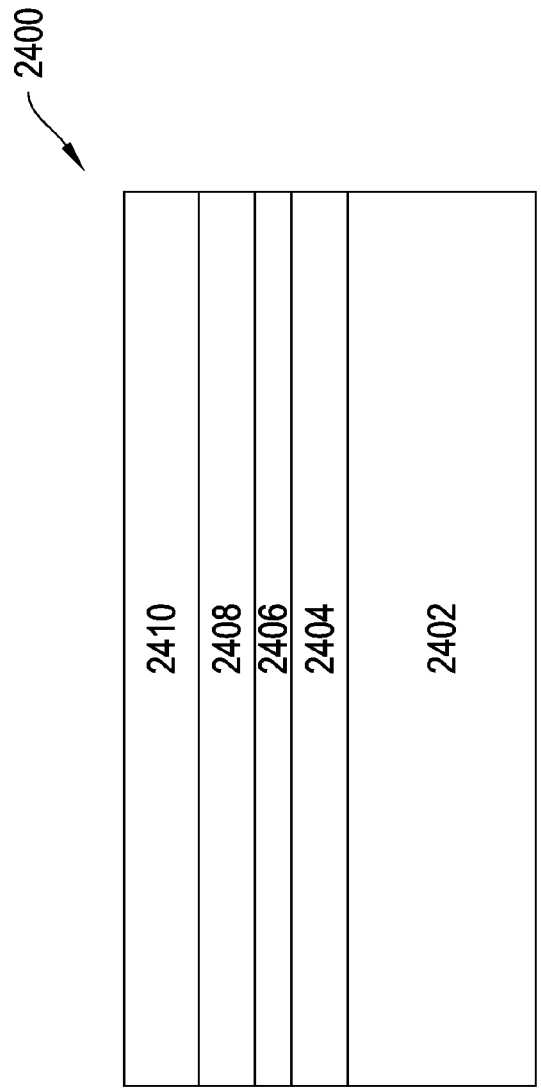

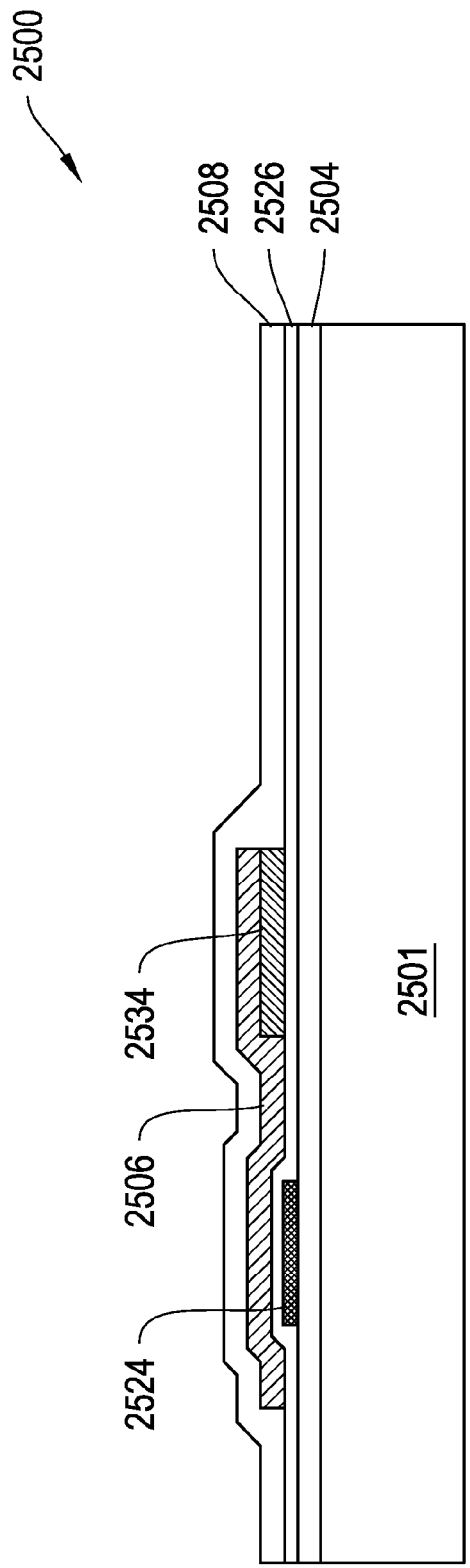
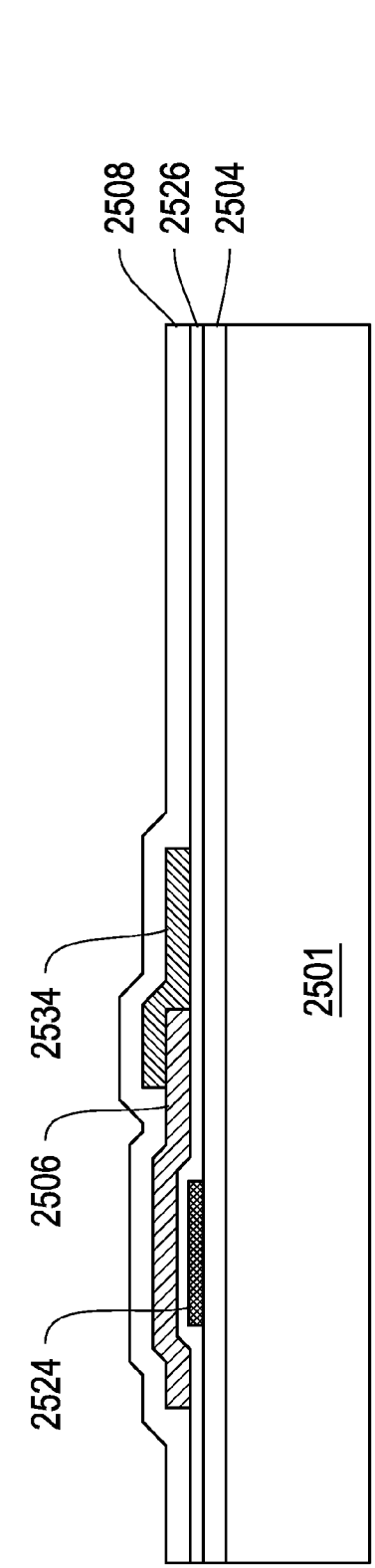
Figure 13A
Figure 13B

DISPLAY APPARATUS AND METHODS FOR MANUFACTURE THEREOF

CROSS-REFERENCE TO RELATED APPLICATIONS

The instant application is a continuation-in-part of U.S. patent application Ser. No. 12/483,062, filed on Jun. 11, 2009, which is a continuation-in-part of U.S. patent application Ser. No. 11/906,383, filed Oct. 1, 2007, now U.S. Pat. No. 7,636,189, which is a continuation of U.S. patent application Ser. No. 11/251,034, filed Oct. 14, 2005, now U.S. Pat. No. 7,304,785, which is a continuation-in-part of U.S. patent application Ser. No. 11/218,690, filed Sep. 2, 2005, now U.S. Pat. No. 7,417,782, which claims the benefit of U.S. Provisional Application No. 60/655,827, filed Feb. 23, 2005 and U.S. Provisional Application No. 60/676,053, filed Apr. 29, 2005. U.S. patent application Ser. No. 12/483,062 is also a continuation of U.S. patent application Ser. No. 12/045,518, filed Mar. 10, 2008, now abandoned, which is a continuation of U.S. patent application Ser. No. 11/361,785, filed Feb. 23, 2006, now U.S. Pat. No. 7,405,852, which is a continuation-in-part of U.S. patent application Ser. No. 11/218,690, filed Sep. 2, 2005, now U.S. Pat. No. 7,417,782. U.S. patent application Ser. No. 11/361,785 is also a continuation-in-part of U.S. patent application Ser. No. 11/251,035, filed Oct. 14, 2005, now U.S. Pat. No. 7,271,945, which is a continuation-in-part of U.S. patent application Ser. No. 11/218,690, filed Sep. 2, 2005, now U.S. Pat. No. 7,417,782.

The instant application is also a continuation-in-part of International Application PCT/US2009/049826, filed on Jul. 7, 2009, which claims the benefit of U.S. Provisional Application No. 61/134,175, filed on Jul. 7, 2008.

The instant application claims the benefit of each of the above-referenced applications, and the contents of each of the above-referenced applications are incorporated herein by reference in their entirety.

FIELD OF THE INVENTION

In general, the invention relates to the field of imaging displays, in particular, the invention relates to MEMS-based displays and the manufacture thereof.

BACKGROUND OF THE INVENTION

Displays built from mechanical light modulators are an attractive alternative to displays based on liquid crystal technology. Mechanical light modulators are fast enough to display video content with good viewing angles and with a wide range of color and grey scale. Mechanical light modulators have been successful in projection display applications. Backlit displays using mechanical light modulators have not yet demonstrated sufficiently attractive combinations of brightness and low power. There is a need in the art for fast, bright, low-powered mechanically actuated displays. Specifically there is a need for mechanically actuated displays that can be driven at high speeds and at low voltages for improved image quality and reduced power consumption.

SUMMARY OF THE INVENTION

According to one aspect of the invention, a control matrix of electrical components for controlling light modulators of a display includes a light absorbing layer comprising a material having a substantially light absorbing property. In some embodiments, the light absorbing layer reflects <50% of the incident light. In some embodiments, the light absorbing layer includes an interconnect. In some embodiments, the light absorbing layer is patterned to form a plurality of aperture regions. In some embodiments, the control matrix controls MEMS-based light modulators. In some implementations, the MEMS-based light modulators comprise shutters.

In some embodiments, the material of the light absorbing layer is a dielectric. In some embodiments, the material of the light absorbing layer is a conductor. In some implementations, the conductor includes at least one of: a mixture of aluminum and molybdenum, a mixture of aluminum oxide and molybdenum, a mixture of titanium and nitrogen, and/or a mixture of niobium and oxygen.

In some embodiments, the control matrix includes an interconnect comprising a conductor layer and the light absorbing layer, wherein the light absorbing layer is a non-conductor. In some embodiments, the control matrix includes a gate, where the light absorbing layer is patterned to not contact the gate. The control matrix may further include an interconnect layer that is patterned, in regions near the gate, to contact the gate and, in regions away from the gate, to match the patterning of the light absorbing layer. In some embodiments, the control matrix includes a transistor including a plurality of layers, one of which is the light absorbing layer, which may be a semi-conductor.

In some embodiments, the light absorbing layer has a top surface, a bottom surface, and a thickness selected so that light reflected from the top and bottom surfaces destructively interfere. In some implementations, the light absorbing layer has a refractive index and the thickness of the light absorbing layer is selected to substantially equal one quarter of a selected wavelength divided by the refractive index of the light absorbing layer.

According to another aspect of the invention, the invention is related to a method for manufacturing a control matrix of electrical components for controlling light modulators of a display. A conductor layer is deposited over a substrate on which the control matrix is formed. A light absorbing layer is deposited over the substrate, where the light absorbing layer is a non-conductor. The conductor and light absorbing layers are patterned to form a portion of the control matrix. In some embodiments, the conductor and light absorbing layers are patterned simultaneously to have the same patterning. In other embodiments, the conductor and light absorbing layers are patterned separately and have different patterning. In some implementations, the conductor layer is patterned to contact a gate of the control matrix, where the conductor layer comprises an interconnect; and the light absorbing layer is patterned, in regions near the gate, to not contact the at least one gate and, in regions away from the gate, to match the patterning of the conductor layer.

BRIEF DESCRIPTION OF THE DRAWINGS

The foregoing discussion will be understood more readily from the following detailed description of the invention with reference to the following drawings:

FIGS. 7A-7H are cross sectional views of stages of construction of the control matrix of FIG. 4C, according to an illustrative embodiment of the invention;

FIG. 11 is a cross section view of a material stack showing one example of an absorptive and conductor double layer;

FIG. 12 is a cross section view of a multi-layer stack showing an example of a light-absorbing stack of materials; and FIGS. 13A-B, 14A-D, and 15 are cross-sectional views of control matrices comprising light absorbing materials, according to illustrative embodiments of the invention.

DESCRIPTION OF CERTAIN ILLUSTRATIVE EMBODIMENTS

To provide an overall understanding of the invention, certain illustrative embodiments will now be described, including apparatus for displaying images and methods for manufacturing the same. However, it will be understood by one of ordinary skill in the art that the apparatus and methods described herein may be adapted and modified as is appropriate for the application being addressed and that the apparatus and methods described herein may be employed in other suitable applications, and that such other additions and modifications will not depart from the scope hereof.

Figure 1A:
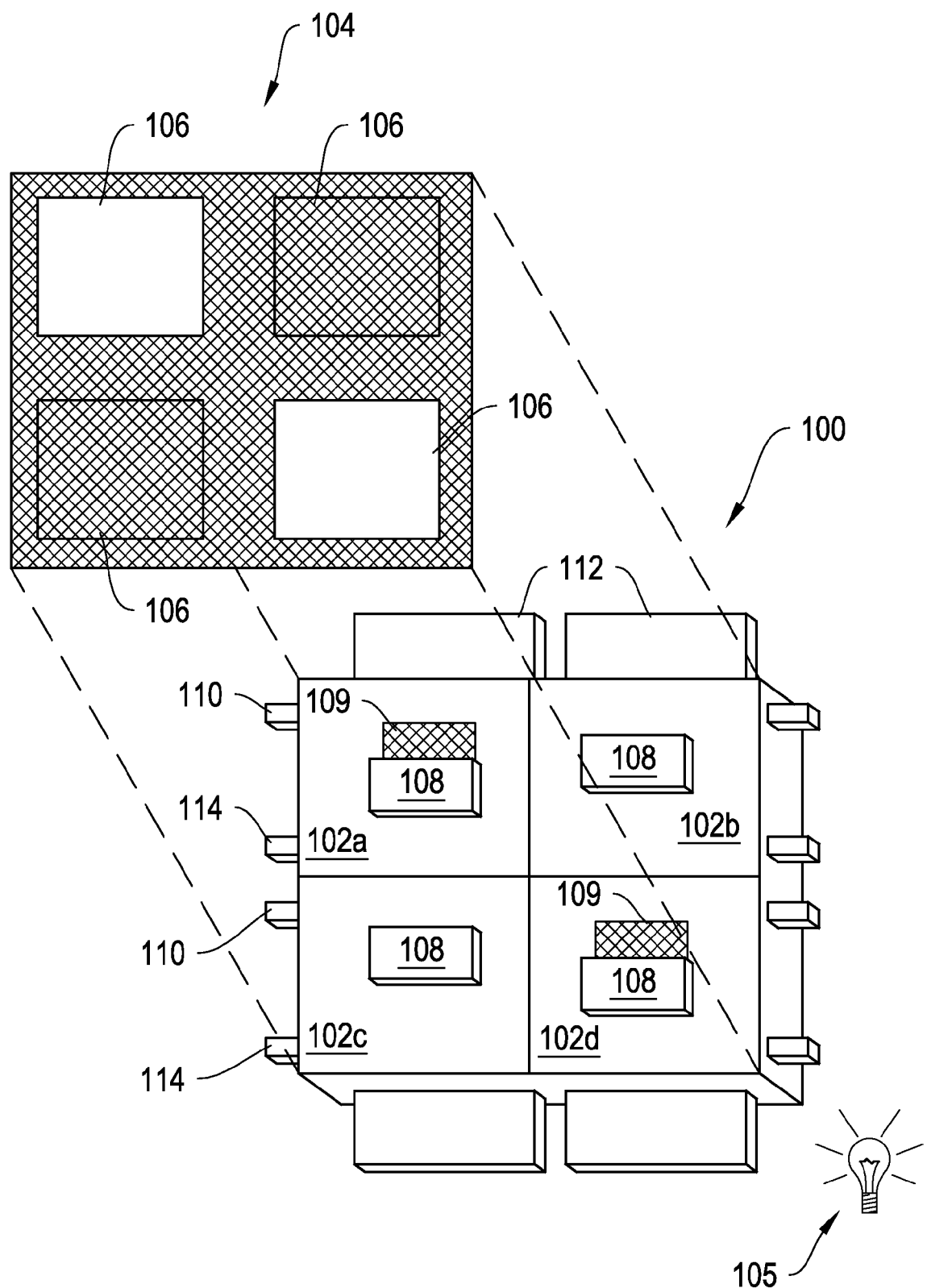
FIG. 1A is an isometric view of display apparatus, according to an illustrative embodiment of the invention.

FIG. 1A is an isometric view of a display apparatus 100, according to an illustrative embodiment of the invention. The display apparatus 100 includes a plurality of light modulators, in particular, a plurality of shutter assemblies 102a-102d (generally "shutter assemblies 102") arranged in rows and columns. In the display apparatus 100, shutter assemblies 102a and 102d are in the open state, allowing light to pass. Shutter assemblies 102b and 102c are in the closed state, obstructing the passage of light. By selectively setting the states of the shutter assemblies 102a-102d, the display apparatus 100 can be utilized to form an image 104 for a projection or backlit display, if illuminated by lamp 105. In another implementation the apparatus 100 may form an image by reflection of ambient light originating from the front of the apparatus.

In the display apparatus 100, each shutter assembly 102 corresponds to a pixel 106 in the image 104. In other implementations, the display apparatus 100 may utilize a plurality of shutter assemblies to form a pixel 106 in the image 104. For example, the display apparatus 100 may include three or more color-specific shutter assemblies 102, e.g., red, green and blue; red, green, blue and white; or cyan, magenta and yellow, etc. By selectively opening one or more of the color-specific shutter assemblies 102 corresponding to a particular pixel 106, the display apparatus 100 can generate a color pixel 106 in the image 104. In another example, the display apparatus 100 includes two or more shutter assemblies 102 per pixel 106 to provide grayscale in an image 104. With respect to an image, a "pixel" corresponds to the smallest picture element defined by the resolution of an image. With respect to structural components of the display apparatus 100, the term "pixel" refers to the combined mechanical and electrical components utilized to modulate the light that forms a single pixel of an image.

Each shutter assembly 102 includes a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each shutter assembly 102.

The display apparatus also includes a control matrix connected to the substrate and to the shutter assemblies for controlling the movement of the shutters. The control matrix includes a series of electrical interconnects (e.g., interconnects 110, 112, and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{we}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In other implementations, the data voltage pulses control switches, e.g., transistors or other non-linear circuit elements that control the application of separate actuation voltages, which are typically higher in magnitude than the data voltages, to the shutter assemblies 102. The application of these actuation voltages then results in the electrostatic driven movement of the shutters 108.

Figure 1B:
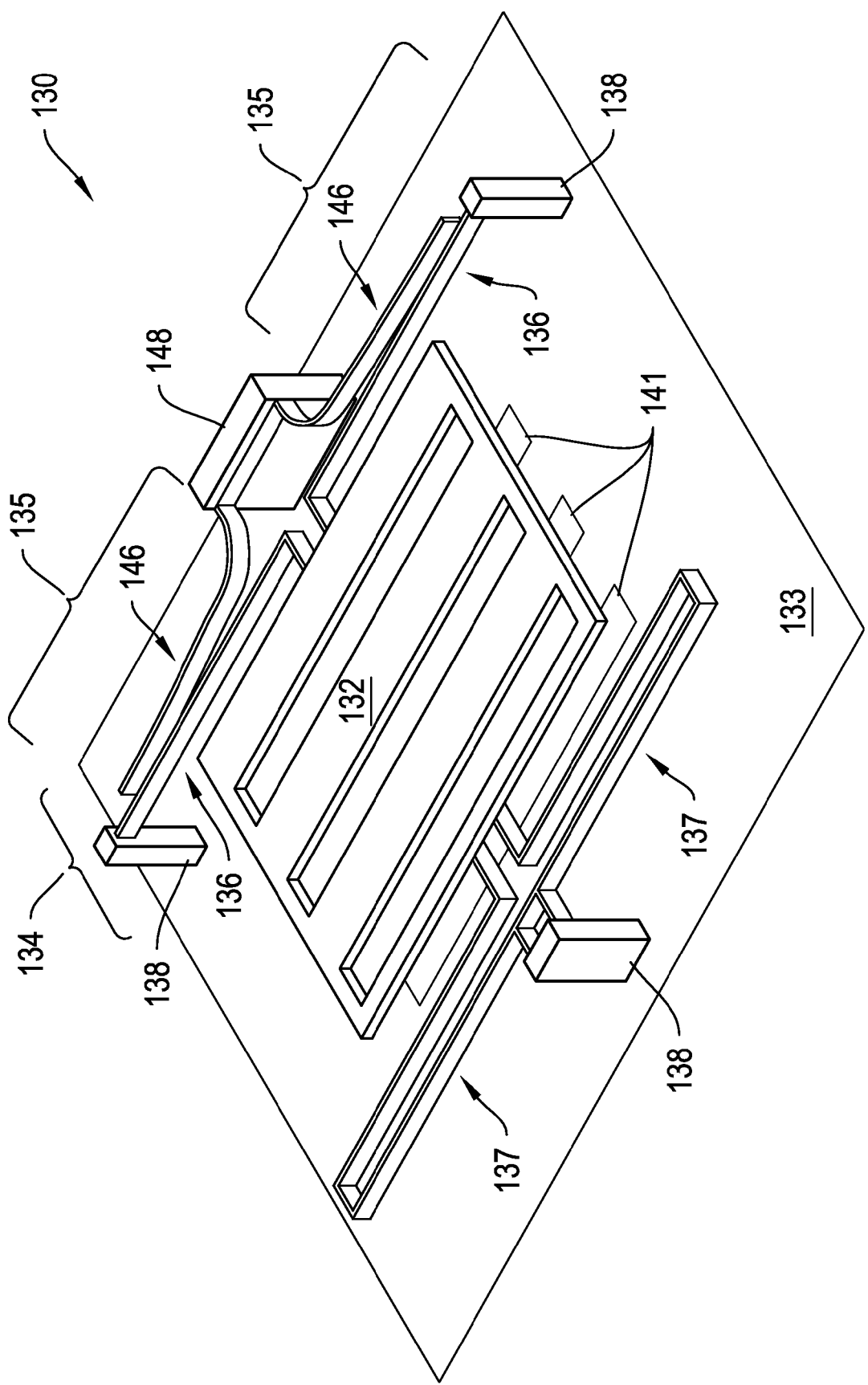
FIG. 1B is diagram of an illustrative shutter assembly suitable for incorporation into the display apparatus of FIG. 1A.

FIG. 1B is diagram of an illustrative shutter assembly 130 suitable for incorporation into the display apparatus 100 of FIG. 1A. The shutter assembly 130 includes a shutter 132 coupled to an actuator 134. The actuator 134 is formed from two separate compliant electrode beam actuators 135 (the "actuators 135"), as described in U.S. patent application Ser. No. 11/251,035, filed on Oct. 14, 2005. The shutter 132 couples on one side to the actuators 135. The actuators 135 move the shutter 132 transversely over a surface 133 in a plane of motion which is substantially parallel to the surface 133. The opposite side of the shutter 132 couples to a spring 137 which provides a restoring force opposing the forces exerted by the actuator 134.

Each actuator 135 includes a compliant load beam 136 connecting the shutter 132 to a load anchor 138. The load anchors 138 along with the compliant load beams 136 serve as mechanical supports, keeping the shutter 132 suspended proximate to the surface 133. The surface includes one or more aperture holes 141 for admitting the passage of light. The load anchors 138 physically connect the compliant load beams 136 and the shutter 132 to the surface 133 and electrically connect the load beams 136 to a bias voltage, in some instances, ground.

If the substrate is opaque, such as silicon, then aperture holes 141 are formed in the substrate by etching an array of holes through the substrate 204. If the substrate 204 is transparent, such as glass or plastic, then the first step of the processing sequence involves depositing a light blocking layer onto the substrate and etching the light blocking layer into an array of holes 141. The aperture holes 141 can be generally circular, elliptical, polygonal, serpentine, or irregular in shape.

Each actuator 135 also includes a compliant drive beam 146 positioned adjacent to each load beam 136. The drive beams 146 couple at one end to a drive beam anchor 148 shared between the drive beams 146. The other end of each drive beam 146 is free to move. Each drive beam 146 is curved such that it is closest to the load beam 136 near the free end of the drive beam 146 and the anchored end of the load beam 136.

In operation, a display apparatus incorporating the shutter assembly 130 applies an electric potential to the drive beams 146 via the drive beam anchor 148. A second electric potential may be applied to the load beams 136. The resulting potential difference between the drive beams 146 and the load beams 136 pulls the free ends of the drive beams 146 towards the anchored ends of the load beams 136, and pulls the shutter ends of the load beams 136 toward the anchored ends of the drive beams 146, thereby driving the shutter 132 transversely towards the drive anchor 148. The compliant members 136 act as springs, such that when the voltage across the beams 136 and 146 potential is removed, the load beams 136 push the shutter 132 back into its initial position, releasing the stress stored in the load beams 136.

A shutter assembly, such as shutter assembly 130, incorporates a passive restoring force, such as a spring, for returning a shutter to its rest position after voltages have been removed. Other shutter assemblies, as described in U.S. patent application Ser. Nos. 11/251,035 and 11/326,696, and as illustrated in FIG. 4, incorporate a dual set of "open" and "closed" actuators and a separate sets of "open" and "closed" electrodes for moving the shutter into either an open or a closed state.

U.S. patent application Ser. Nos. 11/251,035 and 11/326, 696 have described a variety of methods by which an array of shutters and apertures can be controlled via a control matrix to produce images, in many cases moving images, with appropriate gray scale. In some cases control is accomplished by means of a passive matrix array of row and column interconnects connected to driver circuits on the periphery of the display. In other cases it is appropriate to include switching and/or data storage elements within each pixel of the array (the so-called active matrix) to improve either the speed, the gray scale and/or the power dissipation performance of the display.

Figure 2A:
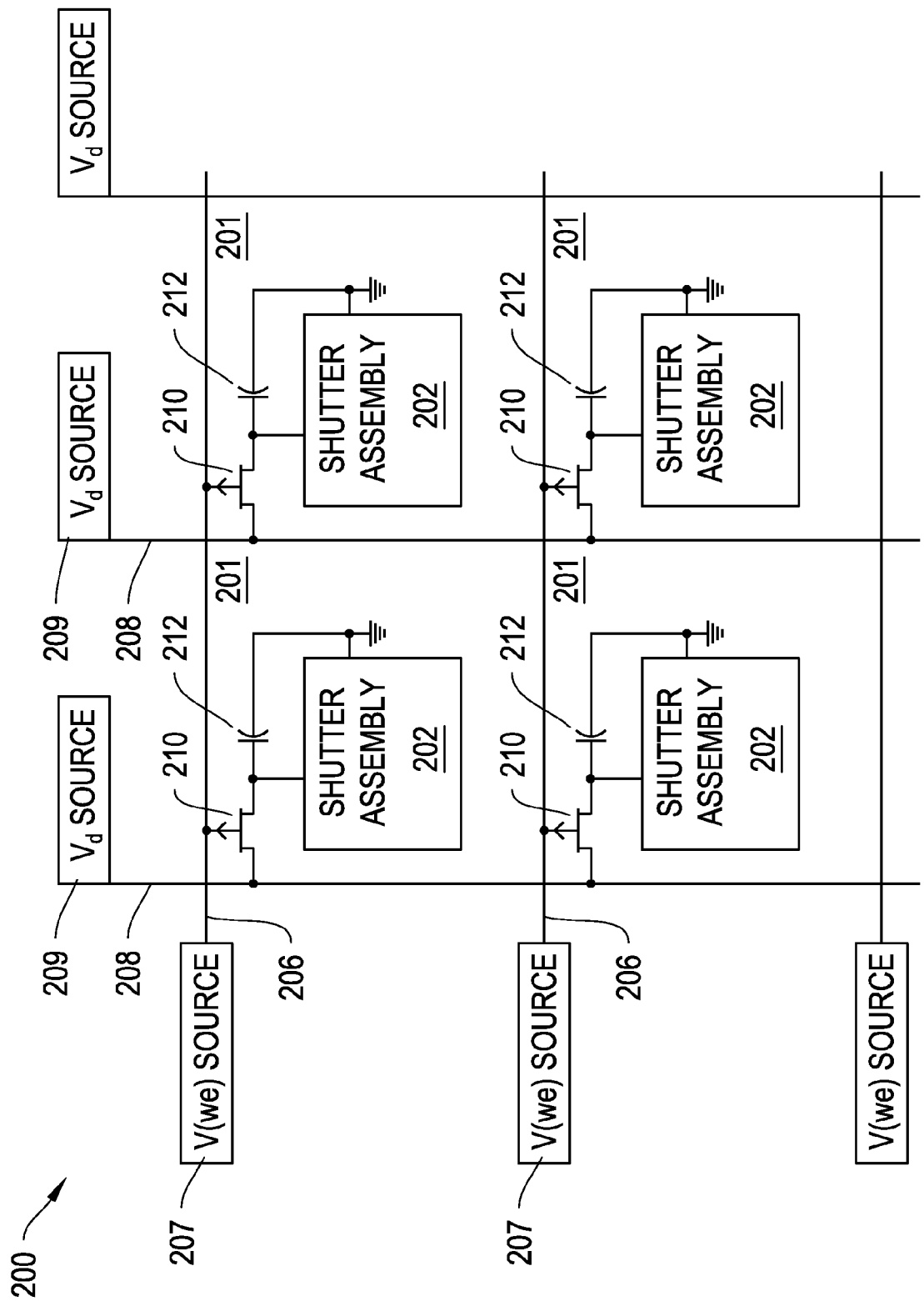
FIG. 2A is a schematic diagram of a control matrix suitable for controlling the shutter assemblies of the display apparatus of FIG. 1, according to an illustrative embodiment of the invention.

FIG. 2A is a conceptual diagram of an active control matrix 200 suitable for inclusion in the display apparatus 100 for addressing an array of pixels 240 (the "array 240"). Each pixel 201 includes an elastic shutter assembly 202, such as the shutter assembly 130 of FIG. 1B, controlled by an actuator 203. Each pixel also includes an aperture layer 250 that includes aperture holes 254. Further electrical and mechanical descriptions of shutter assemblies such as shutter assembly 202, and variations thereon, can be found in U.S. patent application Ser. Nos. 11/251,035 and 11/326,696.

The control matrix 200 is fabricated as a diffused or thin-film-deposited electrical circuit on the surface of a substrate 204 on which the shutter assemblies 202 are formed. The control matrix 200 includes a scan-line interconnect 206 for each row of pixels 201 in the control matrix 200 and a data-interconnect 208 for each column of pixels 201 in the control matrix 200. Each scan-line interconnect 206 electrically connects a write-enabling voltage source 207 to the pixels 201 in a corresponding row of pixels 201. Each data interconnect 208 electrically connects a data voltage source, ("Vd source") 209 to the pixels 201 in a corresponding column of pixels 201. In control matrix 200, the data voltage $V_d$ provides the majority of the energy necessary for actuation of the shutter assemblies 202. Thus, the data voltage source 209 also serves as an actuation voltage source.

Figure 2B:
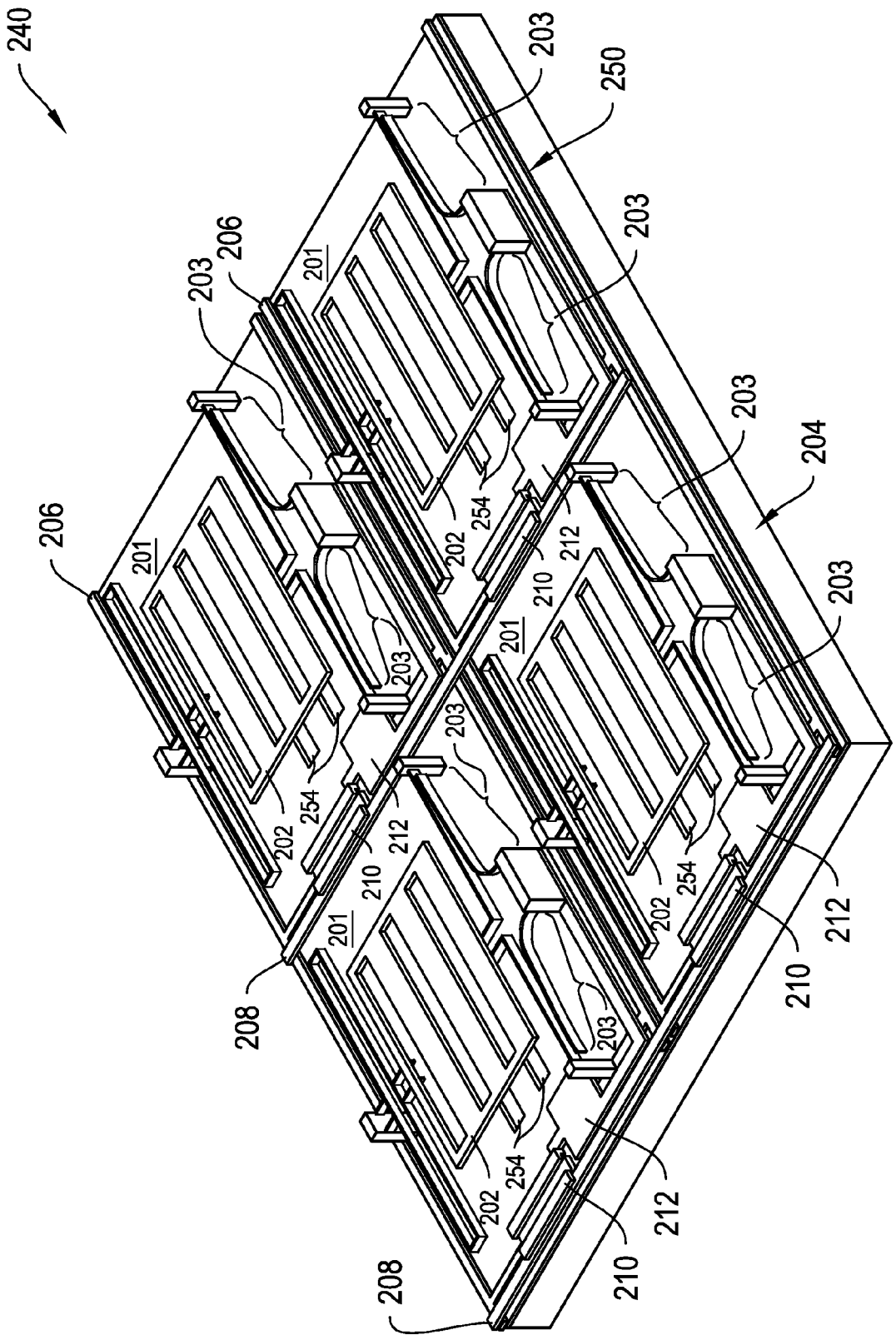
FIG. 2B is an isometric view of an array of pixels incorporating the control matrix of FIG. 2A and the shutter assembly of FIG. 1B, according to an illustrative embodiment of the invention.

FIG. 2B is an isometric view of a portion of the array of pixels 240 including the control matrix 200. Referring to FIGS. 2A and 2B, for each pixel 201 or for each shutter assembly in the array of pixels 240, the control matrix 200 includes a transistor 210 and a capacitor 212. The gate of each transistor 210 is electrically connected to the scan-line interconnect 206 of the row in the array 240 in which the pixel 201 is located. The source of each transistor 210 is electrically connected to its corresponding data interconnect 208. The actuators 203 of each shutter assembly include two electrodes. The drain of each transistor 210 is electrically connected in parallel to one electrode of the corresponding capacitor 212 and to the one of the electrodes of the corresponding actuator 203. The other electrode of the capacitor 212 and the other electrode of the actuator 203 in shutter assembly 202 are connected to a common or ground potential.

In operation, to form an image, the control matrix 200 write-enables each row in the array 240 in sequence by applying $V_{we}$ to each scan-line interconnect 206 in turn. For a write-enabled row, the application of $V_{we}$ to the gates of the transistors 210 of the pixels 201 in the row allows the flow of current through the data interconnects 208 through the transistors to apply a potential to the actuator 203 of the shutter assembly 202. While the row is write-enabled, data voltages $V_d$ are selectively applied to the data interconnects 208. In implementations providing analog gray scale, the data voltage applied to each data interconnect 208 is varied in relation to the desired brightness of the pixel 201 located at the intersection of the write-enabled scan-line interconnect 206 and the data interconnect 208. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 208, the actuator 203 in the corresponding shutter assembly 202 actuates, opening the shutter in that shutter assembly 202. The voltage applied to the data interconnect 208 remains stored in the capacitor 212 of the pixel 201 even after the control matrix 200 ceases to apply $V_{we}$ to a row. It is not necessary, therefore, to wait and hold the voltage $V_{we}$ on a row for times long enough for the shutter assembly 202 to actuate; such actuation can proceed after the write-enabling voltage has been removed from the row. The voltage in the capacitors 212 in a row remain substantially stored until an entire video frame is written, and in some implementations until new data is written to the row.

The pixels 201 of the array 240 are formed on a substrate 204. The array includes an aperture layer 250, disposed on the substrate, which includes a set of aperture holes 254 for each pixel 201 in the array 240. The aperture holes 254 are aligned with the shutter assemblies 202 in each pixel.

In alternative shutter assembly implementations, the shutter assembly together with the actuator can be made bi-stable. That is, the shutters can exist in at least two equilibrium positions (e.g. open or closed) with little or no power required to hold them in either position. More particularly, the shutter assembly can be mechanically bi-stable. Once the shutter of the shutter assembly is set in position, no electrical energy or holding voltage is required to maintain that position. The mechanical stresses on the physical elements of the shutter assembly can hold the shutter in place.

The shutter assembly together with the actuator can also be made electrically bi-stable. In an electrically bi-stable shutter assembly, there exists a range of voltages below the actuation voltage of the shutter assembly, which if applied to a closed actuator (with the shutter being either open or closed), hold the actuator closed and the shutter in position, even if an opposing force is exerted on the shutter. The opposing force may be exerted by a spring, or the opposing force may be exerted by an opposing actuator, such as an "open" or "closed" actuator.

Figure 3A:
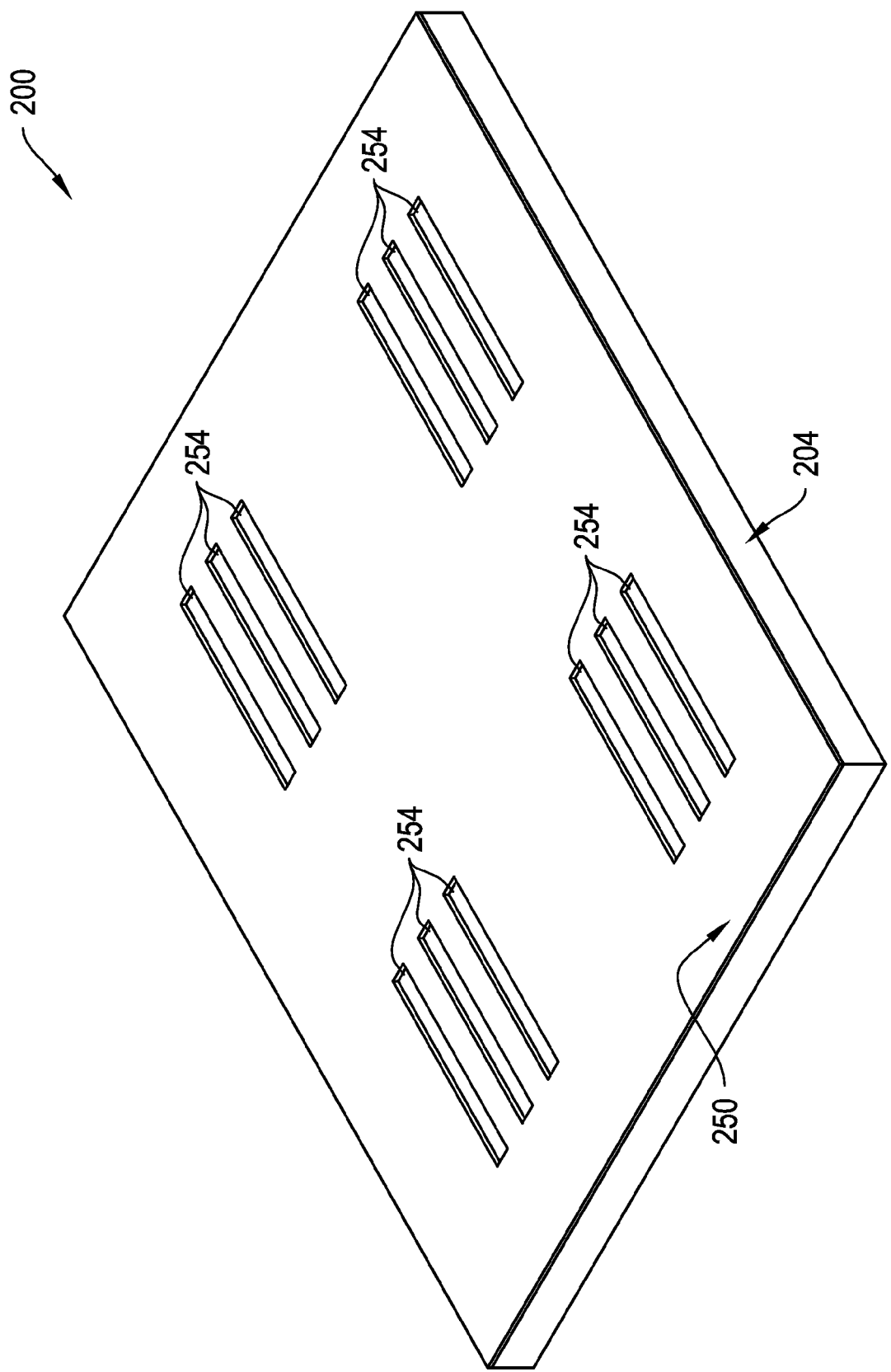
FIGS. 3A-3B are isometric views of stages of construction of the control matrix of FIG. 2B, according to an illustrative embodiment of the invention.
Figure 3B:
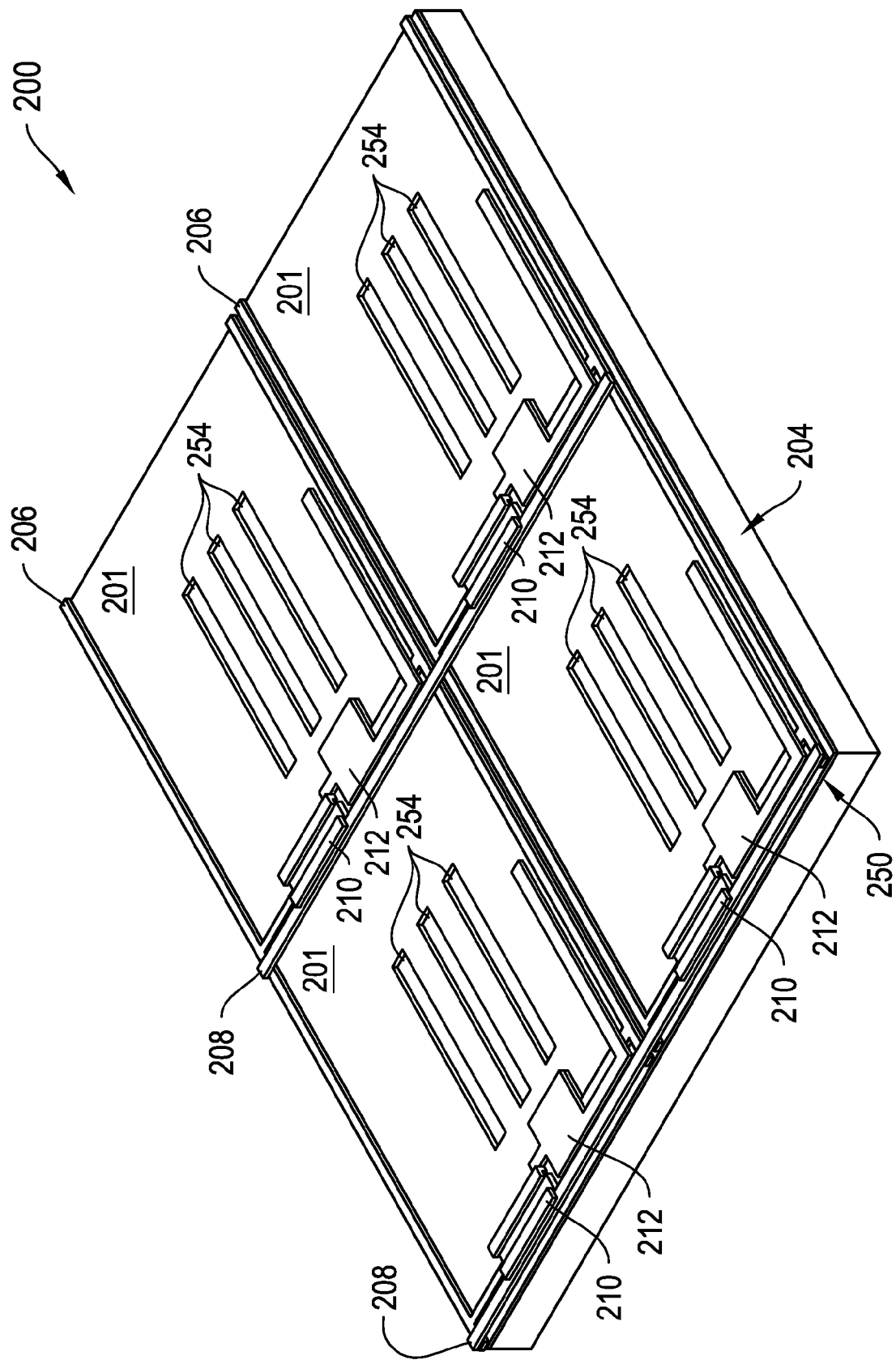

FIGS. 3A and 3B illustrate a first portion of a generalized process flow for fabrication of the pixels 201 of the array 240, according to an illustrative embodiment of the invention. In a first step, as illustrated in FIG. 3A, an aperture layer 250 is deposited and patterned onto a transparent substrate 204. In the second step, illustrated in FIG. 3B, the control matrix, including an array of thin film switches or transistors 210, is fabricated on top of the aperture layer 250 along with capacitors 212 and interconnects, such as scan-line interconnect 206 or data interconnect 208. The processes employed to fabricate the transistors 210 shown in FIG. 3B can be typical of those known in the art for manufacturing active matrix arrays for use in liquid crystal displays. In the final step, the result of which is shown as FIG. 2B, a micro-electro-mechanical (or MEMS) shutter assembly is formed on top of the array of thin film switches.

In one simple implementation, the aperture layer 250 is electrically isolated by an intervening dielectric layer from the control matrix. The aperture layer 250 can consist of thin film materials that are process compatible with the active matrix to be fabricated above it, but need not electrically connect to that active matrix. The aperture holes 254 can be generally circular, elliptical, polygonal, serpentine, or irregular in shape. In some implementations, the fabrication sequence for the second step (the formation of control matrix) need not include any switches, transistors, or capacitors but produces instead a lattice of row and column interconnects, separated by a dielectric layer. Such a control matrix is also referred to as a passive matrix as known in the art, for example, with respect to the fabrication of field emission cathodoluminescent displays.

In other implementations of the display, as will be described with respect to FIG. 10, a separate aperture layer does not need to be fabricated as a first step in the sequence. The aperture holes may be fabricated instead using the same thin film materials and with the same processing steps used in the fabrication of active matrices or passive matrices directly onto glass substrates, as typically known in the art. Only the mask designs or pixel layouts need to be changed to accommodate the formation of aperture holes.

Figure 4A:
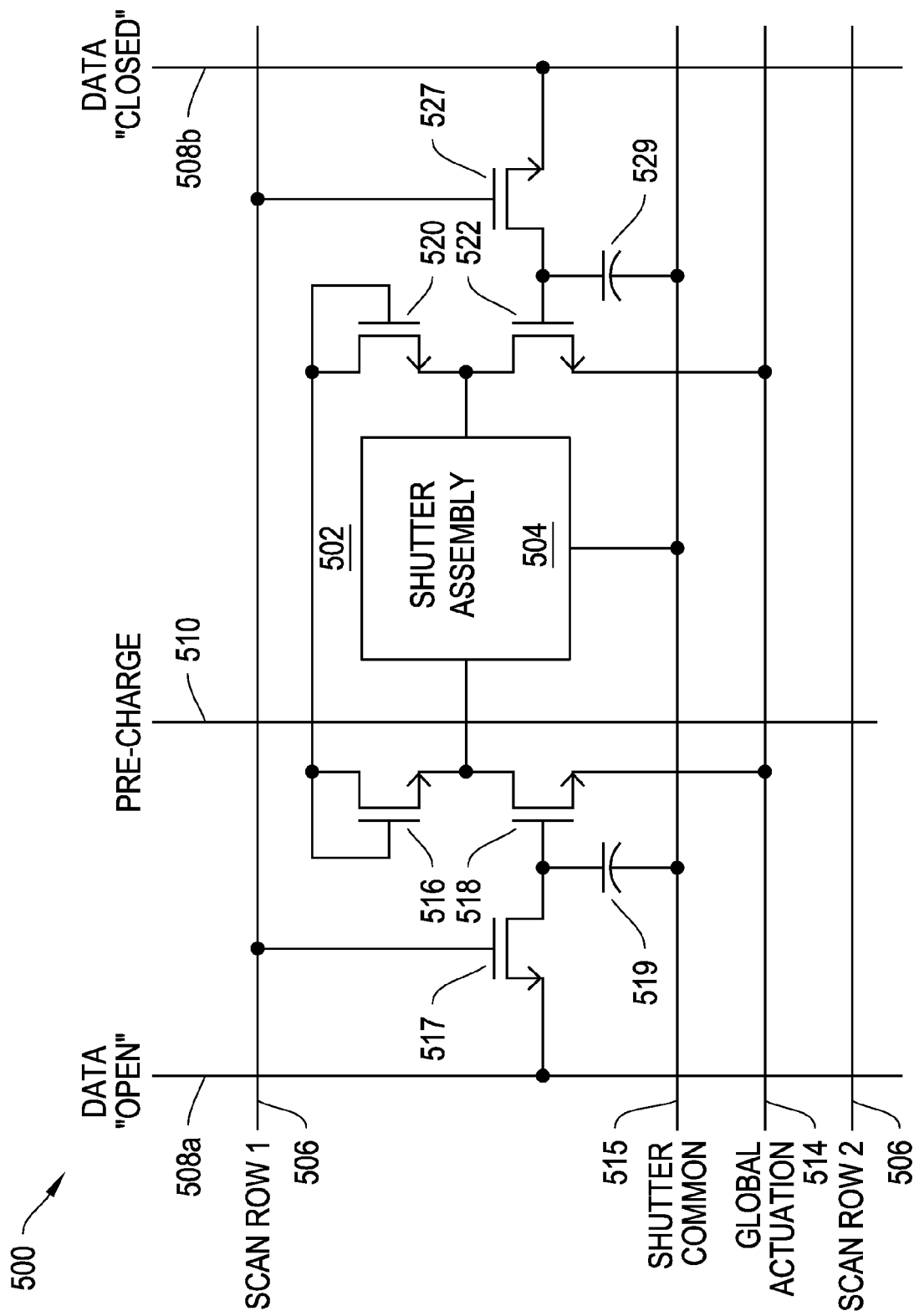
FIG. 4A is a schematic diagram of a control matrix suitable for controlling the shutter assemblies of the display apparatus of FIG. 1, according to an illustrative embodiment of the invention.
Figure 4B:
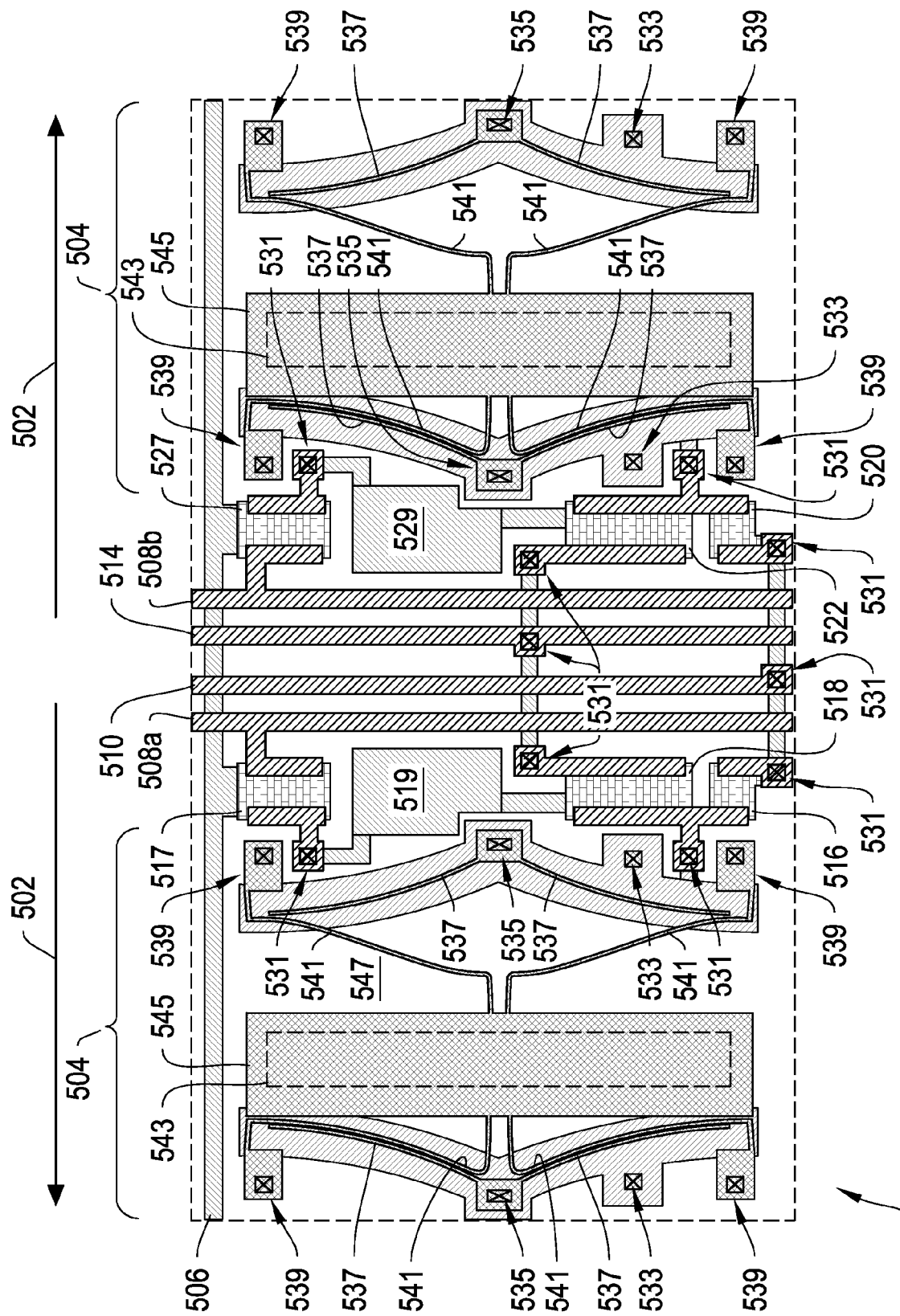
FIGS. 4B-4C are plan view layouts of the control matrix from FIG. 4A, according to an illustrative embodiment of the invention.
Figure 4C:
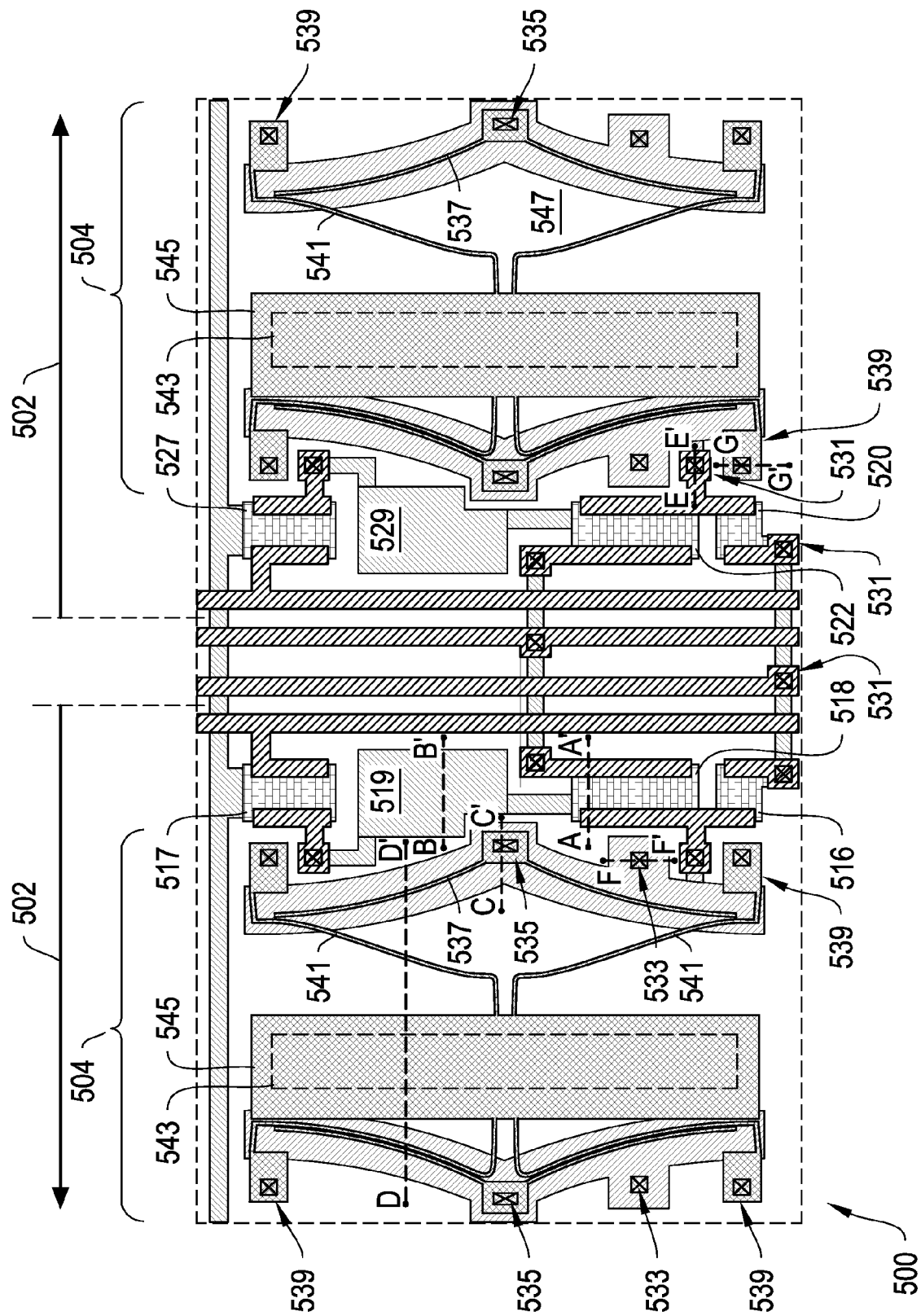

The aperture layer can be utilized as one of the electrical components of the control matrix, with its own electrical connections to the control matrix in the upper layers. FIGS. 4A through 4C illustrate such an integrated design.

FIG. 4A is a schematic diagram of another control matrix 500 suitable for inclusion in the display apparatus 100 for addressing an array of pixels. Control matrix 500 controls an array of pixels 502 that include dual-actuator shutter assemblies 504 (i.e., shutter assemblies with both shutter-open and shutter-close actuators). FIG. 4B is a plan view layout of portions of two neighboring pixels 502 from an array of pixels 502. The layout of FIG. 4B provides one example of how the electrical components of control matrix 500 can be arranged within a pixel 502 for concurrent fabrication of an array of pixels 502 on a substrate. FIG. 4C is identical to FIG. 4B, and calls out additional features of the pixels 502. A layout such as FIG. 4B/4C can be utilized to produce photomasks for each of the functional layers of the pixels 502. The components of control matrix 500 are built up from a sequence of functional layers, and the photomasks are used to print the arrayed pattern for each layer across the substrate 505. The pixels in the array 502 are each substantially square in shape with a pitch, or repeat distance between pixels, in the range of 180 to 200 microns. FIG. 4C shows cross sectional markers AA'-GG', used as reference for the cross-sectional illustration of the sequential layers of various electrical and mechanical components, to be described with reference to FIGS. 5, 6, 7 and 9.

For purposes of illustration, only the conductor layers, semiconductor layers, and shutter layers are provided in detail in FIG. 4B/4C. The locations of other patterned features, such as vias cut into dielectric layers or holes patterned into the aperture layer are indicated by symbol markings and/or dotted lines.

Referring to FIGS. 4A and 4B, the control matrix 500 includes a scan-line interconnect 506 for each row of pixels 502 in the control matrix 500. The control matrix 500 also includes two data interconnects: one data-open interconnect 508a and one data-closed interconnect 508b, for each column of pixels 502 in the control matrix 500. The control matrix 500 further includes a pre-charge interconnect 510, a global actuation interconnect 514, and a shutter common interconnect 515. These interconnects 510, 514 and 515 are shared among pixels 502 in multiple rows and multiple columns in the array. In one implementation (the one described in more detail below), the interconnects 510, 514 and 515 are shared among all pixels 502 in the control matrix 500.

Each pixel 502 in the control matrix includes a shutter-open charge transistor 516, a shutter-open discharge transistor 518, a shutter-open write-enable transistor 517, and a data store capacitor 519. Each pixel 502 in the control matrix 500 also includes a shutter-close charge transistor 520, and a shutter-close discharge transistor 522, a shutter-close write-enable transistor 527, and a data store capacitor 529.

Each pixel 502 in the control matrix includes a variety of via structures, which are indicated by the symbol of a box with diagonals in FIG. 4B/4C. Control matrix 500 includes several M1-M2 vias 531 (i.e., a via connecting a first metal layer M1 to a second metal layer M2), an Ap-M1 via 533 (i.e., a via connecting an aperture layer 547 to the first metal layer M1), two drive anchors 535, four compliant drive beams 537, four shutter anchors 539, four compliant load beams 541, an aperture hole 543, and a shutter 545. The aperture hole 543 is indicated by dotted line.

Portions of two neighboring pixels 502 are illustrated in FIGS. 4B and 4C. For each pixel 502 the shutter 545 closes over the aperture hole 543 by moving to the left. The shutter open actuation electronics for each pixel, including the transistors 516, 517, and 518, are positioned immediately to the right of each shutter assembly 504, (the two pixels are equivalent, but the shutter-open electronics are only included in FIG. 4B/4C for the left-most shutter assembly 504). The shutter close electronics for each pixel, including the transistors 520, 522, and 527, are positioned immediately to the left of each shutter assembly (again, the pixels 502 are equivalent, but the shutter-closed electronics are only illustrated for the right-most shutter assembly 504).

For a given pixel 502, the compliant load beams 541 mechanically connect the shutter 545 to the four shutter anchors 539 and suspend the shutter 545 above the substrate surface. The compliant drive beams 537, positioned adjacent to the load beams 541, are mechanically connected to the drive anchors 535. One set of drive beams 537 (located to the right of the shutter 545) is mechanically connected to a drive anchor and electrically connected, by means of both drive anchor 535 and an M1-M2 via 531, to the drain of the shutter-open charge transistor 516. By applying a voltage, greater than a minimum actuation voltage, between the drive beams 537 and load beams 541 on the right side of the shutter 545, the shutter 545 can be caused to move into the open position—i.e. to move away from the aperture hole 543. Together, the set of drive beams 537 and load beams 541 to the right of the shutter forms a shutter open actuator. The other set of drive beams 537 (located to the left of each shutter 545) is mechanically connected to a drive anchor 535 and electrically connected, by means of both the drive anchor 535 and an M1-M2 via 531, to the drain of the shutter-close charge transistor 520. By causing a voltage, greater than a minimum actuation voltage, to appear between the drive beams 537 and load beams 541 on the left side of the shutter 545, the shutter 545 can be caused to move into the closed position (as illustrated in FIG. 4B/4C)—i.e. to position over the top of aperture hole 543. The set of drive beams 537 and load beams 541 located to the left of the shutter 545 form a shutter close actuator.

In operation, the control matrix 500 is designed for independent control of distinct electrical functions, namely a) pre-charge of the actuators, b) pixel addressing and data storage, and c) global actuation of the pixels.

At the beginning of each frame addressing cycle the control matrix 500 applies a voltage to the pre-charge interconnect 510 which, because it is connected to both gate and drain of the shutter-open and shutter-close charge transistors 516 and 520, acts to turn both of these transistors 516 and 520 on. The pre-charge interconnect 510 is pulsed to a voltage in excess of the minimum required for actuation of the shutter 545, for instance to a voltage that exceeds 15 volts or in some embodiments exceeds 30 volts. After the actuators of each of the shutter-open and shutter-closed actuators have become charged, the voltage on the pre-charge interconnect 510 is returned to zero, and both of the shutter-open and shutter-close transistors 516 and 520 then return to their off states. The charge provided to each of the shutter-open and shutter-close actuators remains stored on each of the actuators since the transistors that feed these actuators have been returned to their off states.

Each row is then write-enabled in sequence, by placing a write-enable voltage $V_{we}$ onto the scan line interconnect 506. While a particular row of pixels 502 is write-enabled, the control matrix 500 applies a data voltage to either the data-open interconnect 508a or the data-closed interconnect 508b corresponding to each column of pixels 502 in the control matrix 500. The application of $V_{we}$ to the scan-line interconnect 506 for the write-enabled row turns on both of the write-enable transistors 517 and 527 of the pixels 502 in the corresponding scan line. The voltages applied to the data interconnects 508a and 508b are thereby allowed to be stored on the data store capacitors 519 and 529 of the respective pixels 502. Generally, to ensure proper actuation, a data voltage is allowed to be stored on only one storage capacitor 519 or 529 per shutter assembly 504.

In control matrix 500 the global actuation interconnect 514 is connected to the source of the both the shutter-open discharge switch transistor 518 and the shutter-close discharge transistor 522. Maintaining the global actuation interconnect 514 at a potential significantly above that of the shutter common interconnect 515 prevents the turn-on of any of the discharge switch transistors 518 or 522, regardless of what charge is stored on the capacitors 519 and 529. Global actuation in control matrix 500 is achieved by bringing the global actuation interconnect 514 to a potential that is equal to or less than that of the shutter common interconnect 515, making it possible for the discharge switch transistors 518 or 522 to turn-on in accordance to the whether a data voltage has been stored on ether capacitor 519 or 520. When switched to the on state, the shutter-open discharge switch transistor 518 or the shutter-close discharge transistor 522 will allow the charge to drain away from one or the other of their respective actuators. By turning on only the shutter-open discharge transistor 518, for example, the charge stored on drive beams 537 to the right of shutter 545 will drain out through the drive anchor 535, the M1-M2 via 531, through transistor 518, and out through the global actuation interconnect 514. As a result, a voltage exceeding the minimum actuation voltage will remain only between the shutter and the drive beams to the left of the shutter, and the shutter will be caused to move to the left and into the closed position.

Applying partial voltages to the data store capacitors 519 and 521 allows partial turn-on of the discharge switch transistors 518 and 522 during the time that the global actuation interconnect 514 is brought to its actuation potential. In this fashion, an analog voltage can be created on the shutter assembly 504, providing for analog gray scale.

The layout shown in FIG. 4B/4C includes portions of two neighboring pixels, between which some of the interconnects are singly assigned and some of the interconnects are shared in common. Each of these pixels contains one data-open interconnect 508a and one data-closed interconnect 508b, connecting all of the pixels 502 vertically along a single column of control matrix 500. The two neighboring pixels 502 in FIG. 4B/4C also share a common scan-line interconnect 506, which connects all pixels 502 horizontally along a single row of control matrix 500. The two neighboring pixels, however, share the pre-charge interconnect 510 and the global actuation interconnect 514 between them. These two interconnects, oriented along the column direction, are placed between each of the two pixels 502 with electrical connections, through M1-M2 vias 531, feeding voltage signals to both pixels on the right and on the left. At the periphery of the display (not shown) the pre-charge interconnect lines 510 and the global actuation interconnect lines 514 from multiple columns are further connected, respectively, to other pre-charge interconnect lines and other global actuation interconnect lines.

The control matrix 500 includes a shutter common interconnect 515, which in the layout of FIG. 4B/4C is established by a separate conducting layer, referred to as the aperture layer 547. The aperture layer 547, as was illustrated in FIGS. 3A and 3B, is fabricated as a distinct layer that underlies all other layers of the control matrix 500. In the preferred embodiment, the aperture layer 547 is fabricated from conductive materials. The patterned outline of the aperture layer is not illustrated in FIG. 4B/4C except for the location of the aperture hole 543. In control matrix 500, the aperture layer is used to make common electrical connection between all shutters 545 in all rows and all columns by means of the shutter anchors 539.

It should be appreciated that FIG. 4B/4C is just one example of a layout appropriate to the construction of control matrix 500. Many other equivalent layouts are possible. For instance the common interconnects 510 and 514 have been routed along the column direction in FIG. 4B/4C, but other embodiments are possible in which these interconnects are routed along the row direction. In FIG. 4B/4C the common interconnects 510 and 514 are established and/or patterned at the same metal level as the source and drain connections to the transistors, such as transistor 518. Other embodiments are possible, however, where these common interconnects 510 and 514 are established at the gate level of the thin film transistors, and still other embodiments are possible where these interconnects can be patterned as independent electrical connectors located in the underlying conductive aperture layer 547.

In the layout of control matrix 500 shown in FIG. 4B/4C, the shutter assemblies 504 are aligned such that the shutters 545 move in a direction parallel to the scan line interconnect 506. Other embodiments are possible in which the shutters 545 move parallel to the data interconnects 508a and 508b. Embodiments are also possible in which the electrical components such as transistor 518 or capacitor 519 are disposed not just to the left or right but also above or below the shutter assemblies 504. In FIG. 4B/4C the electrical components occupy different areas within the pixel 502. Other embodiments are possible, however, where components such as transistor 518 or capacitor 519 are built on other thin film layers which underlie the shutter assembly 504.

Figure 5:
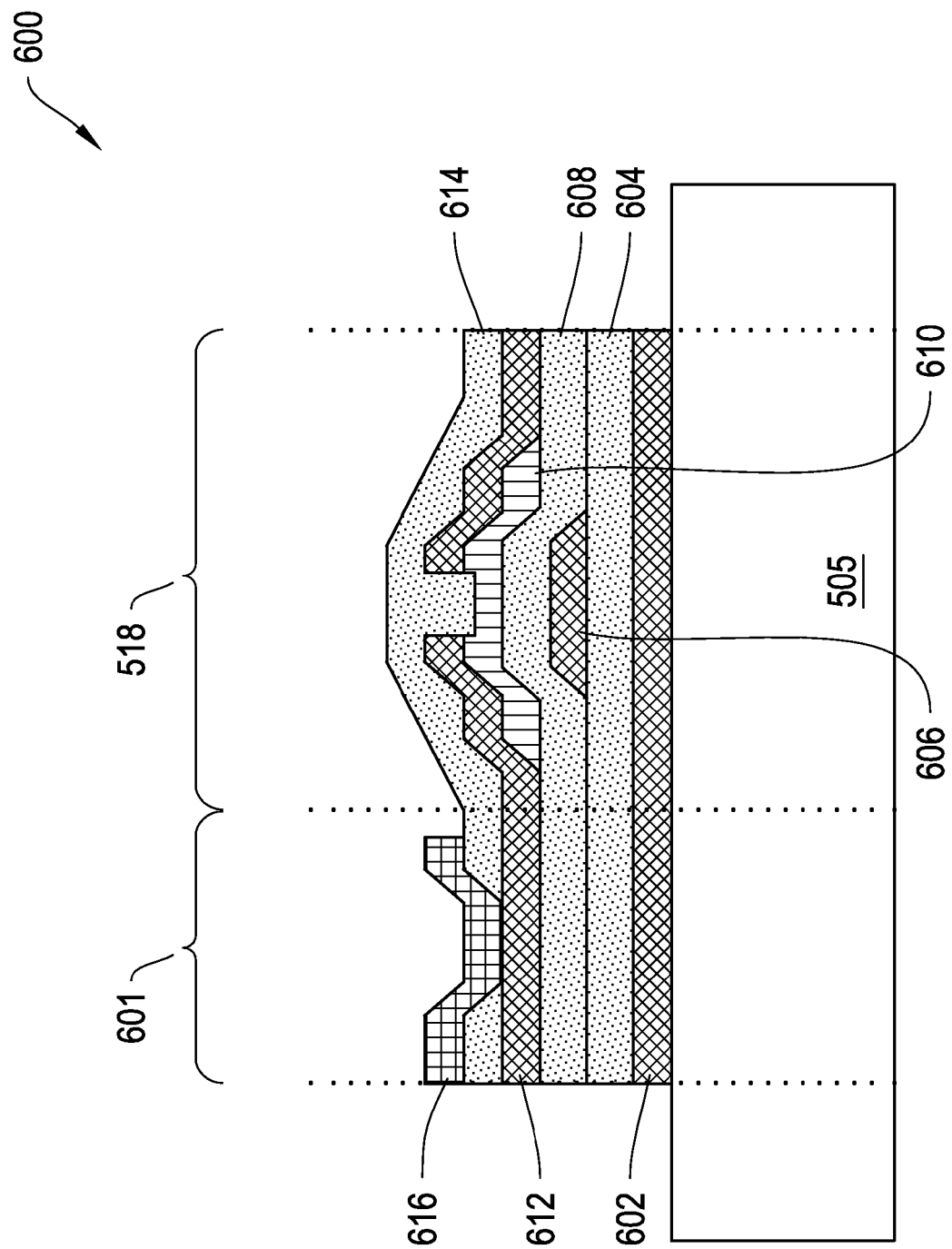
FIG. 5 is a cross sectional view of a transistor in the control matrix shown in FIG. 4B, according to an illustrative embodiment of the invention.

A number of different thin film switches, known in the art, can be utilized for the operation of control matrix 500. FIG. 5 illustrates one of several suitable switch structures in cross section. The structure illustrated in FIG. 5 includes the cross section of a transistor, such as shutter open discharge transistor 518. The structure of transistor 518 is similar to that used in the art for active matrix liquid crystal displays. The structure 600 of FIG. 5 also includes an electrode interconnect 601, such as are commonly used to connect to pixel capacitors in a liquid crystal display or as are commonly used connect to driver circuits on the periphery of a display. Transistor 518 represents, in particular, a structure that is known in the art as the inverted staggered back-channel-etched thin film transistor. Descriptions of the formation and function of this particular transistor as well as others can be found in the literature, such as in *Active Matrix Liquid Crystal Displays* by Willem den Boer (Elsevier, Amsterdam, 2005).

The transistor 518 is built from a distinct set of thin films or layers, the fabrication process for which will be described in more detail with respect to FIGS. 6-9. In particular the transistor 518 is disposed on top of an aperture layer 602. On top of the aperture layer is placed a first dielectric layer 604. The elements of the transistor 518 include a first conductor layer 606, a second dielectric layer 608, a first semiconductor layer 610, a second conductor layer 612, a third dielectric layer 614, and a third conductor layer 616. The first conductor layer is also referred to in the art as a gate metal layer and transistor 518 is referred to as a bottom-gate transistor. The second conductor layer is also referred to in the art as a connector to the source and drain of the transistor 518. The third conductor layer is also referred to in the art as an electrode or contact metal.

The semiconducting layer 610 is commonly formed from amorphous or polycrystalline silicon. The amorphous silicon can be deposited by either plasma enhanced chemical vapor deposition (PECVD) or by hot wire deposition from a precursor gas such as $SiH_4$. Other semiconducting materials that can be used at layer 610 include diamond-like carbon, Si, Ge, GaAs, CdTe or alloys thereof. Other techniques for formation of the semiconducting layer include low pressure chemical vapor deposition and sputtering.

The top surface of semiconducting layer 610 is doped with an impurity to increase the conductivity of the amorphous silicon and to provide for an ohmic contact between the amorphous silicon and the second conductor layer 612. Conductivity-enhancing dopants typically used with either amorphous or polycrystalline silicon include phosphorus, arsenic, boron, or aluminum. These dopants can be included as part of a deposition step, i.e. by mixing dopant precursors with $SiH_4$ in the PECVD chamber, or added later by means for diffusion from a dopant gas or by ion implantation.

Thin film switches, such as representative transistor 518 shown in FIG. 5, are fabricated from a sequence of deposition, masking, and etch steps. The number of masks and/or deposition steps required for the formation of thin film switches, such as transistor 518, can vary between 3 and 10. At the same time, the deposition, patterning, and etching steps used to form the thin film switches are also used to form thin film components such as array interconnects between pixels, capacitors, or to form electrode contacts to driver chips on the periphery of the display. Similar and/or additional processing steps can be adapted to form thin film components useful in the MEMS shutter display, e.g. to form electrical connections between thin film switches and the aperture layer, such as aperture layer 602, or to form electrical connections between the switches, array interconnects, and the shutter assembly, such as shutter assembly 202 or shutter assembly 504.

Fabrication Procedure 700

Figure 6:
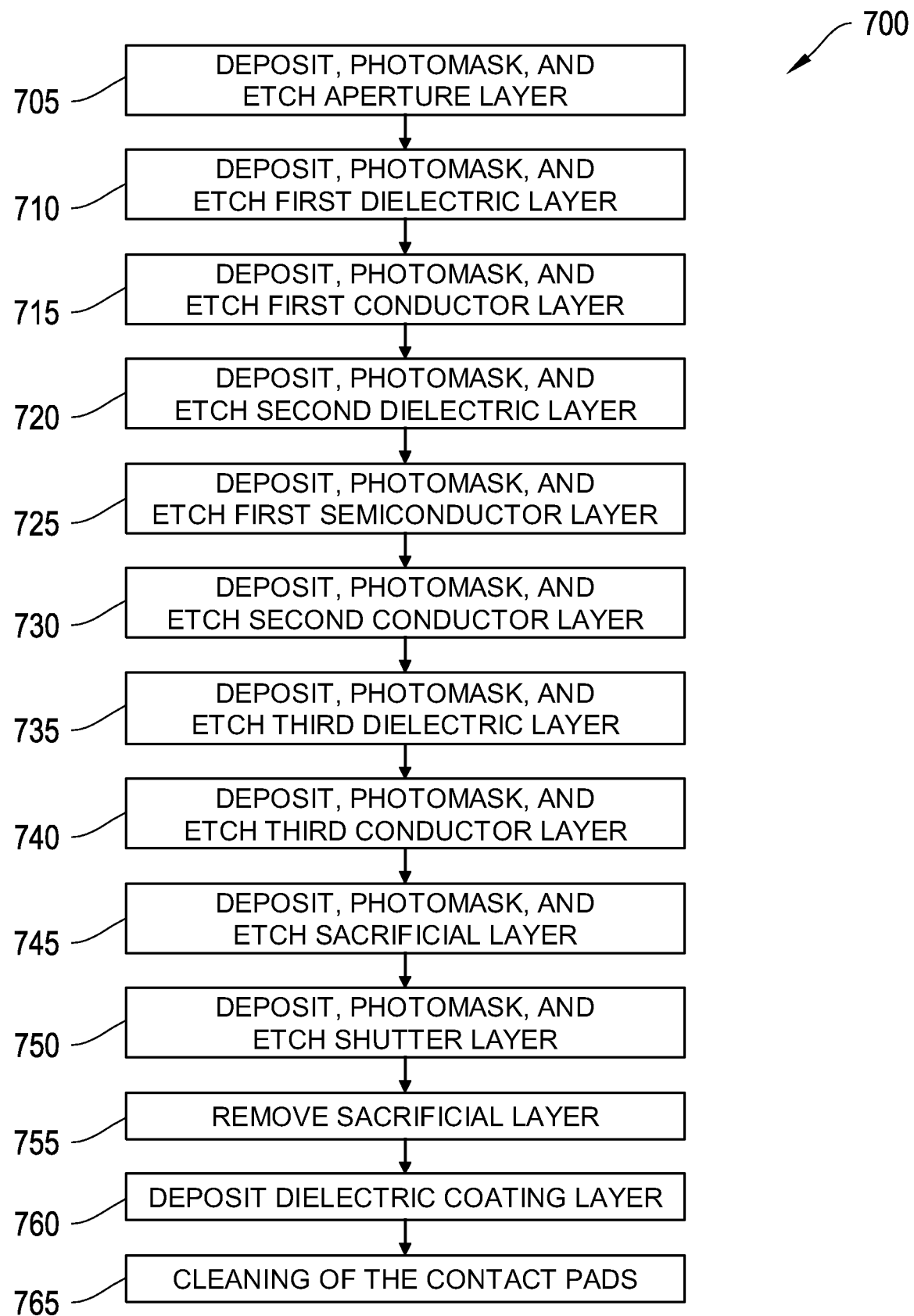
FIG. 6 is a flow chart of a method of fabricating the control matrix illustrated in FIG. 4B, according to an illustrative embodiment of the invention.

FIG. 6 illustrates one example of a manufacturing process or procedure 700 for construction of a control matrix and associated shutter assembly. The procedure 700 of FIG. 6 includes steps for the formation of an aperture layer, such as aperture layer 250 or aperture layer 602. The procedure 700 also includes steps for the formation of a switch or transistor, such as transistor 210 or transistor 518. The procedure 700 also includes steps for the fabrication of a shutter assembly, such as shutter assembly 202 or shutter assembly 504. Procedure 700 of FIG. 6 is described below with respect to the formation of an inverted, staggered, back-channel etched transistor such as transistor 518. Modifications or alternatives to procedure 700, as may be appropriate for simplification of the process or for the formation of alternative thin film switches and control matrices will be discussed later with respect to FIG. 8.

The procedure 700 begins at step 705 with the formation of an aperture layer 602 on a substrate. The aperture layer formation 705 includes the cleaning of the substrate, which can be glass or plastic, followed by the deposition and etch of the aperture layer 602. In some cases the aperture layer can be a composite aperture layer.

The procedure 700 continues at step 710 with the deposition and etch of the first dielectric layer, such as dielectric layer 604. Suitable dielectric materials include, without limitation, $SiO_2$, $Si_3N_4$, $Al_2O_3$, $TiO_2$, $HfO_2$, and $Ta_2O_5$, which can be deposited either by sputtering, evaporation, or chemical vapor deposition to thicknesses on the order of 0.1 to 2.0 microns. Typical photoresists are applied as known in the art, then UV-exposed through photomask patterns, such as are illustrated in layouts such as FIG. 4, and finally developed into an etching mask. After the etch of the dielectric layer 604 is complete the remaining photoresist is removed with either an aqueous or solvent-based stripper compound or through ozone and/or plasma ashing. Etch processes that can be used to pattern the first dielectric layer 604 include RF or DC plasma etching, sputter etching, or wet chemical etching.

The procedure 700 continues at step 715 with the deposition and etch of the first conductor layer, such as conductor layer 606. Suitable conductor materials include, without limitation, Al, Cu, Ag, Ni, Cr, Mo, W, Ti, Ta, Nd, Nb and alloys or combinations thereof. Some typical alloys used in the art include TiW, MoW, MoCr, AlNd, AlTa, and AlCr. Bilayer metals are also useful for application as the first conductive layer 606. Some bilayer metals that are useful include Cr on Al, Ta on Al, Ta on Ag, Ti on Al, or Mo on Al. Trilayer metal configurations are also known in the art, including Cr/Al/Cr or Cr/Al/Ti or Ti/Al/Ti, Cr/Al/Ta, or Cr/Ag/Ta. These metals or combinations of metals can be applied by DC or RF sputtering, evaporation, or in some cases by chemical vapor deposition. Suitable thicknesses can be in the range of 0.1 to 1.0 microns. For patterning of the first conducting layer 606, typical photoresists are applied as known in the art and exposed through photomask patterns such as are illustrated in layouts such as FIG. 4. After the etch of the conducting layer is complete the remaining photoresist is removed with either an aqueous or solvent-based stripper compound or through ozone and/or plasma ashing. Etch processes that can be used to pattern the first conductor layer include RF or DC plasma etching, sputter etching, reactive ion milling, and/or wet chemical etching.

The procedure 700 continues at step 720 with the deposition and etch of the second dielectric layer, such as dielectric layer 608. Suitable dielectric materials include, without limitation, $SiO_2$, $Si_3N_4$, $Al_2O_3$, $TiO_2$, $HfO_2$, and $Ta_2O_5$, which can be deposited either by sputtering, evaporation, or chemical vapor deposition to thicknesses on the order of 0.1 to 2.0 microns. Patterning is achieved by means of typical photoresists as known in the art and exposed through photomask patterns such as are illustrated in layouts like FIG. 4. After the etch of the dielectric is complete the remaining photoresist is removed with either an aqueous or solvent-based stripper compound or through ozone and/or plasma ashing. Etch processes that can be used to pattern the second dielectric layer 608 include RF or DC plasma etching, sputter etching, or wet chemical etching.

The procedure 700 continues at step 725 with the deposition and etch of the first semiconductor layer, such as semiconductor layer 610. Amorphous silicon is a typical semiconductor material applied at this step, deposited with a PECVD process at deposition temperatures in the range of 250 to 350 C. Polycrystalline silicon is an alternate semiconductor material for thin film transistors, but as will be shown in FIG. 8, the polycrystalline layer is typically applied at a step preceding, or situated below the first conductor layer 606. For the inverted, staggered, back channel etch transistor 518, a dual layer of amorphous silicon is deposited. For the first part of layer 610, amorphous silicon is deposited without any dopants to thicknesses in the range of 0.1 to 0.2 microns. The second part of layer 610 includes the deposition of heavily n-doped amorphous silicon, typically through the inclusion of PH3 gas in the PECVD chamber. The second or upper part of layer 610 is thinner, typically in the range of 0.02 to 0.05 microns. Patterning of the amorphous silicon transistor islands is then achieved by means of typical photoresists as known in the art and exposed through photomask patterns such as are illustrated in layouts such as FIG. 4. After the etch of the semiconductor is complete the remaining photoresist is removed with either an aqueous or solvent-based stripper compound or through plasma ashing. Etch processes that can be used to pattern semiconductor islands include RF or DC plasma etching, sputter etching, reactive ion milling, or wet chemical etching.

The procedure 700 continues at step 730 with the deposition and etch of the second conductor layer, such as conductor layer 612. Suitable conductor materials include, without limitation, Al, Cu, Ag, Au, Ni, Cr, Mo, W, Ti, Ta, Nd, Nb and alloys or combinations thereof. Some typical alloys used in the art include TiW, MoW, MoCr, AlNd, AlTa, and AlCr. Bilayer metals are also useful for application as the first conductive layer. Some bilayer metals that are useful include Cr on Al, Ta on Al, Ta on Ag, Ti on Al, or Mo on Al. Trilayer metal configurations are also known in the art, including Cr/Al/Cr, or Cr/Al/Ti, or Ti/Al/Ti, or Cr/Al/Ta, or Cr/Ag/Ta. These metals or combinations of metals can be applied by DC or RF sputtering, evaporation, or in some cases by chemical vapor deposition. Suitable thicknesses can be in the range of 0.1 to 1.0 microns. For patterning of the second conducting layer 612, typical photoresists are applied as known in the art and exposed through photomask patterns such as are illustrated in layouts like FIG. 4. After the etch of the second conducting layer 612 is complete the remaining photoresist is removed with either an aqueous or solvent-based stripper compound or through plasma ashing. Etch processes that can be used to pattern the second conductor layer 612 include RF or DC plasma etching, sputter etching, reactive ion milling, and/or wet chemical etching.

The procedure 700 continues at step 735 with the deposition and etch of the third dielectric layer, such as dielectric layer 614. Suitable dielectric materials include $SiO_2$, $Si_3N_4$, $Al_2O_3$, $TiO_2$, $HfO_2$, and $Ta_2O_5$, which can be deposited either by sputtering, evaporation, or chemical vapor deposition to thicknesses on the order of 0.2 to 2.0 microns. Patterning is achieved by means of typical photoresists as known in the art and exposed through photomask patterns such as are illustrated in layouts such as FIG. 4. After the etch of the dielectric is complete the remaining photoresist is removed with either an aqueous or solvent-based stripper compound or through plasma ashing. Etch processes that can be used to pattern the third dielectric layer 614 include RF or DC plasma etching, sputter etching, or wet chemical etching.

The procedure 700 continues at step 740 with the deposition and etch of the third conductor layer, such as conductor layer 616. Suitable conductor materials include, without limitation, Al, Cu, Ag, Au, Ni, Cr, Mo, W, Ti, Ta, Nd, Nb and alloys or combinations thereof. For the third conductor layer 616, which can serve as a contact or electrode layer, other conductive materials are applicable such as indium-tin-oxide (ITO), indium zinc oxide (IZO), Al-doped tin oxide, fluorine-doped tin oxide, silver alloys and/or gold alloys. Other alloys, bi-layers, and/or tri-layers as listed for use as the second conductor layer 612 are also applicable. These metals or combinations of metals can be applied by DC or RF sputtering, evaporation, or in some cases by chemical vapor deposition. Suitable thicknesses can be in the range of 0.1 to 1.0 microns. For patterning of the third conducting layer 616, typical photoresists are applied as known in the art and exposed through photomask patterns such as are illustrated in layouts such as FIG. 4. After the etch of the third conductor layer 616 is complete the remaining photoresist is removed with either an aqueous or solvent-based stripper compound or through plasma ashing. Etch processes that can be used to pattern the third conductor layer 616 include RF or DC plasma etching, sputter etching, and/or wet chemical etching.

The procedure 700 continues at step 745 with the deposition and patterning of the sacrificial layer, such as sacrificial layer 805 illustrated below in FIG. 7F. Suitable sacrificial layers 805 include polymers such as polyimide, dielectrics such as $SiO_2$, or soft metals such as copper or aluminum. In some cases the sacrificial material is patterned by adding a layer of photoresist as known in the art, which is then exposed through a photomask and developed to form an etching mask. Etch processes available for the sacrificial materials include RF or DC plasma etching or wet chemical etching. In some cases sacrificial materials are available which are themselves photo-defineable, meaning their patterns can be established by direct exposure to UV radiation through a photomask followed by immersion in a bath or spray of developer chemicals. In either case the pattern which is formed in the sacrificial layer 805 will act as a mold for the subsequent formation of the shutter layer 807. The sacrificial layer 805 is not removed until step 760 of procedure 700.

Figure 7A:
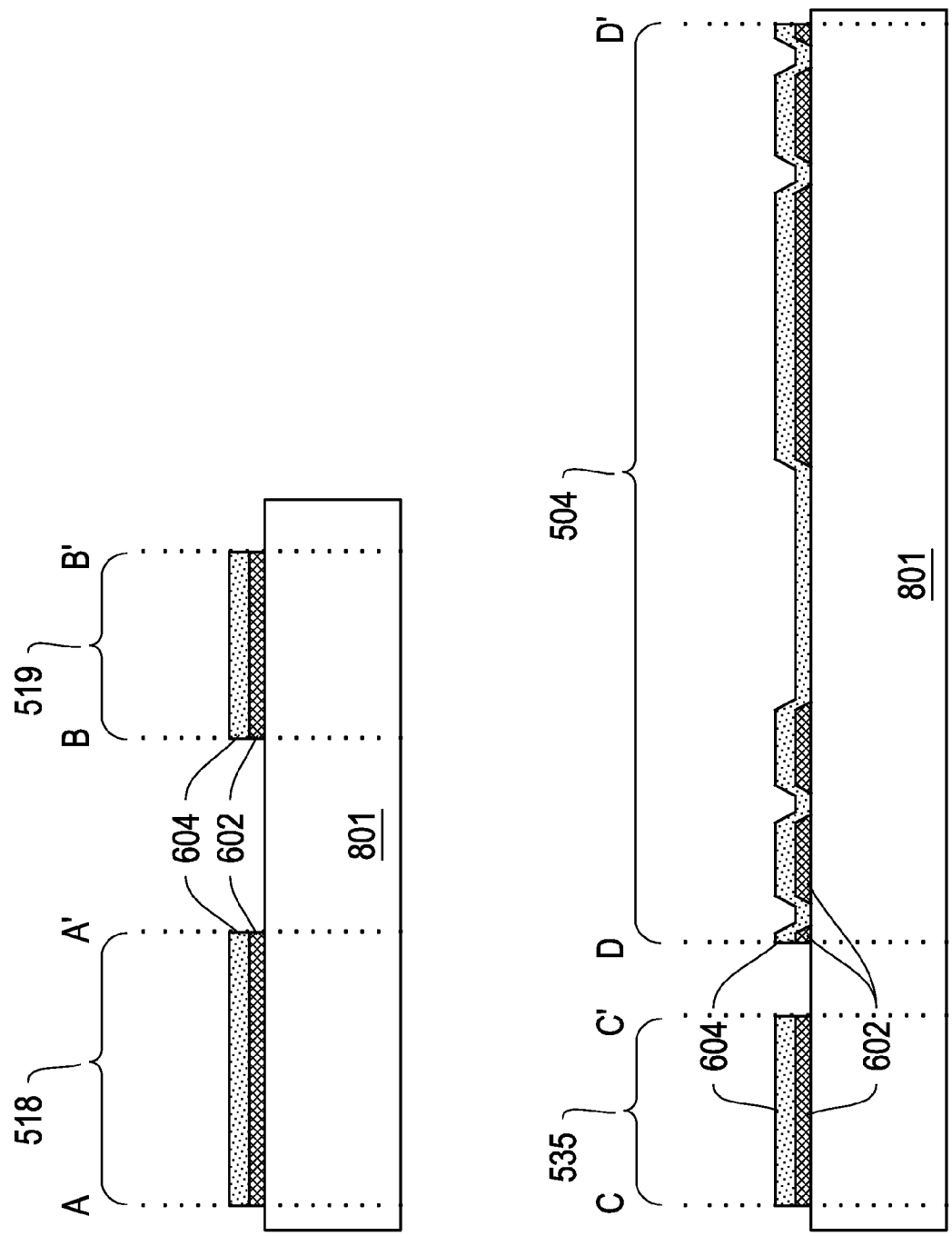
Figure 7B:
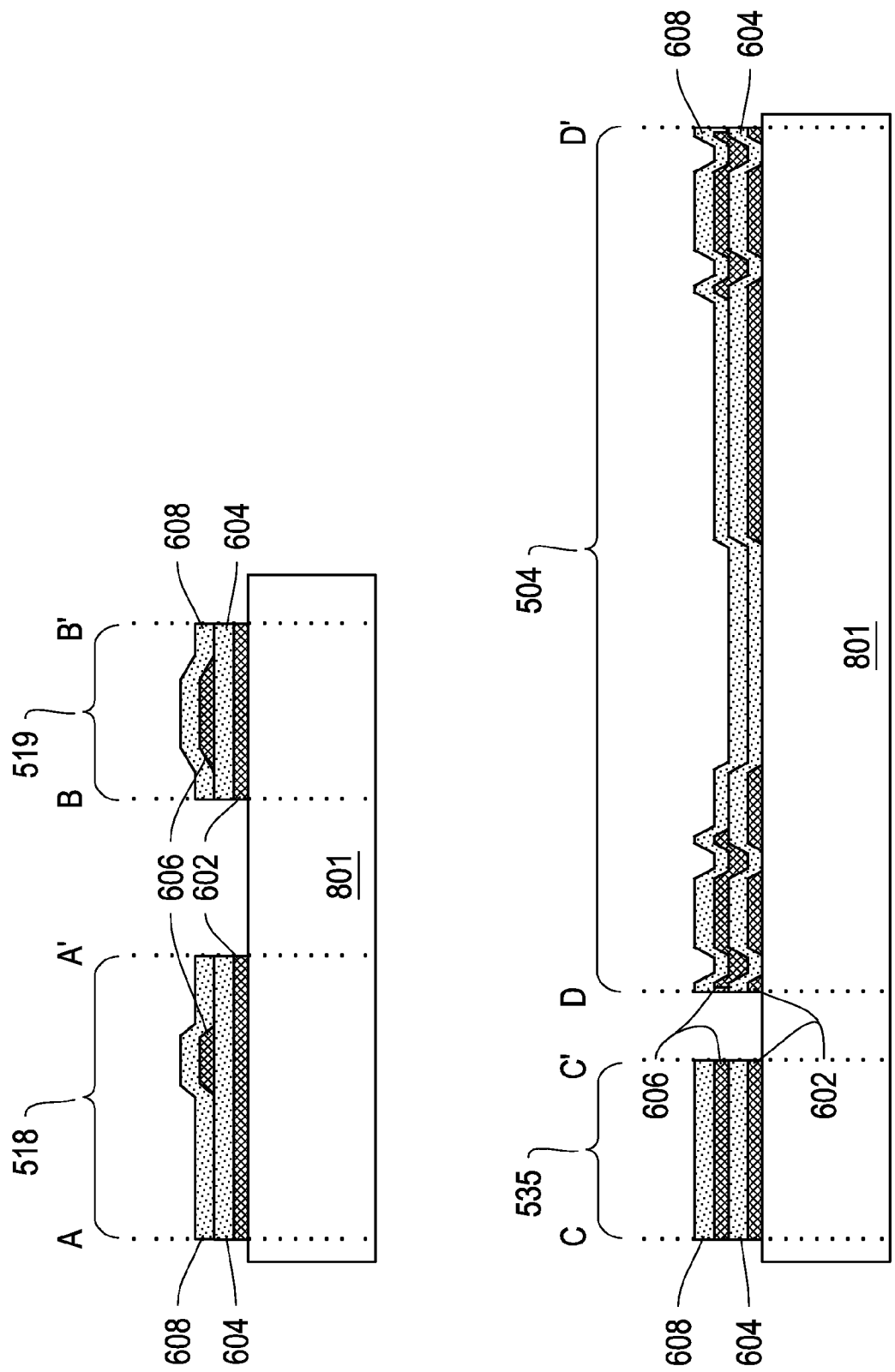
Figure 7C:
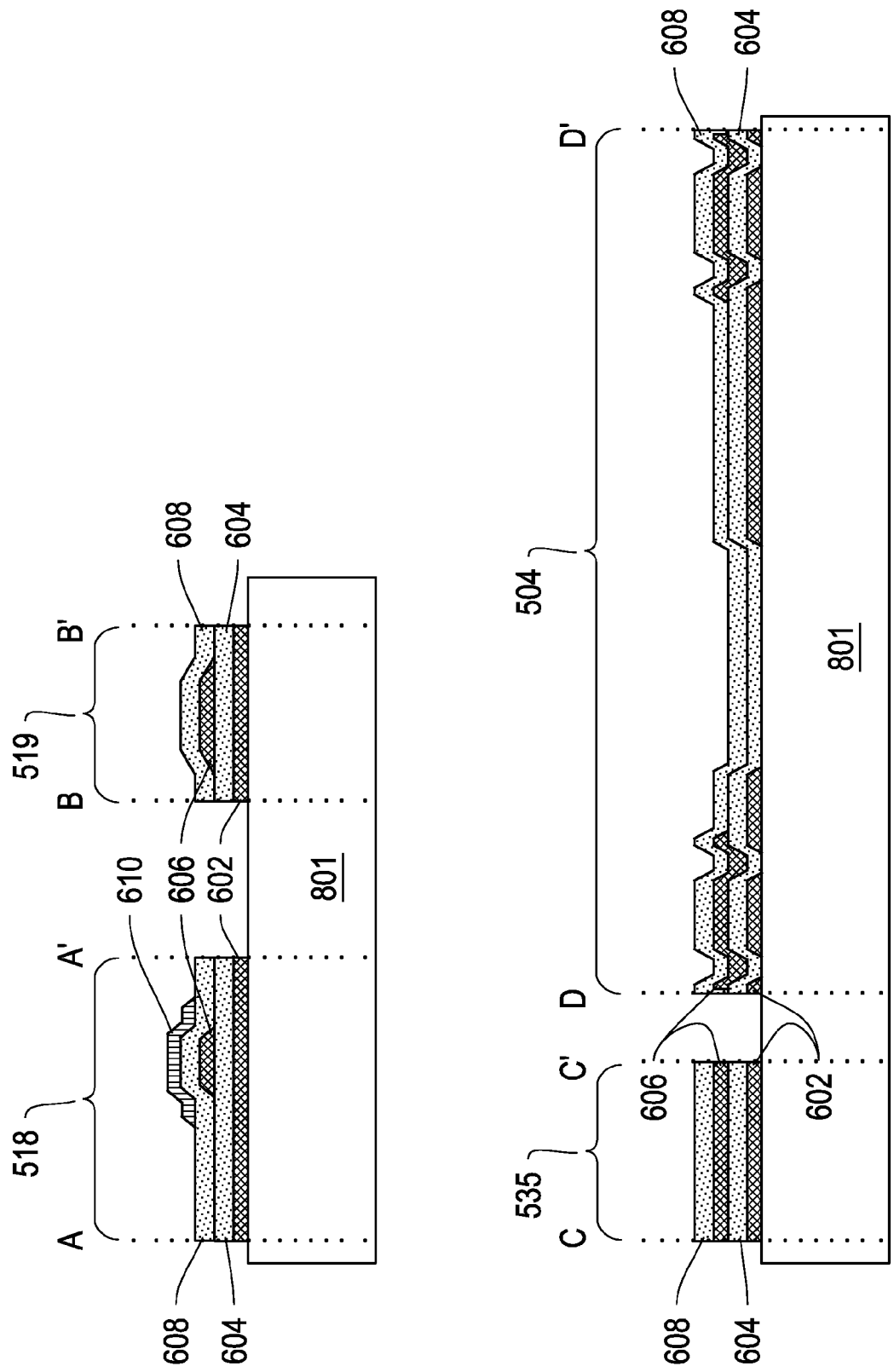
Figure 7E:
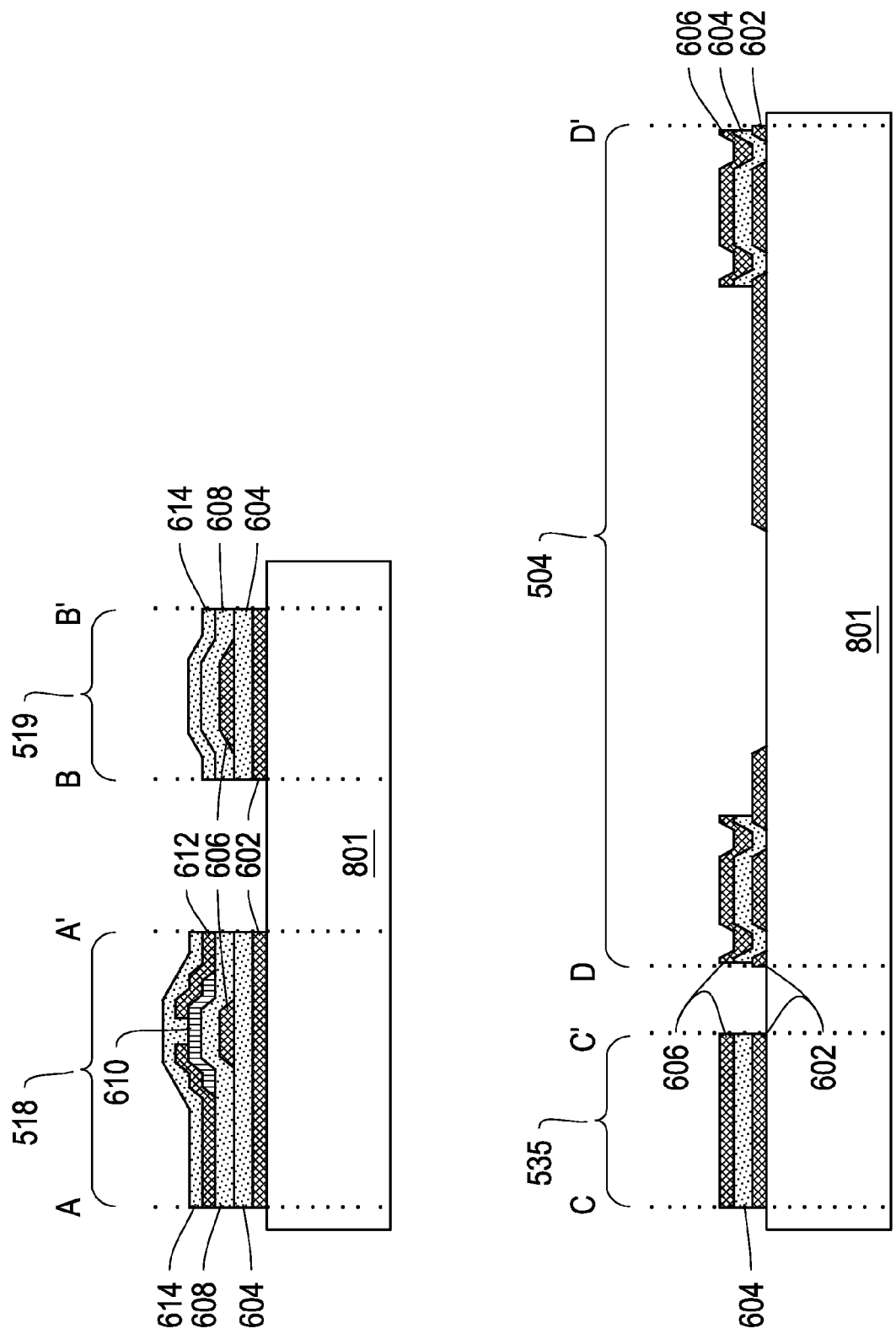
Figure 7F:
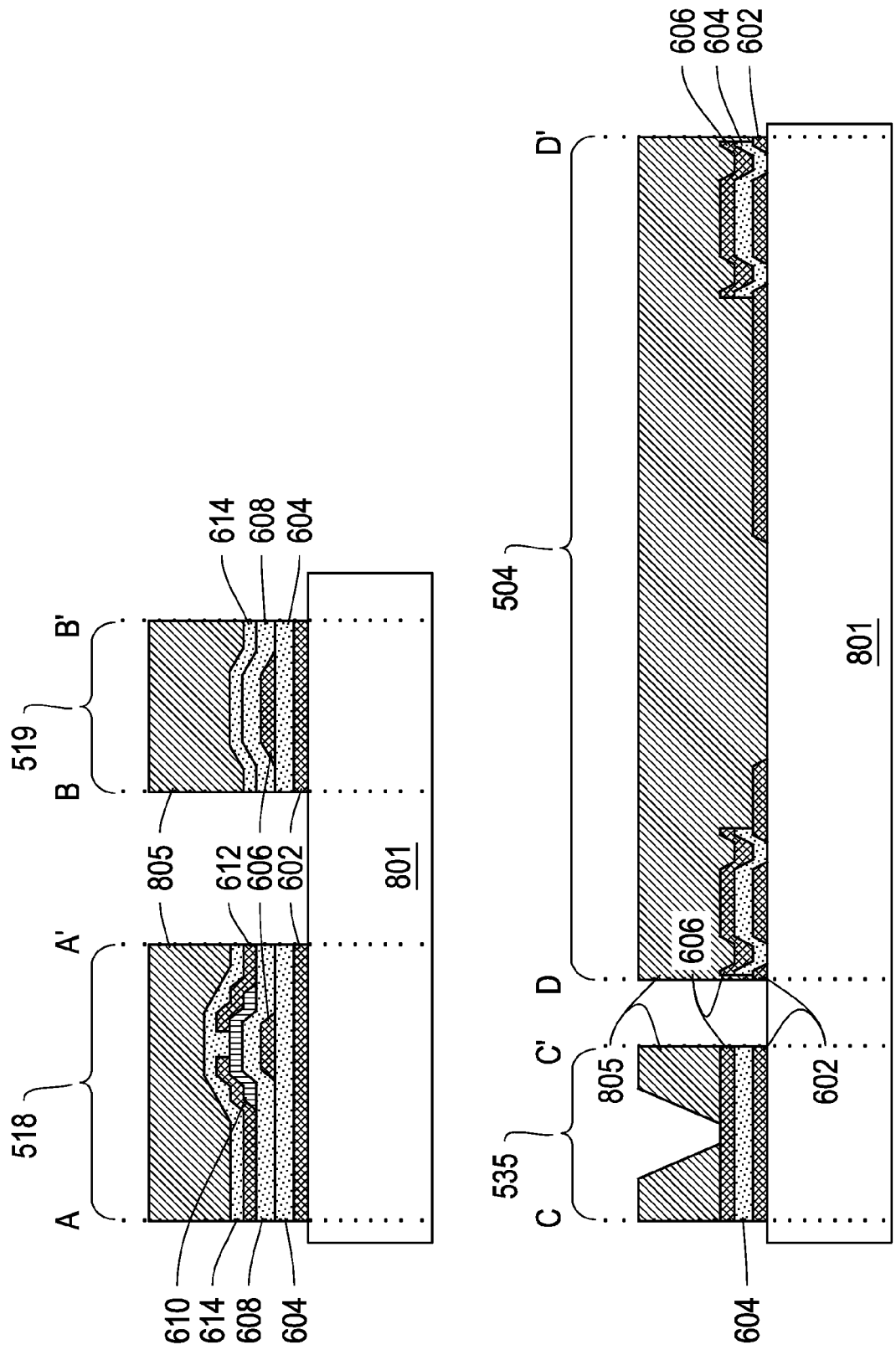
Figure 7G:
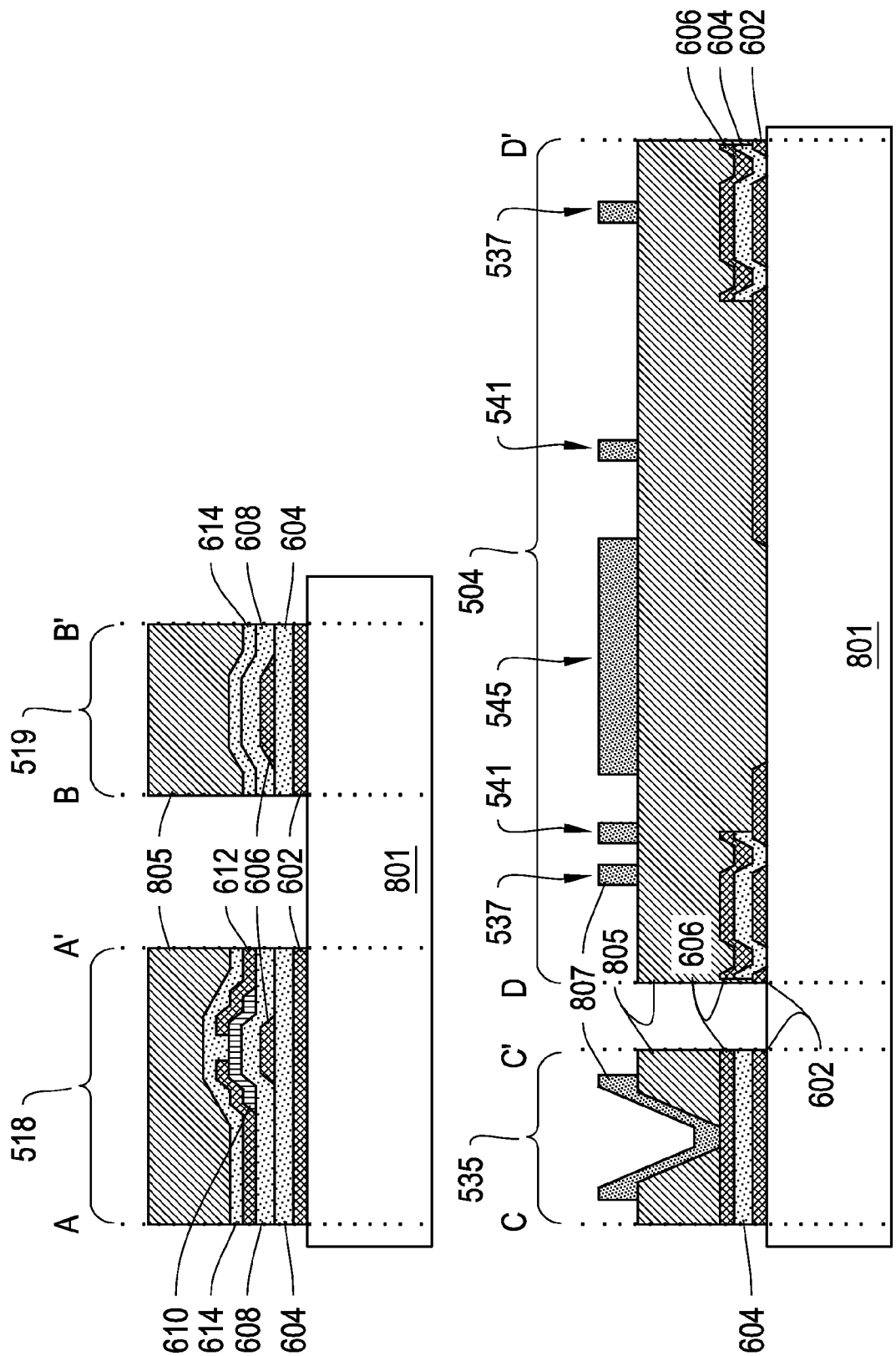

The procedure 700 continues at step 750 with the deposition and patterning of the shutter layer, such as shutter layer 807 illustrated in FIG. 7G. Suitable shutter materials used by themselves include, without limitation, metals such as Al, Cu, Ni, Cr, Mo, Ti, Ta, Nb, Nd, or alloys thereof dielectric materials such as $Al_2O_3$, $SiO_2$, $Ta_2O_5$, or $Si_3N_4$; or semiconducting materials such as diamond-like carbon, Si, Ge, GaAs, CdTe or alloys thereof. Layered combinations of shutter layer materials can also be employed. Shutter layers 807 can be deposited to thicknesses in the range of 0.1 microns to 5 microns. The deposition techniques that can be utilized for thicker shutter materials include DC or RF sputtering, chemical vapor deposition, and/or evaporation. In some cases the shutter material can be deposited from solution by electroless plating or electroplated after deposition of a conducting seed layer onto the exposed surfaces of the sacrificial layer 805.

The procedure 700 continues at step 755 with the removal of the sacrificial layer 805. This step, also referred to as the release step, is intended to free the shutter layer from the mold onto which it was deposited and enable elements formed in the shutter layer 807 to move freely, or at least move as constrained by its actuators and anchors or supports to the substrate. Polymer sacrificial layers 805 can be removed in an oxygen plasma, or in some cases by thermal pyrolysis. Certain inorganic sacrificial layers 805 (such as $SiO_2$, Si, Cu, or Al) can be removed by wet chemical etching and/or vapor phase etching.

Figure 7H:
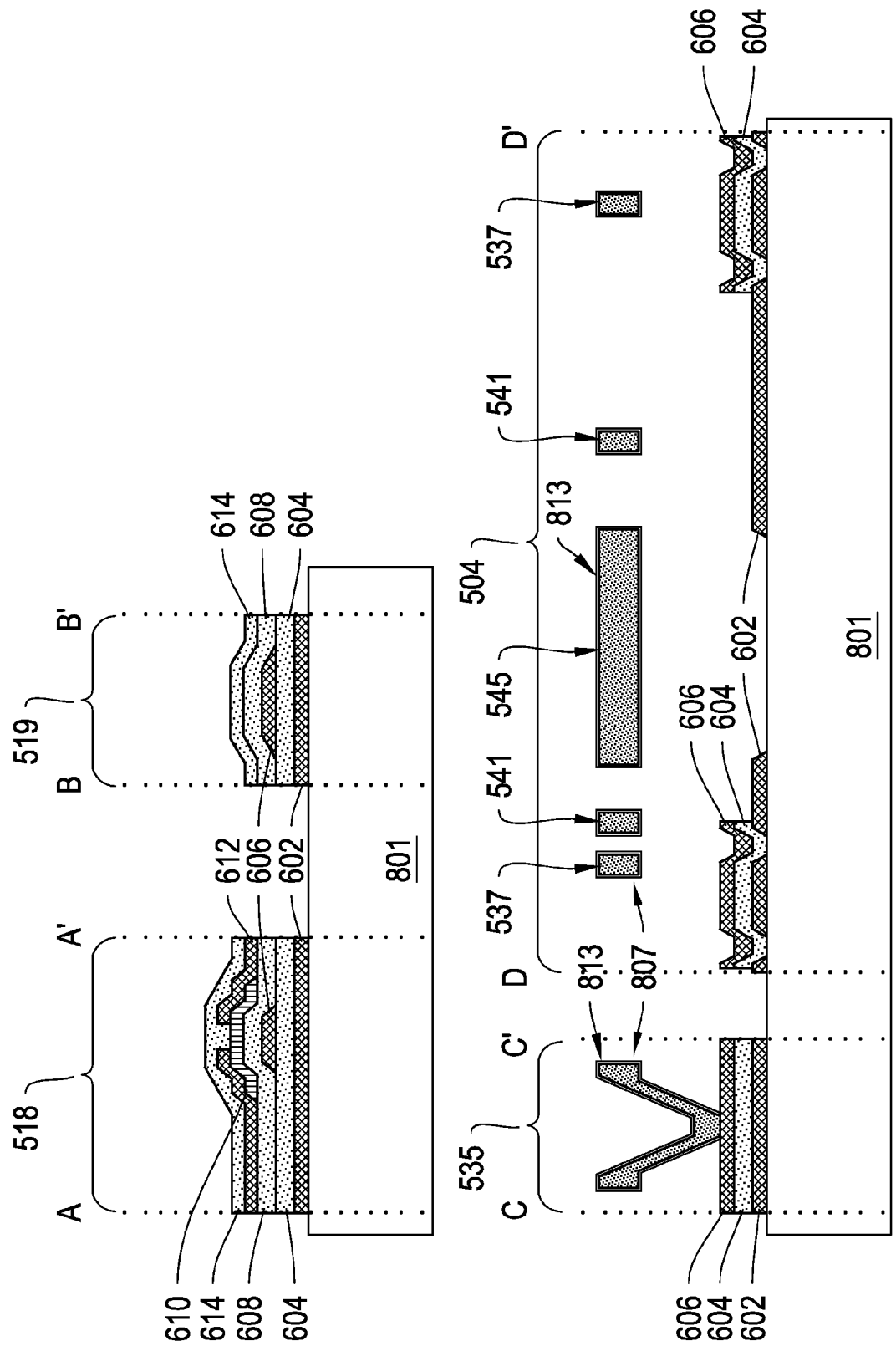

The procedure 700 continues at step 760 with the addition of a dielectric coating layer, such as dielectric coating 813 illustrated in FIG. 7H. Dielectric coatings 813 can be applied in conformal fashion, such that all bottom, tops, and side surfaces of the shutters and beams are uniformly coated. Such thin films can be grown by thermal oxidation and/or by conformal chemical vapor deposition of an insulator such as $Al_2O_3$, $Cr_2O_3$, $TiO_2$, $HfO_2$, $V_2O_5$, $Nb_2O_5$, $Ta_2O_5$, $SiO_2$, or $Si_3N_4$, or by depositing similar materials by means of atomic layer deposition. The dielectric coating layer 813 can be applied with thicknesses in the range of 10 nm to 1 micron. In some cases sputtering and evaporation can be used to deposit the dielectric coating 813 onto sidewalls.

The procedure 700 concludes at step 765 with the cleaning of contact pads. Since the dielectric coating 813 deposited at step 760 coats all surfaces uniformly, it is useful to remove the dielectric coating 813 over contact pads at the periphery of the display, where electrical connections need to be made to driver chips or source voltages. In one embodiment, a sputter etch using an inert gas such as Ar is sufficient to remove the dielectric coating 813 from all exposed surfaces. The sputter etch is preferably applied after the active area of the display has been protected or sealed with a cover sheet (such as a separate piece of glass). The cover sheet prevents the sputter etch from removing dielectric material from any of the shutter assemblies in the pixel area.

In another embodiment, which avoids the sputter etch at step 765, it is possible to pre-treat all contact areas on the periphery of the display so that the dielectric coating 813 applied at step 760 does not adhere to the contact areas and cannot therefore impede an ohmic contact. Such a non-adhering pre-treatment can be achieved by the spray or liquid-dispensed application of certain compounds around the periphery of the display which alter the chemical reactivity of the contact surface. Exemplary surface treatments include the family of trichlorosilanes of chemical composition $CH_3(CH_2)_xSiCl_3$ where x is a number greater than 7 and less than 30, perfluoro-octyltrichlorosilane (FOTS) and dimethyldichlorosilane (DMDCS). Alternative surface treatments include the group of alkanethiols of chemical composition $CH_3(CH_2)_xSH$, where x is a number greater than 7 and less than 30. Such pre-treatments can be effective at blocking the deposition of certain dielectric materials if the deposition is carried out at low temperatures, usually less than 200 degrees C. Such low temperature dielectric depositions can be achieved with the use of atomic layer chemical vapor deposition. The cleaning of the contact pads at step 765 can then be as simple as a heat treatment, exposure to UV radiation, or exposure to ozone to remove organic materials from the bond pads.

In another embodiment which avoids the sputter etch at step 765, it is possible to cover or passivate the contact areas on the periphery of the display with a sacrificial material before deposition of the dielectric material at step 760 of procedure 700. Examples of sacrificial materials which can be applied include photoresist, silicone sealing materials, or polydimethylsiloxane (PDMS). These are materials that can withstand the temperatures required for the dielectric deposition at step 760, in the range of 100 to 300 C. A nozzle dispense tool can be used to deposit a relatively thick layer of these materials selectively in the region of the contact pads.

In the latter embodiment, where the contact area has been previously coated with a sacrificial material before the dielectric deposition, step 765 of procedure 700 entails a removal of the sacrificial material as well as any overlying dielectric material. In some cases the removal of the sacrificial material can be accomplished through a combination of mechanical abrasion, wet chemical or solvent dissolution, and/or oxygen plasma. In cases where the sacrificial material was deposited as a coherent and thick (>20 micron) film of sealant or elastomeric material, the sacrificial material may simply be pulled away with forceps or tweezers. The contact pads can then be further cleaned with either a detergent or a mild acid wash.

It should be appreciated that procedure 700 illustrates one sequence of processes appropriate to the formation of a control matrix, such as control matrix 500, but many other process sequences are possible. In some cases the ordering of the steps can be altered. FIG. 8, for instance, illustrate a structure for a top-gate polycrystalline silicon thin film transistor in which the semiconducting layer 610 is deposited after the first dielectric layer 604 and before the first conducting layer 606.

There are also embodiments of the control matrix in which certain steps of procedure 700 are eliminated. FIG. 10, for instance illustrates a control matrix in which the aperture layer 602 and the first dielectric layer 604 have been eliminated, with their functions taken up by other layers in the control matrix. In other embodiments the third conductor layer 616 can be eliminated.

There are also embodiments in which all of layers of procedure 700 are included, but certain photomasking steps and/or etching steps are eliminated. If no electrical connection between the control matrix and the aperture layer 602 is required, for instance, then the patterning and etching of the first dielectric layer 604 can be eliminated. Procedure 700 includes photomasking and etching steps for each of the dielectric layers 604, 608, and 614. Generally these etching steps are included for the formation of electrical connections or vias between the conductor layers. Similar electrical connections can be made without requiring a via etching step after the deposition of each dielectric. In some cases, for instance, a masking and etching step established at step 735, for instance, can also serve to etch through underlying dielectric layers to reveal electrical connections at lower conductor layers, even to the aperture layer 602, without the aid of previous dielectric masking steps.

FIGS. 7A through 7H demonstrate, by means of cross-sectional drawings, how the step by step procedure of FIG. 6 can be used to build a control matrix and associated shutter assembly. The construction of four independent structures is illustrated in FIGS. 7A through 7H. The four structures are illustrated as if they are adjacent to each other on the substrate 801, but this is for illustrative purposes so that a common height reference might be given. Cross section markers such as A-A' and B-B' are given so that the reader can identify suitable relative orientations of structures within a pixel by comparing markers in FIGS. 7A through 7H to the same markers in FIG. 4B/4C. FIGS. 7A through 7H demonstrate how to build a transistor such as transistor 518 or transistor 210 with an associated capacitor 519. The transistor labeled as transistor 518 in FIGS. 7A-7H may, in fact, represent the cross section of any of the transistors 516, 517, 520, 522, or 527 shown in FIG. 4B/4C. Also shown in FIGS. 7A through 7H is how to fabricate a representative MEMS shutter assembly such as shutter assembly 504 (which is similar to shutter assembly 202) with associated aperture hole 543 (or aperture hole 254). Also illustrated is the fabrication of a representative drive anchor such as drive anchor 535, which is similar to drive anchor 148.

FIG. 7A shows the structure of transistor 518, capacitor 519, drive anchor 535 and shutter assembly 504 after application of steps 705 and 710 of procedure 700. The structures in FIG. 7A include an aperture layer 602 and a first dielectric layer 604. Neither of these layers is patterned underneath the transistor or capacitor. A photopattern is, however, applied to the aperture layer 602 in the region of shutter assembly 504. An opening is made in the aperture layer at the point of the aperture hole 543. Openings are also made in the aperture layer 602 to electrically isolate regions of the aperture layer 602 that will underly the drive beams 537 (shown in FIG. 7E). After the first dielectric layer 604 is deposited over the aperture layer 602, it is allowed to remain in blanket fashion over the top of the aperture layer 602.

FIG. 7B shows the structure of transistor 518, capacitor 519, drive anchor 535 and shutter assembly 504 after application of steps 715 and 720 of procedure 700. FIG. 7B includes pre-existing layers 602 and 604. At step 715 the first conductor layer 606 is deposited and patterned. At the transistor 518 the first conductor layer 606 is patterned to form the gate metal. At the capacitor 519 the first conductor layer 606 is patterned to form the upper electrode of the capacitor. The lower electrode of capacitor 519 is formed by the aperture layer 602. For the drive anchor 535 the first conductor layer is allowed to remain intact, as it will form part of the electrical connection to the drive anchor. In the region of the shutter assembly 504 the first conductor layer 606 is completely etched away. At step 720 the second dielectric 608 is allowed to remain intact over all of the structures in FIG. 7B.

The patterned edges of the gate metal at transistor 518 and the upper electrode of capacitor 519 have been beveled. Beveled edges can be useful for ensuring a conformal coating for deposition of subsequent dielectric layers and to avoid dielectric cracks which can form due to stress concentrations. Cracks in dielectric layers can lead to electrical leakage between conductor layers.

The photomasks employed at step 715 can also be used to pattern the first conductor layer 606 into any of a number of interconnect lines, such as the scan-line interconnect 506 shown in FIG. 4B/4C.

FIG. 7C shows the structure of transistor 518, capacitor 519, drive anchor 535 and shutter assembly 504 after application of step 725 of procedure 700. FIG. 7C includes pre-existing layers 602, 604, 606, and 608. At step 725 the semiconductor layer 610 is deposited and patterned. For the inverted, staggered, back-channel etch transistor 518 the deposition of the semiconductor often proceeds in two steps. First a lightly doped amorphous silicon layer is deposited followed by the deposition of a doped amorphous silicon layer. The two layers which comprise semiconductor layer 610 are then patterned together to form the "silicon island". The edges of the silicon island are often beveled. The semiconductor layer 610 is removed, via the photopattern and etch steps, from all of the other structures shown in FIG. 7C.

FIG. 7D shows the structure of transistor 518, capacitor 519, drive anchor 535 and shutter assembly 504 after application of step 730 of procedure 700. FIG. 7D includes pre-existing layers 602, 604, 606, 608, and 610. At step 730 the second conductor layer 612 is deposited and patterned to establish the source 804a and drain 804b regions of transistor 518. For the inverted, staggered, back-channel etch transistor illustrated in FIG. 7, the opening or gap formed between features of the metal layer 612 on top of transistor 518 determines the critical dimensions (length and width) of the conducting channel through the semiconducting layer 610. The etch used to separate conducting layer 612 into source and drain regions 804a and 804b is also continued into the silicon island until it consumes the upper regions or the doped amorphous silicon component of semiconductor layer 610. The only amorphous silicon which remains in the channel region of transistor 518 is the undoped or lightly doped condition. The second conductor layer 612 is removed via the photopattern and etch steps from all of the other structures shown in FIG. 7D. The underlying dielectric layer 608 forms a convenient etch stop for the patterning or removal of parts of second conductor layer 612.

The photomasks employed at step 730 can also be used to pattern the second conductor layer 612 into any of a number of interconnect lines, such as data-open interconnect 508a or pre-charge interconnect 510 shown in FIG. 4B/4C.

FIG. 7E shows the structure of transistor 518, capacitor 519, drive anchor 535 and shutter assembly 504 after application of step 735 and 740 of procedure 700. FIG. 7E includes pre-existing layers 602, 604, 606, 608, 610, and 612. At step 735 the third dielectric layer 614 is deposited and patterned. The dielectric layer 614 generally serves the purpose of passivating or protecting the transistor 518 and capacitor 519 from subsequent processing and from the packaging environment of the display. The dielectric etching step which is employed at step 735, however, has also been used to remove all of the dielectric materials that had been covering the first conductor layer 606 in the region of the drive anchor 535, and that had covered the aperture layer 602 in the region of the shutter assembly 504. Assuming that similar materials are employed at all preceding dielectric deposition steps, the etch chemicals used in the patterning of the third dielectric layer 614 can etch all underlying dielectric layers and can stop with good selectivity either on the glass substrate 801 or on either of the metal-containing layers 602 or 606. At step 740 of procedure 700 the third conductor layer is deposited and removed from all of the structures shown in FIG. 7. Optionally the third conductor layer 616 is allowed to remain in the region of the drive anchor 535 to assist with formation of an ohmic contact to the drive anchor.

FIG. 7F shows the structure of transistor 518, capacitor 519, drive anchor 535 and shutter assembly 504 after application of step 745 of procedure 700. FIG. 7E includes pre-existing layers 602, 604, 606, 608, 610, 612 and 614. At step 745 the sacrificial layer 805 is deposited and patterned. In this illustrated example, patterns in the sacrificial layer are only required in the vicinity of the anchors, such as drive anchor 535 where attachment of the shutter assembly will be made to the substrate.

FIG. 7G shows the structure of transistor 518, capacitor 519, drive anchor 535 and shutter assembly 504 after application of step 750 of procedure 700. FIG. 7G includes pre-existing layers 602, 604, 606, 608, 610, 612, 614 and 805. At step 750 the shutter layer 807 is deposited and patterned. The shutter material will generally lie flat, covering the surface of the sacrificial material, and it will also coat the sides and the bottom of the holes patterned in the sacrificial layer at step 745, as illustrated at the drive anchor 535. The pattern that is etched into shutter layer 807 will define the shutter 545, which in FIG. 7G is in a position to block the aperture hole 543. The pattern etched into the shutter layer 807 can also define the actuator beams of the shutter assembly, such as compliant load beams 541 or the compliant drive beams 537. The material of the shutter layer 807 is removed from the vicinity of the transistors, such as transistor 518 and the capacitors, such as capacitor 519.

FIG. 7H shows the final structure of the transistor 518, capacitor 519, drive anchor 535 and shutter assembly 504 after application of step 765 of procedure 700. The structures in FIG. 7H include the aperture layer 602, the first dielectric layer 604, the first conductor layer 606, the second dielectric layer 608, the first semiconductor layer 610, the second conductor layer 612, the third dielectric layer 614, and the shutter layer 807. The structures shown in FIG. 7G are achieved after removal of the sacrificial layer 805 in step 755 of procedure 700. The shutter assembly illustrated in FIG. 7G includes a patterned aperture hole 543, a shutter 545, and two sets of compliant actuator beams 537 and 541. As was illustrated in plan view figures such as FIG. 2, FIG. 3, and FIG. 4B/4C, the compliant load beams 541 mechanically connect the shutter 545 to a shutter anchor, such as shutter anchor 539 or shutter anchor 138. The structures shown in FIG. 7H are achieved after removal of the sacrificial layer in step 755 of procedure 700. Also shown are the dielectric coatings 813 that are deposited on all surfaces of the shutter assembly at step 760 of procedure 700.

It should be appreciated that variations of the structures 518, 519, 535, and 504 are possible. The capacitor 519 is illustrated in FIG. 7H as using electrodes from the aperture layer 602 and the first conductor layer 606. Similar capacitors can be established using procedure 700 by using other metal layers as electrodes. For example, the capacitor 519 could be formed using the first conductor layer 606 and the second conductor layer 612, or the third conductor layer electrodes.

FIG. 7H shows a drive anchor 535 in which electrical connection is made between the shutter layer 807 and the first conductor layer 606. In other embodiments a drive anchor can be utilized in which the electrical and mechanical connection is established at either higher or lower levels. For instance, using procedure 700, the drive anchor could be established as a direct connection to the aperture layer 602 or to the third conductor layer 616.

FIGS. 5 through 7 have illustrated the structure of control matrix 500 using the example of the inverted, staggered, back-channel etched thin film transistor (TFT). Many alternative thin film switch structures, however, are known in the art and can be adapted to the benefit of a MEMS-based shutter display. Several of alternative switches are illustrated in FIG. 8 and described in texts such as in *Active Matrix Liquid Crystal Displays* by Willem den Boer (Elsevier, Amsterdam, 2005).

Figure 8A:
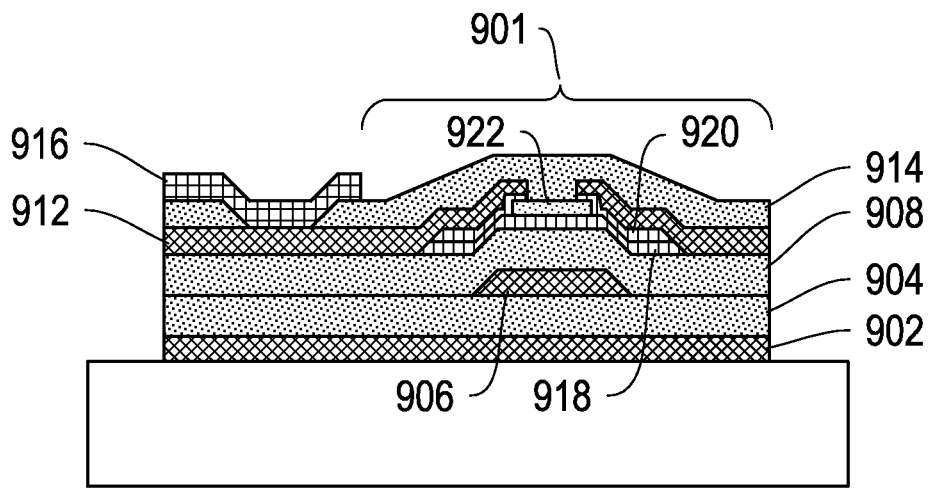
FIGS. 8A-8C are cross sectional views of alternate switch structures for use in the control matrix of FIG. 4B, according to an illustrative embodiment of the invention.
Figure 8B:
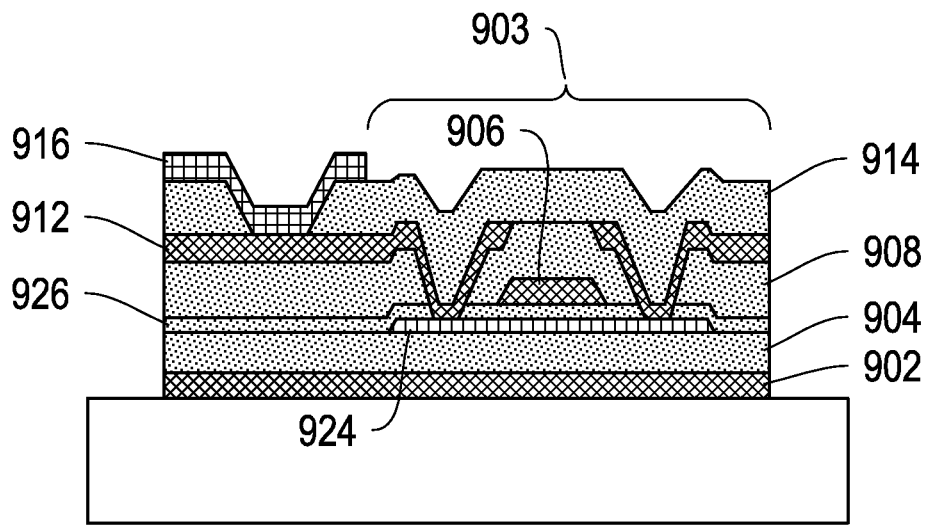
Figure 8C:
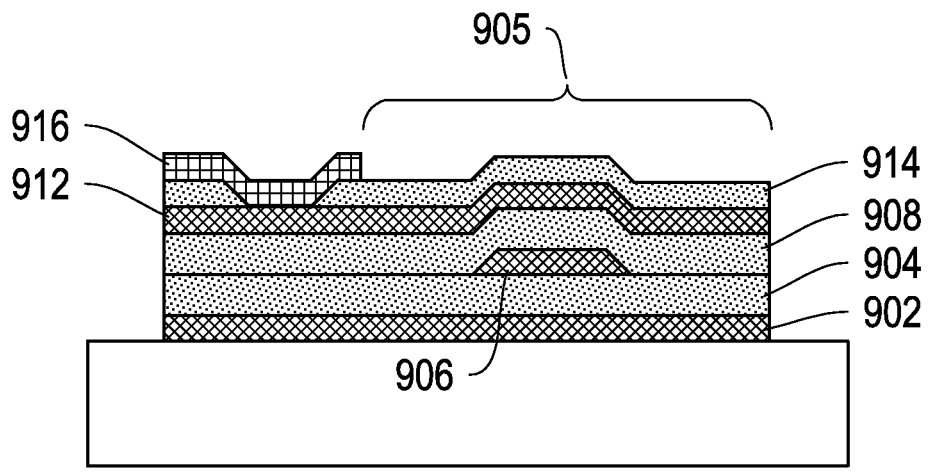

FIG. 8A illustrates the inverted, staggered, etch-stopper or trilayer TFT 901. FIG. 8B illustrates a top-gate TFT 903, commonly used with polycrystalline silicon as opposed to amorphous silicon. FIG. 8C illustrates a metal-insulator-metal (MIM) structure, often referred to as the thin film diode 905. Each of the structures 901, 903, and 905 contain certain layers with similar functions and similar deposition/patterning processes as compared to those found in transistor 518 (FIG. 5). These include an aperture layer 902, a first dielectric layer 904, a first conductor layer 906, a second dielectric layer 908, a second conductor layer 912, a third dielectric layer 914, and a third conductor layer 916.

In comparison to the transistor 518 and the process flow 700, the process for the etch-stopper TFT 901 adds two extra layers and one extra photomask. The etch stopper TFT includes two separately deposited (instead of one) semiconducting layers: an intrinsic amorphous silicon layer 918 and a doped amorphous silicon layer 920. The etch stopper TFT 901 also adds an additional etch-stopper dielectric layer 922, which is deposited immediately following the intrinsic amorphous silicon layer 918. Continuing the process for the etch stopper TFT, the etch-stopper dielectric layer 922 is typically patterned into an island over the top of the TFT. Next the doped amorphous silicon layer 920 is deposited and both semiconductor layers 918 and 920 are then patterned into a silicon island. Next the second conductor layer 912 is deposited. The process for patterning/etching the second conductor layer 912 into source and drain regions includes an etch process for the underlying doped amorphous silicon layer 920. This etch process will be naturally stopped when the etchant reaches the etch stopper dielectric layer 922, thereby giving this process considerably more latitude for variations (without serious transistor degradation) as compared to the source/drain patterning of step 730 of procedure 700. The materials used for the first and second conductor layers 906 and 912 are similar between transistor 901 and transistor 518, however, and the switching properties of the transistors are similar. Via structures, which will be described below in FIG. 9, are also substantially unaffected by the use of the structure of either transistor 518 or transistor 901.

FIG. 8B shows the structure of a common top-gate low-temperature polycrystalline thin film transistor (LTPS-TFT) 903. In comparison to transistor 518 (FIG. 5) and procedure 700, the LTPS-TFT changes the order and sequence of the semiconductor layers and the first conductor layer. FIG. 8B includes a polycrystalline silicon layer 924 that is deposited immediately after the first dielectric layer 904. The silicon layer 924 is typically deposited as an amorphous silicon layer and then converted to polycrystalline silicon by means of excimer laser annealing before patterning into a silicon island. The patterning of the polycrystalline silicon layer is then followed by the deposition in blanket fashion of an extra layer, the gate insulating layer 926. Next the first conductor layer 906 is deposited and patterned to form the gate metal. Next the source and drain areas of the silicon island are doped with either boron or phosphorus by either ion implantation, plasma-immersion, or ion shower doping techniques. (A self-aligned doping of the source and drain is made possible by the shielding of the gate metal.) Next the second dielectric layer 908 is deposited and patterned into a set of via openings, similar to the M1-M2 via 531 which is described below with respect to FIG. 9. Next the second conducting layer 912 is deposited and patterned to form the connections to source and drain. The process is completed with layers 914 and 916 in a sequence similar to that described in procedure 700.

The polycrystalline silicon material in layer 924 has significantly higher carrier mobility than what is available for amorphous silicon transistors, such as transistor 518. As a result, it is possible to drive similar currents and similar switching speeds with LTPS transistors while using significantly less area than that which is required for amorphous silicon transistors. The use of high mobility, small area LTPS transistors, therefore, makes it possible to build MEMS-based shutter displays with smaller pixels, tighter pitch and therefore higher resolution formats within a substrate of fixed size.

When adapting an LTPS transistor, such as transistor 903, to the MEMS-based shutter display, other useful modifications can be made to photopatterns and process flows. For instance, in order to form the Ap-M1 via 533, as illustrated in FIG. 9A-9F for use with an LTPS transistors like transistor 903, it is suitable to remove the polycrystalline silicon layer 924 in the region of the via 533. Also, in forming via 533, the same photopattern and etch that would normally open the via through the first dielectric layer 604 (step 710, illustrated in FIG. 9B) can be delayed until after the deposition of the gate dielectric layer 926.

Another common variation of the thin film transistor, known in the art but not illustrated in FIG. 8, is the staggered top-gate amorphous silicon transistor. In this further variation of the inverted staggered transistor 518 (FIG. 5), the roles of the two conductor layers are reversed. The first conductor layer 606 is employed to form the source and drain contacts to a semiconductor layer 610 that is deposited immediately above it. The second conductor layer 612 is used to form the gate structure. In order to adapt the MEMS-based shutter display to the amorphous top-gate transistor the scan-line interconnect 506 may preferably be patterned into the second conductor layer 612 instead of into the first conductor layer 606. Conversely, other interconnect lines, such as data-open interconnect 508*a* or pre-charge interconnect 510 may preferably be patterned into the first conducting layer 606. The use of the amorphous top-gate transistor may save some space within a pixel by eliminating the need of some vias such as the M1-M2 via 531 for connecting the drain of certain transistors to the drive anchors 535.

FIG. 8C shows the structure of a MIM thin film diode 905. In comparison to transistor 518 (FIG. 5) the diode 905 does not include any semiconductor layer. Instead a particular choice of materials is used for the second dielectric material 908. The materials chosen for second dielectric material 908 include $Si_3N_4$, $Ta_2O_5$, or diamond-like carbon, materials which are known for their performance as either leaky dielectrics or dielectrics that have the ability to trap charge. Techniques employed for the deposition of these materials include plasma-assisted chemical vapor deposition (PECVD), hot wire deposition, or sputtering followed by electrochemical anodization.

In operation the MIM diode 905 behaves as a varistor, which can assist with improving the selectivity, addressing, and/or contrast achievable in large pixel arrays as compared to the use of a passive matrix. The processes used to form the via structures (see FIG. 9 below) can be adapted with little change for use with the MIM diode 905. It may be less expensive to produce a control matrix using the MIM diode 905 as a switch structure since these switches can be produced with one less deposition step, one less photomask, and have easier to achieve patterning dimensions when compared to the amorphous silicon transistor 518.

The thin film switches 901, 903, and 905 are just three examples of many possible variations on the structure of a thin film switch. It will be appreciated from the examples listed above and by those skilled in the art that other variations are possible. Similar structures can be built that include either a greater or fewer number of layers than those illustrated above or listed in procedure 700 or that include variations to the order of steps described within procedure 700.

Figure 9A:
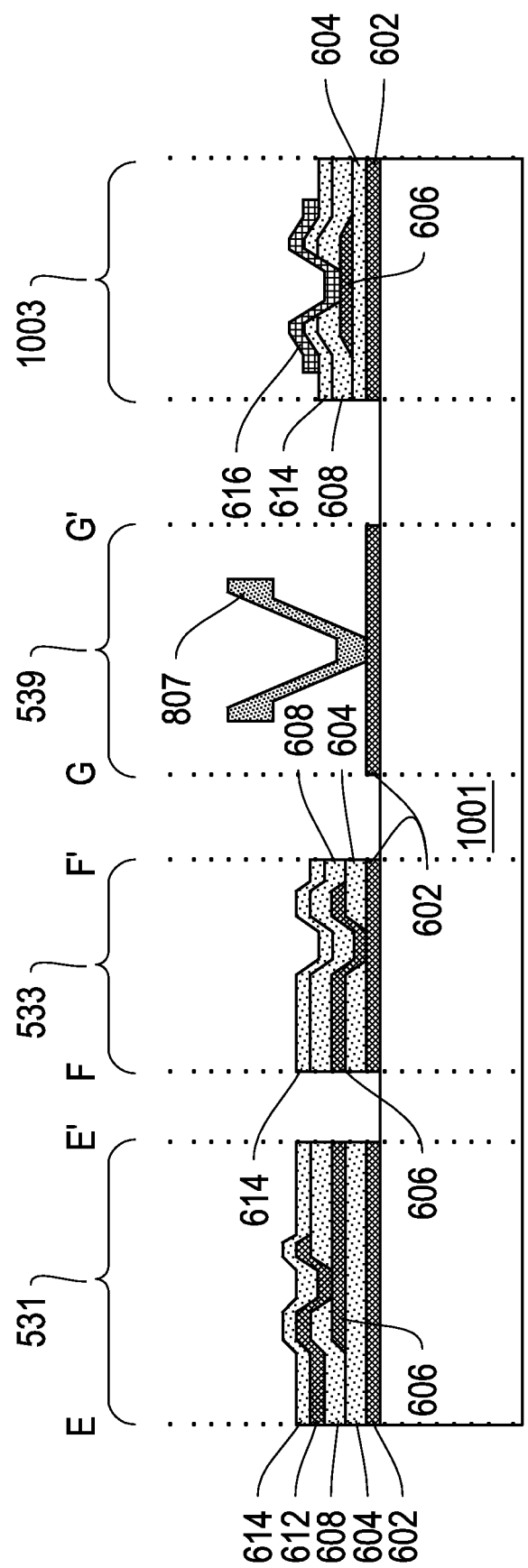
FIGS. 9A-9F are cross sectional views of stages of construction of the control matrix of FIG. 4C, according to an illustrative embodiment of the invention.

FIG. 9A presents a cross sectional view of several of the via structures that can be employed as elements of control matrix 500, especially to assist with the interconnection between transistors or between transistors and the anchors of the shutter assembly. FIG. 9A includes four distinct types of via structures. FIG. 9A includes the M1-M2 via 531, which is a via for connecting the first conductor layer 606 to the second conductor layer 612. FIG. 9A includes the Ap-M1 via 533, which is a via that connects the aperture layer 602 to the first conductor layer 606. FIG. 9A also illustrates the shutter anchor 539, which provides the mechanical and electrical support or connection between the shutter 545 and the control matrix 500. The structures in FIG. 9A are illustrated as if they are adjacent to each other on the substrate 1001, but this is for illustrative purposes only so that a common height reference might be given. Cross section markers such as E-E' or F-F' are given so that the reader can identify the positional relationships of these structures within the pixel by comparing markers in FIGS. 9A through 9F to the same markers in FIG. 4B/4C.

FIG. 9A also illustrates a cross section through a bond pad 1003. The bond pad 1003 facilitates the electrical connection between first conductor layer 606 and driver chips or voltage sources which might be mounted around the periphery of the display. The bond pad is not shown in FIG. 4B/4C.

Each of the via structures shown in FIG. 9A includes several metal and dielectric layers in common. Each of these via structures includes an aperture layer 602, a first dielectric layer 604, a first conductor layer 606, a second dielectric layer 608, a second conductor layer 612, a third dielectric layer 614, a third conductor layer 616, and a shutter layer 807.

The procedure 700 described in FIG. 6 can be used to build each of the via structures described in FIG. 9A. A step-by-step description of the manufacturing process is illustrated with respect to the via structures in FIGS. 9B-9F. FIGS. 9B-9F also illustrate typical design guidelines that are incorporated in photomasks applied at the various steps of procedure.

Figure 9B:
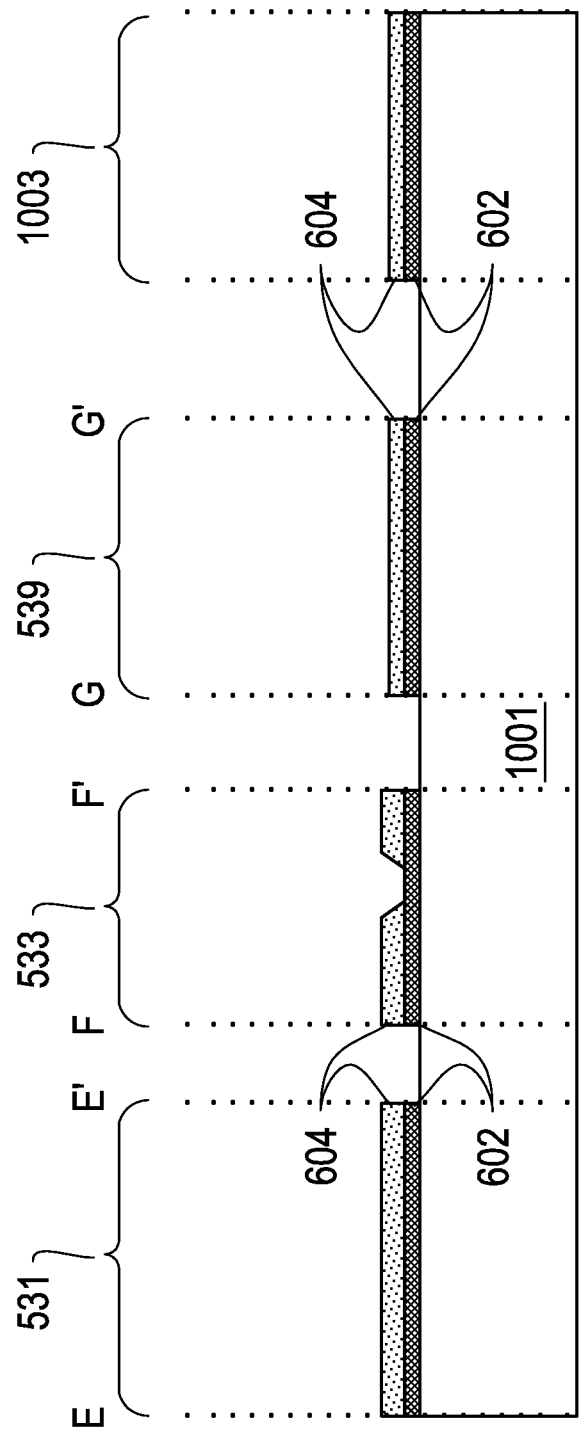

FIG. 9B shows the structure of the M1-M2 via 531, the Ap-M1 via 533, the shutter anchor 539, and the bond pad 1003 after application of steps 705 and 710 of procedure 700. The via structures in FIG. 9A receive blanket depositions of the aperture layer 602 followed by a blanket deposition of the first dielectric layer 604. The via structures in FIG. 9A do not require any patterning at step 705 for the aperture layer 602. Only one of the via structures, namely the Ap-M1 via 533, requires any patterning at the first dielectric step-step 710. In the case of Ap-M1 533, a via opening is etched through first dielectric layer 604 so that subsequent electrical contact can be made to the aperture layer 602 through the Ap-M1 via. The width of the via hole is typically 2 to 30 microns. The via holes are typically square although rectangular vias are also possible. The thickness of the first dielectric layer is typically in the range of 0.1 to 2.0 microns.

Figure 9C:
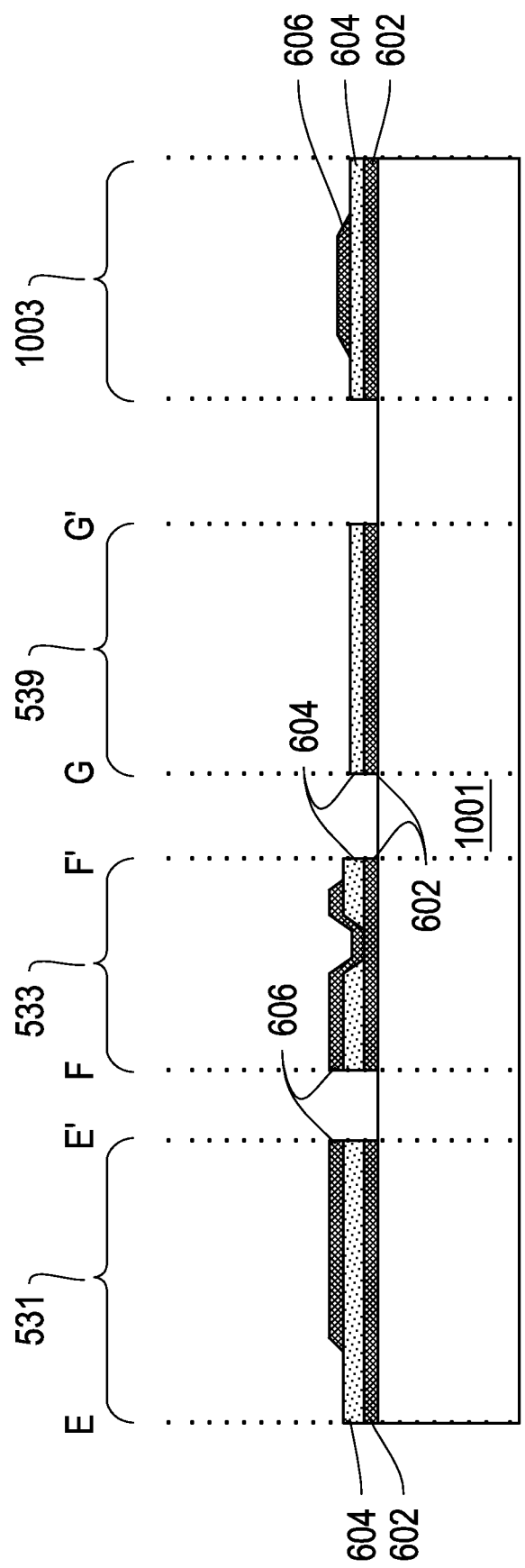

FIG. 9C shows the structure of the M1-M2 via 531, the Ap-M1 via 533, the shutter anchor 539, and the bond pad 1003 after application of step 715 of procedure 700. FIG. 9C includes pre-existing layers 602, 604. When deposited, the first conductor layer 606 completely fills the via that was opened in the first dielectric layer of the Ap-M1 via 533. Preferred design guidelines indicate that patterned metal depositions should overfill the via holes provided in previous steps by at least 2 microns. FIG. 9C also shows that, at shutter anchor 539, the first conductor layer 606 is completely etched away after deposition to reveal the first dielectric layer 604. All patterned edges of the first conductor layer 606 are beveled. Most etch chemistries available for metals in the first conductor layer 606 have a good selectivity to the underlying first dielectric layer 604, so that the metal etch does not appreciably attack the underlying dielectric layer. Preferred design guidelines avoid situations in which the etch of one metal layer is required to stop an underlying metal layer.

Figure 9D:
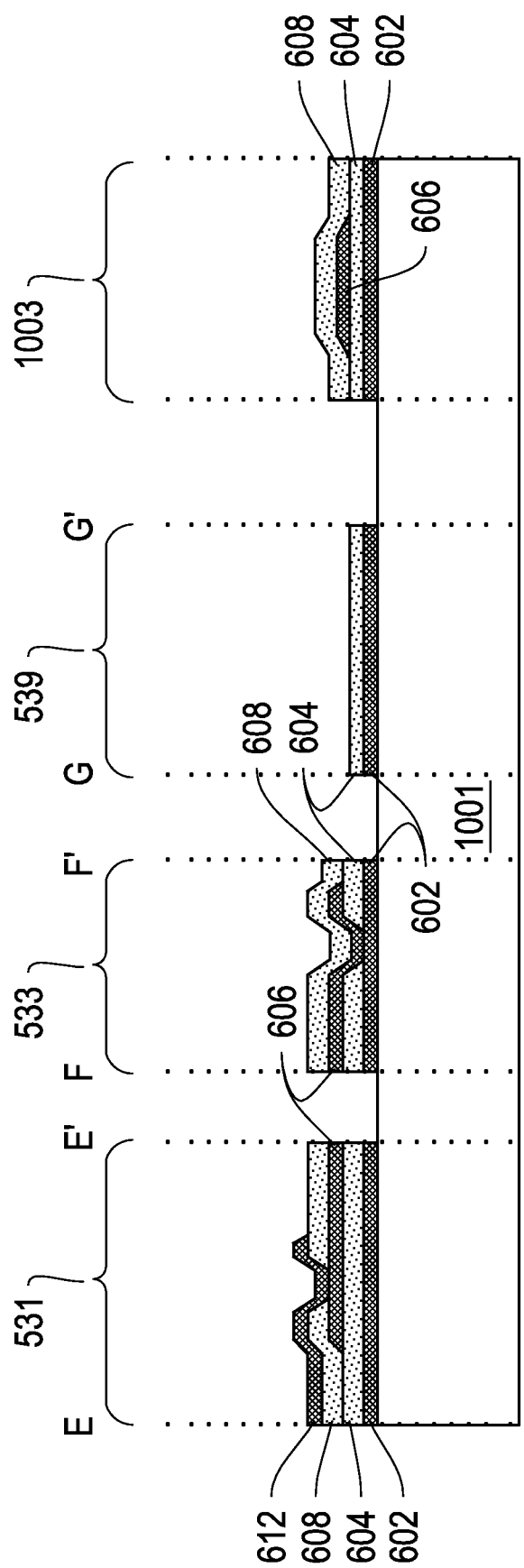

FIG. 9D shows the structure of the M1-M2 via 531, the Ap-M1 via 533, the shutter anchor 539, and the bond pad 1003 after application of application of steps 720, 725, and 730 of the procedure 700. FIG. 9D includes pre-existing layers 602, 604, and 606. Step 720 is used to deposit the second dielectric layer 608, with patterning to open up a via in the M1-M2 structure 531. Blanket (i.e. unpatterned) dielectric is allowed to remain over all of the other via structures. The semiconductor layer 610 is not included in any of the via structures in FIG. 9A. At step 725, the first semiconductor 610 is etched away from each of the structures in FIG. 9D. In step 730, the second conductor layer is allowed to completely fill the M1-M2 via 531 that was provided by etching through the second dielectric material 608. The second conductor layer 612 is completely removed from the surfaces of the other vias, with the metal etch stopping on all underlying dielectric layers.

Figure 9E:
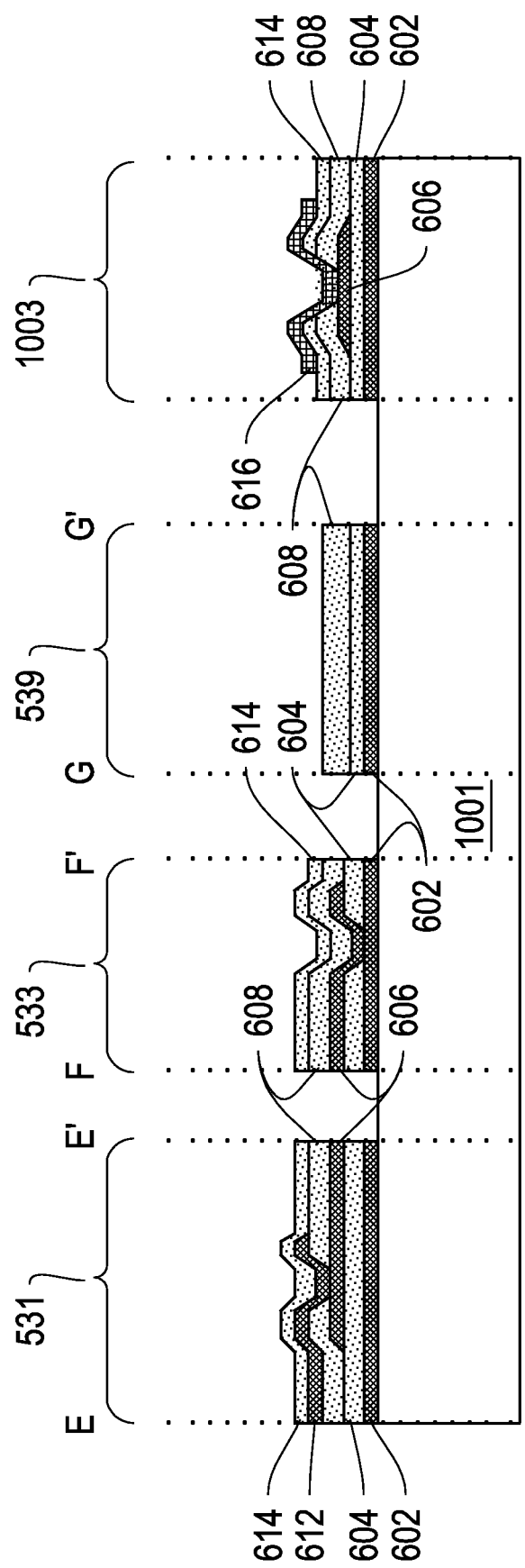

FIG. 9E shows the structure of the M1-M2 via 531, the Ap-M1 via 533, the shutter anchor 539, and the bond pad 1003 after application of application of steps 735 and 740 of the procedure 700. FIG. 9E includes pre-existing layers 602, 604, 606, 608, and 612. The purpose of step 735 is to use the third dielectric layer 614 to passivate and protect the surface of all transistors and interconnect materials, as is shown at the M1-M2 via 531 and at the Ap-M1 via 533. The third conductor layer 616 is not included and therefore completely removed from M1-M2 via 531 and from the Ap-M1 via 533 at step 740 of the process. Both the third dielectric layer 614 and the third conductor layer 616 are removed in the region of the shutter anchor 539.

FIG. 9E illustrates the completion of bond pad 1003. The purpose of bond pad 1003 is to provide a via through the third dielectric layer 614 for purpose of making electrical contact to underlying conductor layers at the periphery of the display. The bond pad 1003 shows an electrical via or contact between the third conductor layer 616 and the first conductor layer 606. The via etching step that takes place within step 735 is unusual in that it is designed to etch through both the third dielectric layer 614 and the second dielectric layer 608, and to end on any underlying metal. In the region of shutter anchor 539, the etch employed for dielectric layers 614 and 608 will etch part way into, but not all of the way into the first dielectric layer 604. Step 740 provides a for the filling of the bond pad 1003 with the third conductor layer 616, which is patterned to cover and passivate the bond pads on the periphery of the display.

Figure 9F:
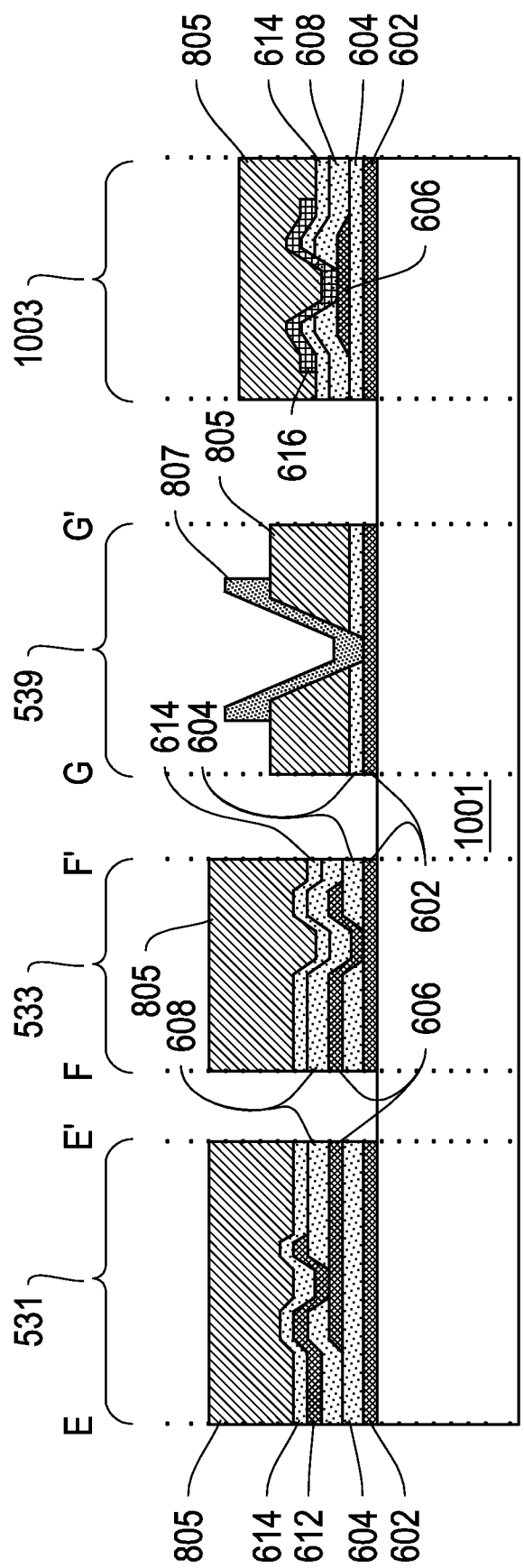

FIG. 9F shows the structure of the M1-M2 via 531, the Ap-M1 via 533, the shutter anchor 539, and the bond pad 1003 after application of steps 745 and 750 of procedure 700. FIG. 9E includes pre-existing layers 602, 604, 606, 608, 612, 614, and 616. The sacrificial layer 805 of step 745 is allowed to cover or passivate all structures except at the shutter anchor 539, which forms the mechanical attachment for the shutter and load beams. Step 750 includes the deposition and patterning of the shutter material.

The final step in the formation of these via structures is described as step 755 of procedure 700—the removal of the sacrificial layer. After step 755 is complete the final structure of all vias is complete, as is illustrated in FIG. 9A.

It should be appreciated that other variations are possible. Comparing FIG. 9A to FIG. 7H, one sees that the shutter anchor and the drive anchor have been established at different metal layers: The drive anchor 535 connects directly to the first conductor layer 606, while the shutter anchor 539 connects directly to the aperture layer. Embodiments are also possible in which the shutter anchor and the drive anchor attach to the same metal layer, such as the first conductor layer 606, which can reduce any mechanical height differences in the shutter assembly 504.

Not shown in FIGS. 7A-7H or in FIG. 9A-9E are the formation of interconnect lines such as scan line interconnect 506, or data line interconnect 508a, or pre-charge interconnect 510. It should be appreciated that these interconnects can feasibly be created within procedure 700 by creating the appropriate photopattern in any of the conductor layers of control matrix 500, such as the aperture layer 602, first conductor layer 606, second conductor layer 608, third conductor layer 616, or in the shutter layer 807.

Figure 10:
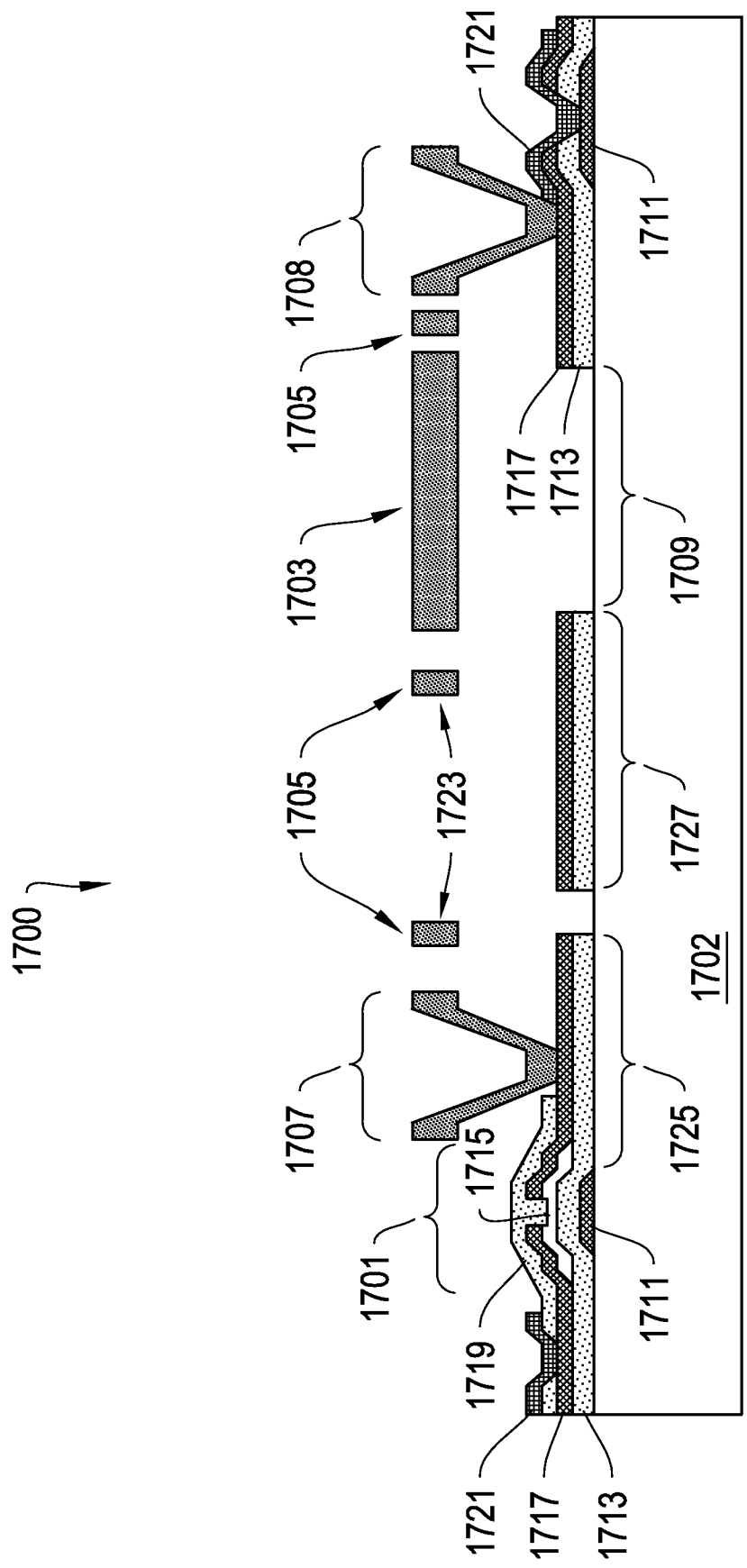
FIG. 10 is a cross section view of an alternate thin film structure for the shutter assembly, aperture, and associated control matrix, according to an illustrative embodiment of the invention.

FIG. 10 shows a cross section of structures for a shutter assembly, aperture, and associated control matrix 1700 for controlling light modulators, suitable for inclusion in the display apparatus 100. The control matrix 1700 includes an inverted staggered back-channel etched thin film transistor 1701, which is similar to transistor 518, built on substrate 1702. The shutter assembly includes a shutter 1703, compliant beams 1705, a drive anchor 1707 and a shutter anchor 1708. The control matrix includes the following layers: a first conductor layer 1711, a first dielectric layer 1713, a first semiconductor layer 1715, a second conductor layer 1717, a second dielectric layer 1719, and a third conductor layer 1721, and a shutter layer 1723. In contrast to previously described control matrices 200 and 500 the control matrix 1700 does not include a separate aperture layer, such as aperture layer 250 or aperture layer 602. The control matrix 1700 can therefore be fabricated less expensively than control matrices 200 or 500.

In control matrix 1700, the function of defining an aperture hole 1709 is accomplished via patterns formed in the second conductor layer 1717. The second conductor layer 1717 is allowed to remain, in blanket fashion, under most of the shutter assembly except in the region of the aperture hole. The second conductor layer can be formed from a number of metals which also act as reflectors. Light reflected from the second conductor metal, for instance at regions 1725 and 1727, can return to the backlight and thereby improve the efficiency of the backlight.

In control matrix 1700, the electrical connection between thin film transistor 1701 and the drive anchor 1707 is established by the second conductor layer 1717. The electrical connection between the first conductor layer 1711 and the shutter anchor 1708 is made by means of a strap formed with the third conductor layer 1721. For the embodiment shown in FIG. 10, no M1-M2 via such as via 531, is necessary, nor is an Ap-M1 via necessary, such as via 533.

In another possible embodiment of a shutter assembly—again without the use of a separate aperture layer—a shutter anchor such as shutter anchor 1707 can be built on top of and electrically connected to the first conductor layer 1711. In that case the first conductor layer is also used as a reflective layer for recycling light back into the backlight. In this embodiment it would be useful to supply an M1-M2 via, similar to via 531 illustrated in FIG. 9A, for electrically connecting the drain of a transistor to the shutter anchor.

In another variation on control matrix 1700 a separate dielectric layer, preferably with a refractive index greater than that of the underlying substrate, can be interposed between the first conductor layer 1711 and the substrate 1702. Such an intervening dielectric layer can enhance the optical reflectivity for light that impinges on the control matrix 1700 from underneath or through the substrate 1702.

In another variation of control matrix 1700, a separate aperture layer can be interposed between the control matrix 1700 and the substrate and electrically isolated from the control matrix 1700 by a separate dielectric layer. The separate aperture layer can be patterned to define an aperture hole, such as aperture hole 1709. The separate aperture layer can be built from materials which are chosen for maximum recycling of light back into the backlight. In this embodiment, however, no vias or other electrical connections are supplied between the control matrix 1700 and the aperture layer. In order to avoid capacitive coupling between a moving shutter 1703 and a separate aperture layer, it can be advantageous to provide electrical shielding between the moving shutter 1703 and the aperture layer. Such shielding can be accomplished by means of patterns etched into layers of the control matrix, such as the first conductor layer 1711 or the second conductor layer 1717. These layers can be electrically connected so that they carry the same electrical potential as the moving shutter. The metal regions 1725 and 1727 of control matrix 1700, which include the shutter anchor 1707, are positioned to act either as reflectors of light back into the backlight or as electrical shields between the control matrix 1700 and a separate aperture layer (separate aperture layer not shown).

In some embodiments, light blocking or absorbing materials are incorporated into the control matrix 1700 to reduce the reflection of incident light to increase the contrast of the display. For example, light absorbing materials may be chosen for the conductor layers 1711 and/or 1717. The conductor layers 1711 and 1717 can be patterned to perform light blocking functions. The light blocking and light absorbing regions are formed, for instance, at regions 1725 and 1727.

Appropriate light blocking materials for incorporation into a control matrix include metals, including without limitation Al, Cr, Au, Ag, Cu, Ni, Ta, Ti, Nd, Nb, W, Mo and/or alloys thereof. If deposited to thicknesses in excess of 30 nm such materials are effective at blocking the transmission of light. Deposition can be accomplished by evaporation, sputtering, or chemical vapor deposition.

In many implementations, it is preferable that the material incorporated into the control matrix have the ability to absorb light. Most metal films absorb a certain fraction of light and reflect the rest. Some metal alloys which are effective at absorbing light include, without limitation, MoCr, MoW, MoTi, MoTa, TiW, and TiCr. Metal films formed from the above alloys or simple metals, such as Ni and Cr with rough surfaces can also be effective at absorbing light. Such films can be produced by sputter deposition in high gas pressures (sputtering atmospheres in excess of 20 mtorr). Rough metal films can also be formed by the liquid spray or plasma spray application of a dispersion of metal particles, following by a thermal sintering step. A dielectric layer is then added to prevent spalling or flaking of the metal particles.

Semiconductor materials, such as amorphous or polycrystalline Si, Ge, CdTe, InGaAs, colloidal graphite (carbon) and alloys such as SiGe are also effective at absorbing light. These materials can be deposited in films having thicknesses in excess of 500 nm to prevent any transmission of light through the thin film. Metal oxides or nitrides can also be effective at absorbing light, including without limitation CuO, NiO, $CrO_2$, $Cr_2O_3$, AgO, SnO, ZnO, TiO, $Ta_2O_5$, $MoO_3$, $NbO_2$, $Nb_2O_5$, CrN, TiN, or TaN. The absorption of these oxides or nitrides improves if the oxides are prepared or deposited in non-stoichiometric fashion—often by sputtering or evaporation—especially if the deposition process results in a deficit of oxygen in the lattice. As with semiconductors, the metal oxides should be deposited to thicknesses in excess of 500 nm to prevent transmission of light through the film.

A class of materials, called cermets, is also effective at absorbing light. Cermets are typically composites of small metal particles suspended in an oxide or nitride matrix. Examples include Cr particles in a $Cr_2O_3$ matrix or Si particles in an $SiO_2$ matrix. Other metal particles suspended in the matrix can be Ni, Ti, Au, Ag, Mo, Nb, and carbon. Other matrix materials include $TiO_2$, $Ta_2O_5$, $Al_2O_3$, and $Si_3N_4$.

It is possible to create multi-layer absorbing structures using destructive interference of light between suitable thin film materials. A typical implementation would involve a partially reflecting layer of an oxide or nitride along with a metal of suitable reflectivity. The oxide can be a metal oxide, e.g., $CrO_2$, $TiO_2$, $Al_2O_3$ or $SiO_2$, or a nitride like $Si_3N_4$ and the metal can be suitable metals such as Cr, Mo, Al, Ta, Ti. In one implementation, for absorption of light entering from the substrate a thin layer, ranging from 10-500 nm of metal oxide is deposited first followed by a 10-500 nm thick metal layer. In another implementation, for absorption of light entering from the direction opposite of the substrate, the metal layer is deposited first followed by deposition of the metal oxide. In both cases the absorptivity of bi-layer stack can be optimized if the thickness of the oxide layer is chosen to be substantially equal to one quarter of a selected wavelength (e.g., 0.55 microns) divided by the refractive index of the oxide layer.

In another implementation, a metal layer is deposited followed by a suitable oxide layer of calculated thickness. Then, a thin layer of metal is deposited on top of the oxide such that the thin metal is only partially reflecting (thicknesses less than 0.02 microns). Partial reflection from the metal layer will destructively interfere with the reflection from the first metal layer and thereby produce a black matrix effect. Absorption will be maximized if the thickness of the oxide layer is chosen to be substantially equal to one quarter of a selected wavelength (e.g., 0.55 microns) divided by the refractive index of the oxide layer.

Many from the above list of light absorbing materials exhibit the property of electrical conduction, and so would be appropriate for electrical conductors such as in layers 1711 and/or 1717. Exemplary materials with both light absorbing properties and conducting properties include the simple metals Ta, Nb, W, and Mo, the semiconductor Si, the alloys MoCr, MoW, MoTi, MoTa, TiW, TiCr, and the cermets described above. Metal or semiconductor films with a porous microstructure or with rough surfaces are also appropriate absorbers for use in conductor layers such as 1711 or 1717. The materials chosen for the invention have the property of reflecting <50% of the incident light.

Alloys between Al and the refractory metals Mo, Ta, Cr, or W are also suitable for electrical conductors that also absorb light. Alloys between Al and Mo where the atomic percent of Al varies between 5 and 95 percent are useful for this application, preferably where the atomic percent of Al varies between 5 and 50 percent, more preferably where the atomic percent of Al varies between 20 and 35 percent. These alloys can be deposited onto the control matrix by means of co-evaporation, by co-sputtering, by sputtering from a composite target, or by chemical vapor deposition. In one embodiment, the absorptive and conductive material is achieved by depositing a thin film of the intermetallic compound $AlMo_3$. Preferably the surface of these alloys as deposited is rough to enhance the optical absorption. Cermet compositions can be achieved in the alloy system Al—Mo by evaporating or sputtering in an oxygen-rich atmosphere, or by subjecting the thin films to an oxygen-containing ambient after deposition. The final composition of the cermet film in one embodiment is a combination of $Al_2O_3$ and Mo metal.

In some embodiments a double layer of materials is employed to make up the conductor layers in the control matrix. The material stack 2300 of FIG. 11 shows one example of an absorptive and conductor double layer. The double layer is composed of the layers 2304 and 2306. In material stack 2300 the double layer is deposited on top of a dielectric layer 2303. In other embodiments the layer 2304 is deposited directly on top of substrate 2302. The layer 2306 may be optimized for its properties of low sheet resistance, and may be composed of the metals Al, Mo, Ta, Cr, Nb, W or alloys thereof. For the MEMS-down configuration, the layer 2304 is chosen for its light absorbing properties. Any of the light absorbing materials described above are appropriate for use with layer 2304. In one preferred embodiment an alloy formed between Al and Mo or between Al2O3 and Mo is chosen for use at layer 2304 while substantially pure Al or substantially pure Mo are chosen for layer 2306. In another embodiment the conductor layer 2306 is itself comprised of multiple metal layers, for instance Mo and Al or Ta and Al.

When the double layer stack comprising layers 2304 and 2306 is deposited directly on top of the substrate 2302, it is appropriate for use as a first conductor layer such as layer 1711 in FIG. 10. When the layers 2304 and 2306 are deposited on top of a dielectric layer, they are appropriate for use a second conductor layer, such as layer 1717.

In some embodiments the thickness of the underlying layer 2304 is chosen so that light reflected from its top and bottom surfaces will destructively interfere, thereby increasing the absorbance of light. For instance the thickness of the layer 2304 can be chosen to be substantially equal to one quarter of a selected wavelength (e.g., 0.55 microns) divided by the refractive index of the layer 2304 to adjust the color of the display.

In another embodiment suitable to the invention, a multi-layer stack of materials is employed to ensure absorption of light incident on the substrate. The multi-layer stack 2400 of FIG. 12 shows an example of a light-absorbing stack of materials. The process begins with deposition of a dielectric layer 2404 directly on top of the transparent substrate 2402. Then a second layer 2406, comprised of a thin metal or semiconductor material is deposited on top of layer 2404. Then a third layer 2408, comprised of a dielectric material, is deposited on top of layer 2406. And finally a fourth layer 2410, comprised of a conductive metal, is deposited on top of layer 2408. In one embodiment the second layer of metal or semiconductor is only partially reflective. Partial reflection from the layer 2406 will destructively interfere with reflections from the layer 2410 and thereby strongly absorb light. Absorption will be maximized if the thickness of the dielectric layer 2408 is chosen to be substantially equal to one quarter of a selected wavelength (e.g., 0.55 microns) divided by the refractive index of the dielectric layer to adjust the color of the display.

In a particular embodiment, the second layer 2406 is comprised of the same semiconductor material that is used to form the thin film transistors. The layer 2406 could be comprised of either amorphous or polycrystalline silicon and perform the same function as layer 610 in FIG. 5 or layers 918, 920, or 924 in FIG. 8. The third dielectric layer 2408 can be comprised of the gate insulator layer 926 in FIG. 8 or the second dielectric layer 908 or the etch stop layer 922. In this embodiment of the light absorbing stack, the fourth metal layer 2410 can comprise the same materials and perform the same function as the conductor layers 612 or 912. In addition to forming the components of a thin film transistor, the multi-layer stack 2400 can be patterned in areas near the shutter assembly to perform light blocking and light absorbing functions.

In another embodiment of the multi-layer stack 2400, the second layer 2406 is comprised of a conductor layer, using materials similar to those used for conductor layer 606 described in FIGS. 5-7. The third dielectric layer 2408 comprises similar materials and performs the same function as the dielectric layer 608. And the fourth metal layer 2410 comprises similar materials and perform the same function as conductor layer 612. Light absorption is enhanced if the conductor layer 2406 is made thin enough (<100 nanometers thick) so that layer 2406 is only partially reflective. Alloys between Al and refractory materials, as described above with respect to the light absorbing and conducting layers 1711 and 1717, can be employed for layer 2406. The thickness of the dielectric layer 2408 is preferably chosen substantially equal to one quarter of a selected wavelength (e.g., 0.55 microns) divided by the refractive index of the dielectric layer. As discussed above with respect to layers 1711 and 1717, the conductor layers 2406 and 2410 layers can be patterned to form light blocking and light absorbing regions, such as at regions 1725 and 1727 in FIG. 10.

As discussed with respect to conductor layers 606 and 612, each of the metal or semiconductor layers 2408 or 2410 can be further comprised of multiple metal layers. Examples would be the bilayer stack of Al on Cr or the trilayer stack of Mo/Al/Mo. In similar fashion, the dielectric layers 608 or 2408 can be comprised of multiple layers, for example the layered combination of $SiO_2$ and $Si_3N_4$.

The multi-layer stacks of materials, including either the double layer stack 2300 or the multi-layer stack 2400, are designed so that <50% of the incident light is reflected from the materials stack and preferably so that <30% of the light is reflected. In some embodiments, such a multi-layer stack comprises light absorbing material that is non-conductive. For example, the multi-layer stack comprises both conductors and non-conductors, where the lowermost and uppermost materials of the stack are light-absorbing non-conductors.

Combinations of the above double layer stack 2300 and multi-layer stack 2400 can also be employed in a control matrix. For instance, one tri-layer stack consisting of the layers 2406, 2408, and 2410 can be patterned together to form the first conductor layer in a matrix, serving functions similar to conductor layer 606 or layer 1711. In the same control matrix then, another tri-layer stack, using either similar or different materials for layers 2406, 2408, and 2410, can be subsequently deposited and patterned in position as the second conductor layer, such as conductor layer 612 or 1717. In another embodiment of the control matrix, a double layer stack consisting of the layers 2304 and 2306 can be patterned to form the function of the first conductor layer while a tri-layer stack, using materials described for the layers 2406, 2408, and 2410, can be patterned to form the function of the second conductor layer. Those skilled in the art will recognize many other combinations of the light-absorbing material stacks 2300 and 2400 for use either as interconnects or light blocking regions in a control matrix. Some materials, though demonstrating light absorbing properties, may not have good transistor properties, but may still be incorporated into a control matrix.

FIGS. 13A and 13B show cross-sectional views of control matrices 2500 and 2550, respectively, each built using an LTPS TFT process similar to that of FIG. 8B. Light absorbing material 2534 and first conductive layer 2506 are separately deposited and patterned on top of gate dielectric 2526. In control matrix 2500, light absorbing layer 2534 is deposited and patterned prior to first conductive layer 2506. In control matrix 2550, light absorbing layer 2534 is deposited and patterned after first conductive layer 2506. In both control matrices 2500 and 2550, layers 2534 and 2506 are patterned similarly except layer 2534, as compared to layer 2506, is removed in certain areas so as to not overlap semiconductor 2524. In some embodiments, light absorbing layer 2534 is conductive and overlaps first conductive layer 2506 to allow an electrical connection therebetween, where first conductive layer 2506 acts as a gate metal for the active devices. Light absorbing layer 2534 may comprise light absorbing materials that do not have good transistor properties.

Figure 14A:
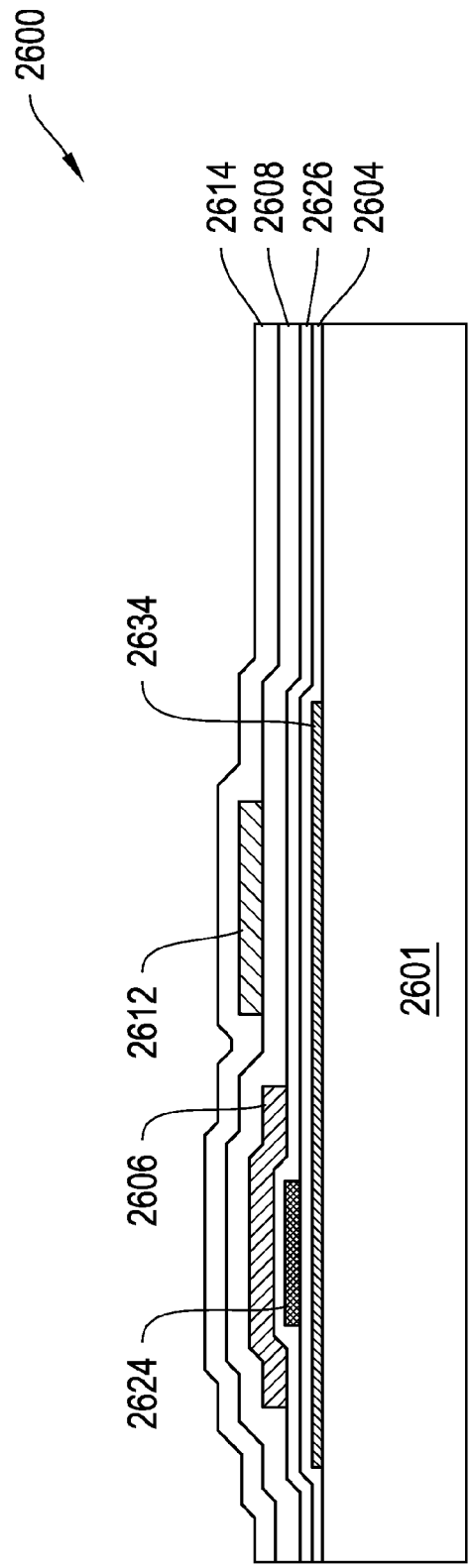
Figure 14B:
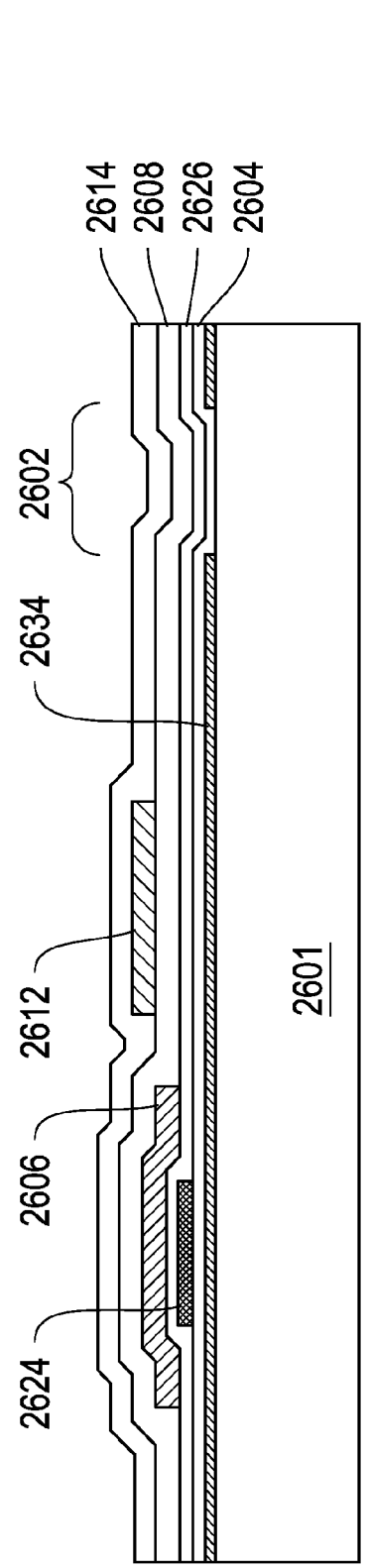

In some embodiments, the light absorbing material is deposited prior to the process for forming the TFT. For example, FIG. 14A shows a cross-sectional view of a control matrix 2600 built using an LTPS-TFT process similar to that of FIG. 8B. A light absorbing material 2634 is deposited prior to the buffer dielectric layer 2604. The light absorbing material 2634 is used to shield the conductive layers 2606 and 2612 as well as the semiconducting layer 2624, or any other subsequent layers that may be highly reflective, from incident light. The light absorbing material 2634 may be non-conductive. In some embodiments, light absorbing material 2634 defines aperture regions 2602 so as to form an aperture layer, similar to aperture layer 602 of FIG. 7, as shown by control matrix 2625 of FIG. 14B. This technique of depositing the light absorbing material 2634 prior to a TFT process could also be used in an amorphous silicon transistor process similar to that in FIG. 8A.

Figure 14C:
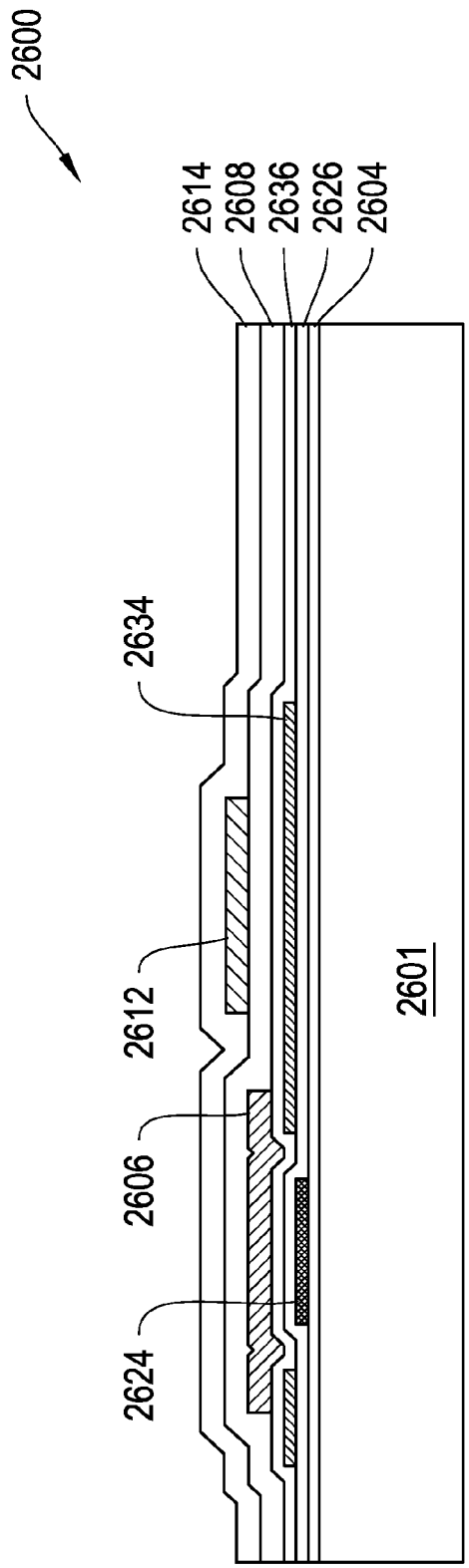
Figure 14D:
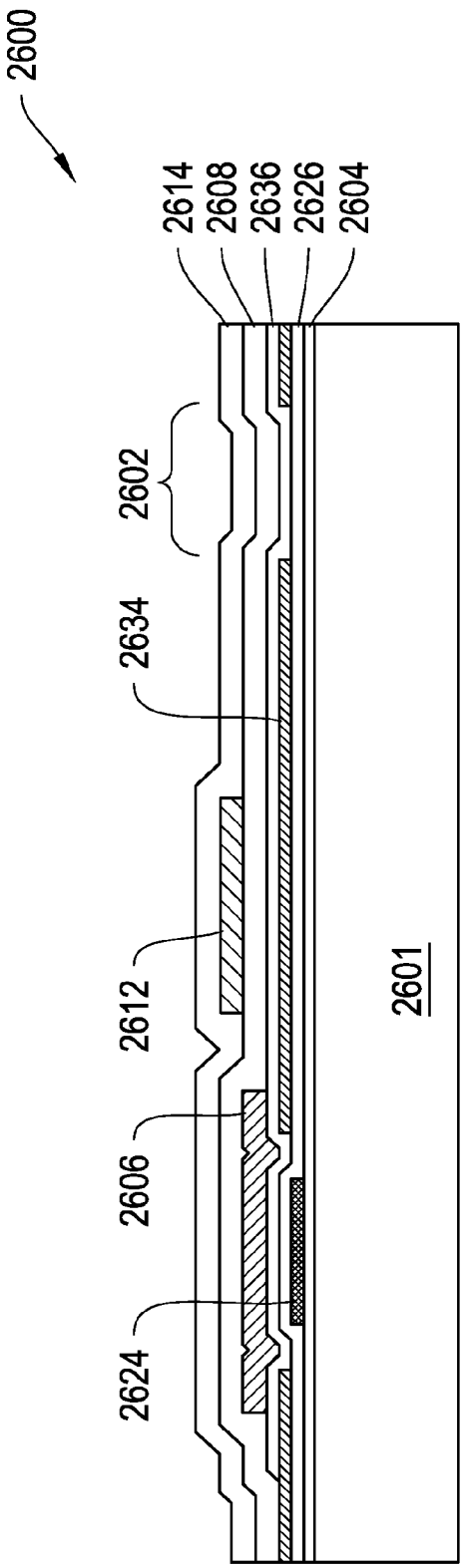
Figure 15:
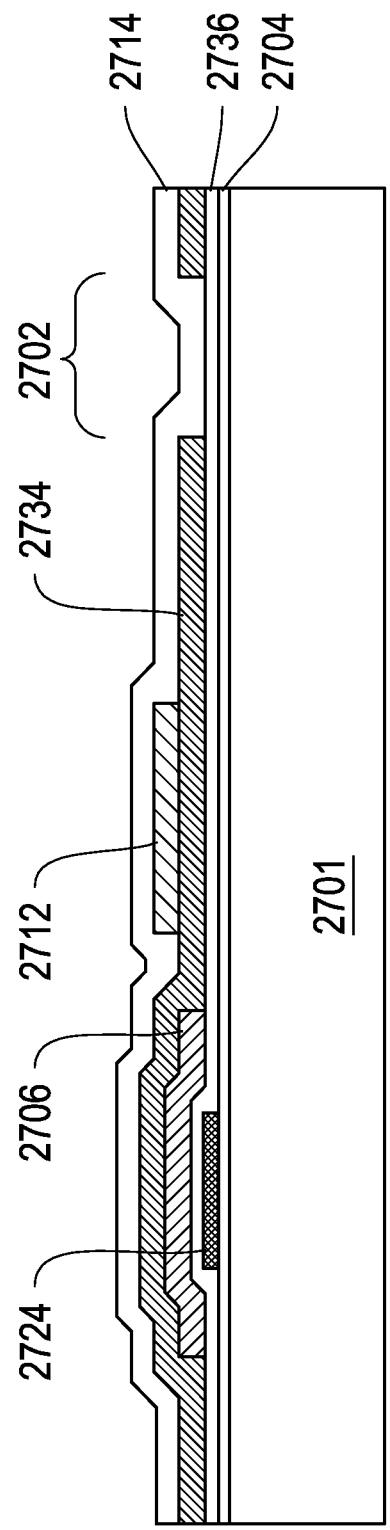

In some embodiments, the light absorbing material is deposited during the process for forming the TFT. FIG. 14C shows a cross-sectional view of a control matrix 2650 built using an LTPS-TFT process similar to that of FIG. 8B. Light absorbing material 2634 is deposited and patterned after the semiconducting layer 2624 and gate dielectric 2626 and prior to dielectric layer 2636. The light absorbing material 2634 is patterned such that there is adequate spacing between it and the semiconducting layer 2624 so as to not affect any desired transistor performance. The light absorbing material 2634 may be non-conductive, in which case dielectric layer 2634 could be omitted. In some embodiments, light absorbing material 2634 defines aperture regions 2602 so as to form an aperture layer, similar to aperture layer 602 of FIG. 7, as shown by control matrix 2675 of FIG. 14D. FIG. 15 shows a cross-sectional view of a control matrix 2700 where the dielectric layer 2734, in-between the first conductive layer 2706 and the second conductive layer 2712, comprises a light absorbing material. The dielectric layer 2734 defines aperture regions 2702 so as to form an aperture layer, similar to aperture layer 602 of FIG. 7A. Alternatively, the dielectric layer 2736, in-between the semiconducting layer 2724 and the first conductive layer 2706, comprises a light absorbing material. Light absorbing materials of control matrix 2700 may be non-conductive.

The invention may be embodied in other specific forms without departing from the spirit or essential characteristics thereof. The forgoing embodiments are therefore to be considered in all respects illustrative, rather than limiting of the invention.

The invention claimed is:

1. A control matrix comprising:
    a plurality of electrical components arranged to control one or more light modulators; and
    at least one interconnect including light absorbing material, the at least one interconnect being arranged to provide electrical signals to at least one of the plurality of electrical components and absorb a portion of incident light, a first portion of the interconnect including a gate of at least one transistor and a second portion of the interconnect extending along a column or row associated with the one or more light modulators.

2. The control matrix of claim 1, wherein the light absorbing material reflects <50% of the incident light.

3. The control matrix of claim 1, wherein the light absorbing material includes a conductor.

4. The control matrix of claim 3, wherein the conductor comprises a mixture of aluminum and molybdenum.

5. The control matrix of claim 3, wherein the conductor comprises a mixture of aluminum oxide and molybdenum.

6. The control matrix of claim 3, wherein the conductor comprises a mixture of titanium and nitrogen.

7. The control matrix of claim 3, wherein the conductor comprises a mixture of niobium and oxygen.

8. The control matrix of claim 1, wherein the at least one interconnect includes a conductor layer and a light absorbing layer, wherein the light absorbing layer is a non-conductor.

9. The control matrix of claim 8, comprising at least one gate, wherein the light absorbing layer is patterned to not contact the at least one gate.

10. The control matrix of claim 9, wherein the at least one interconnect is patterned, in regions near the at least one gate, to contact the at least one gate and, in regions away from the at least one gate, to match the patterning of the light absorbing layer.

11. The control matrix of claim 1, comprising a transistor comprising a plurality of layers, one of which is a light absorbing layer.

12. The control matrix of claim 11, wherein the light absorbing layer is a semiconductor.

13. The control matrix of claim 1, wherein the light absorbing material includes a dielectric.

14. The control matrix of claim 8, wherein the light absorbing layer has a top surface, a bottom surface, and a thickness selected so that light reflected from the top and bottom surfaces destructively interfere.

15. The control matrix of claim 14, wherein the light absorbing layer has a refractive index and the thickness of the light absorbing layer is selected to substantially equal one quarter of a selected wavelength divided by the refractive index of the light absorbing layer.

16. The control matrix of claim 1 further comprising a light absorbing layer that is patterned to form a plurality of aperture regions.

17. The control matrix of claim 1, wherein the control matrix controls MEMS-based light modulators.

18. The control matrix of claim 17, wherein the MEMS-based light modulators comprise shutters.

19. The control matrix of claim 1, wherein the first and second portions are formed concurrently.

20. The control matrix of claim 1, wherein the first and second portions are formed by a photomask.

21. The control matrix of claim 1, wherein the at least one transistor and the one or more light modulators is formed from a common layer of material.

* * * * *